(12) United States Patent
Burton et al.

(10) Patent No.: US 12,125,149 B2
(45) Date of Patent: Oct. 22, 2024

(54) INTERFACES FOR PRESENTING AVATARS IN THREE-DIMENSIONAL ENVIRONMENTS

(71) Applicant: Apple Inc., Cupertino, CA (US)

(72) Inventors: Rupert Thomas Guy Burton, San Francisco, CA (US); Gary Ian Butcher, Los Gatos, CA (US); Jason Rickwald, Santa Cruz, CA (US); Giancarlo Yerkes, San Carlos, CA (US); Kristi Elaine Schmidt Bauerly, Los Altos, CA (US); Dorian D. Dargan, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/667,350

(22) Filed: Feb. 8, 2022

(65) Prior Publication Data

US 2022/0262080 A1 Aug. 18, 2022

Related U.S. Application Data

(60) Provisional application No. 63/149,989, filed on Feb. 16, 2021.

(51) Int. Cl.
*G06T 19/00* (2011.01)
*G06T 13/40* (2011.01)
*G06V 40/16* (2022.01)

(52) U.S. Cl.
CPC ............ *G06T 19/006* (2013.01); *G06T 13/40* (2013.01); *G06V 40/168* (2022.01); *G06V 40/174* (2022.01)

(58) Field of Classification Search
None
See application file for complete search history.

(56) References Cited

U.S. PATENT DOCUMENTS

| 9,298,257 | B2 | 3/2016 | Hwang et al. |
| 9,547,763 | B1 * | 1/2017 | Avital ................. H04L 63/0861 |
| 9,686,466 | B1 | 6/2017 | Billinghurst et al. |

(Continued)

FOREIGN PATENT DOCUMENTS

| EP | 2492873 B1 | 9/2013 |
| EP | 3627450 A1 | 3/2020 |

(Continued)

OTHER PUBLICATIONS

International Preliminary Report on Patentability received for PCT Patent Application No. PCT/US2022/016451, mailed on Aug. 25, 2022, 9 pages.
International Search Report and Written Opinion received for PCT Patent Application No. PCT/US2022/016451, mailed on Jun. 24, 2022, 18 pages.

(Continued)

*Primary Examiner* — Hilina K Demeter
(74) *Attorney, Agent, or Firm* — DLA Piper LLP (US)

(57) ABSTRACT

In some embodiments, a computer system displays user interfaces for enrolling one or more features of a user of a computer system. In some embodiments, a computer system displays visual effects associated with a virtual avatar in an XR environment. In some embodiments, a computer system displays objects having different visual characteristics in an XR environment. In some embodiments, a computer system switches between different presentation modes associated with a user represented in an XR environment. In some embodiments, a computer system displays a virtual avatar in an XR environment.

36 Claims, 28 Drawing Sheets

(56) References Cited

U.S. PATENT DOCUMENTS

| | | | |
|---|---|---|---|
| 10,135,965 | B2 | 11/2018 | Woolsey et al. |
| 10,176,808 | B1 | 1/2019 | Lovitt et al. |
| 10,235,408 | B1* | 3/2019 | Lao ............... G06V 40/10 |
| 10,811,055 | B1 | 10/2020 | Kimber et al. |
| 11,282,174 | B1 | 3/2022 | Demaio |
| 2002/0135581 | A1 | 9/2002 | Russell et al. |
| 2007/0003915 | A1 | 1/2007 | Templeman |
| 2009/0254843 | A1 | 10/2009 | Van et al. |
| 2011/0025689 | A1 | 2/2011 | Perez et al. |
| 2011/0175809 | A1 | 7/2011 | Markovic et al. |
| 2013/0015946 | A1* | 1/2013 | Lau ............... G06V 40/172 340/5.2 |
| 2013/0227651 | A1* | 8/2013 | Schultz ............... G06F 21/32 726/4 |
| 2014/0168217 | A1 | 6/2014 | Kim et al. |
| 2014/0267311 | A1 | 9/2014 | Evertt et al. |
| 2014/0270351 | A1 | 9/2014 | Hoof et al. |
| 2015/0334292 | A1 | 11/2015 | Tartz et al. |
| 2016/0110593 | A1 | 4/2016 | Hoof et al. |
| 2017/0160819 | A1 | 6/2017 | Yi et al. |
| 2018/0365904 | A1 | 12/2018 | Holmes |
| 2019/0080066 | A1* | 3/2019 | Van Os ............... G06V 40/166 |
| 2019/0088018 | A1 | 3/2019 | Shenton et al. |
| 2019/0094981 | A1 | 3/2019 | Bradski et al. |
| 2019/0096106 | A1 | 3/2019 | Shapiro et al. |
| 2019/0160378 | A1 | 5/2019 | Fajt et al. |
| 2019/0278894 | A1* | 9/2019 | Andalo ............... G06F 21/32 |
| 2020/0110864 | A1* | 4/2020 | Casado ............... G10L 17/04 |
| 2020/0134383 | A1* | 4/2020 | Rhee ............... G06V 40/172 |
| 2021/0019541 | A1* | 1/2021 | Wang ............... G06V 40/172 |
| 2021/0089136 | A1 | 3/2021 | Hossain et al. |
| 2021/0097766 | A1 | 4/2021 | Palangie et al. |
| 2021/0110015 | A1* | 4/2021 | McCarty ............... G06F 21/32 |
| 2021/0382544 | A1 | 12/2021 | Butcher et al. |
| 2021/0407215 | A1 | 12/2021 | Evangelista et al. |
| 2022/0012922 | A1 | 1/2022 | Ishikawa |
| 2022/0020220 | A1 | 1/2022 | Lehman |
| 2022/0083636 | A1* | 3/2022 | Sarkis ............... G06V 10/751 |
| 2022/0084279 | A1 | 3/2022 | Lindmeier et al. |
| 2022/0134234 | A1 | 5/2022 | Sachson et al. |
| 2022/0366626 | A1 | 11/2022 | Miller et al. |
| 2023/0103161 | A1 | 3/2023 | Li et al. |
| 2023/0171484 | A1 | 6/2023 | Dedonato et al. |
| 2023/0229283 | A1 | 7/2023 | Long et al. |
| 2023/0316674 | A1 | 10/2023 | Boesel et al. |
| 2024/0077937 | A1 | 3/2024 | Rickwald et al. |

FOREIGN PATENT DOCUMENTS

| | | |
|---|---|---|
| JP | 2012-223357 A | 11/2012 |
| KR | 10-2020-0117685 A | 10/2020 |

OTHER PUBLICATIONS

Invitation to Pay Additional Fees received for PCT Patent Application No. PCT/US2022/016451, mailed on Apr. 28, 2022, 11 pages.

Chan et al., "FrontFace", Facilitating Communication Between HMD Users and Outsiders Using Front-Facing-Screen HMDs, Sep. 4-7, 2017, 5 pages.

Mai et al., "Frontal Screens on Head-Mounted Displays to Increase Awareness of the HMD Users' State in Mixed Presence Collaboration", May 15, 2019, 10 pages.

Mai et al., "TransparentHMD", Revealing the HMD User's Face to Bystanders, Nov. 26-29, 2017, 6 pages.

Rekimoto et al., "Behind-the-Mask", A Face-Through Head-Mounted Display, 18, May 29-Jun. 1, 2018, 5 pages.

Alldieck et al., "Learning to Reconstruct People in Clothing from a Single RGB Camera", Rxiv.Org, Cornell University Library, 201 Olin Library Cornell University Ithaca, Ny 14853, 2019, 12 pages.

International Search Report and Written Opinion received for PCT Patent Application No. PCT/US2022/044194, mailed on Feb. 13, 2023, 18 pages.

International Search Report and Written Opinion received for PCT Patent Application No. PCT/US2022/050799, mailed on Apr. 3, 2023, 18 pages.

Invitation to Pay Additional Fees and Partial International Search Report received for PCT Patent Application No. PCT/US2022/044194, mailed on Dec. 15, 2022, 10 pages.

International Preliminary Report on Patentability received for PCT Patent Application No. PCT/US2022/016451, mailed on Aug. 31, 2023, 13 pages.

International Search Report and Written Opinion received for PCT Patent Application No. PCT/US2023/017484, mailed on Aug. 28, 2023, 28 pages.

Invitation to Pay Additional Fees and Partial International Search Report received for PCT Patent Application No. PCT/US2023/017484, mailed on Jul. 7, 2023, 20 pages.

Non-Final Office Action received for U.S. Appl. No. 17/944,911, mailed on Dec. 26, 2023, 21 pages.

International Preliminary Report on Patentability received for PCT Patent Application No. PCT/US2022/044194, mailed on Apr. 4, 2024, 12 pages.

International Search Report and Written Opinion received for PCT Patent Application No. PCT/US2023/031979, mailed on Mar. 12, 2024, 16 pages.

Invitation to Pay Additional Fees and Partial International Search Report received for PCT Patent Application No. PCT/US2023/031979, mailed on Jan. 19, 2024, 9 pages.

Non-Final Office Action received for U.S. Appl. No. 17/944,911, mailed on Mar. 26, 2024, 11 pages.

Non-Final Office Action received for U.S. Appl. No. 18/241,802, mailed on May 17, 2024, 57 pages.

* cited by examiner

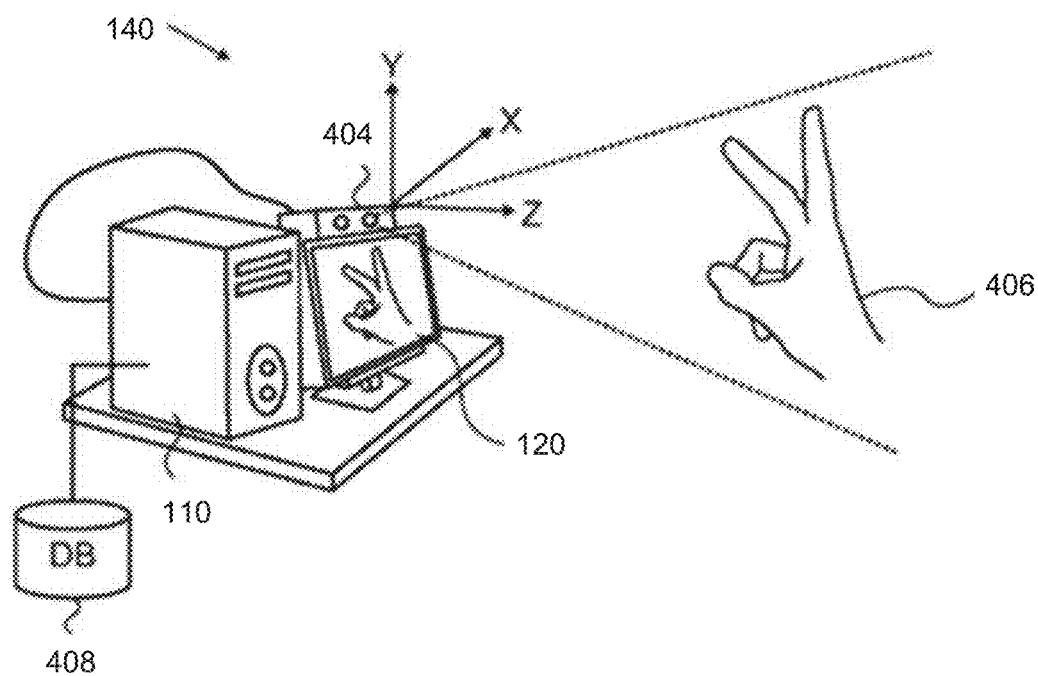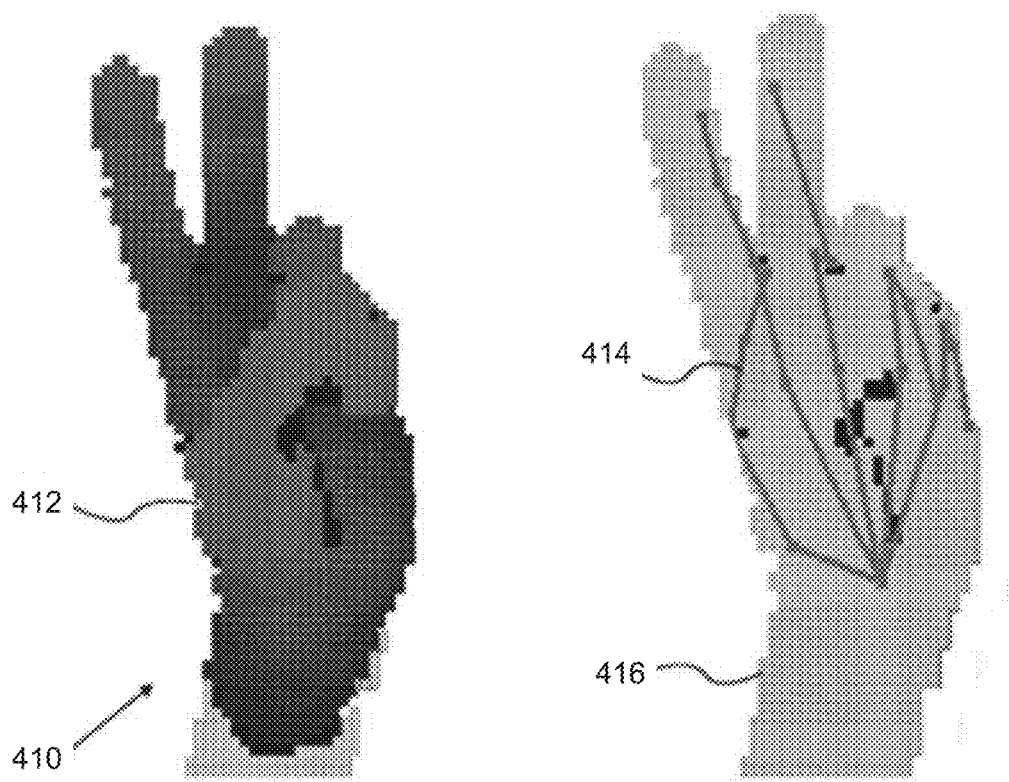
*FIG. 4*

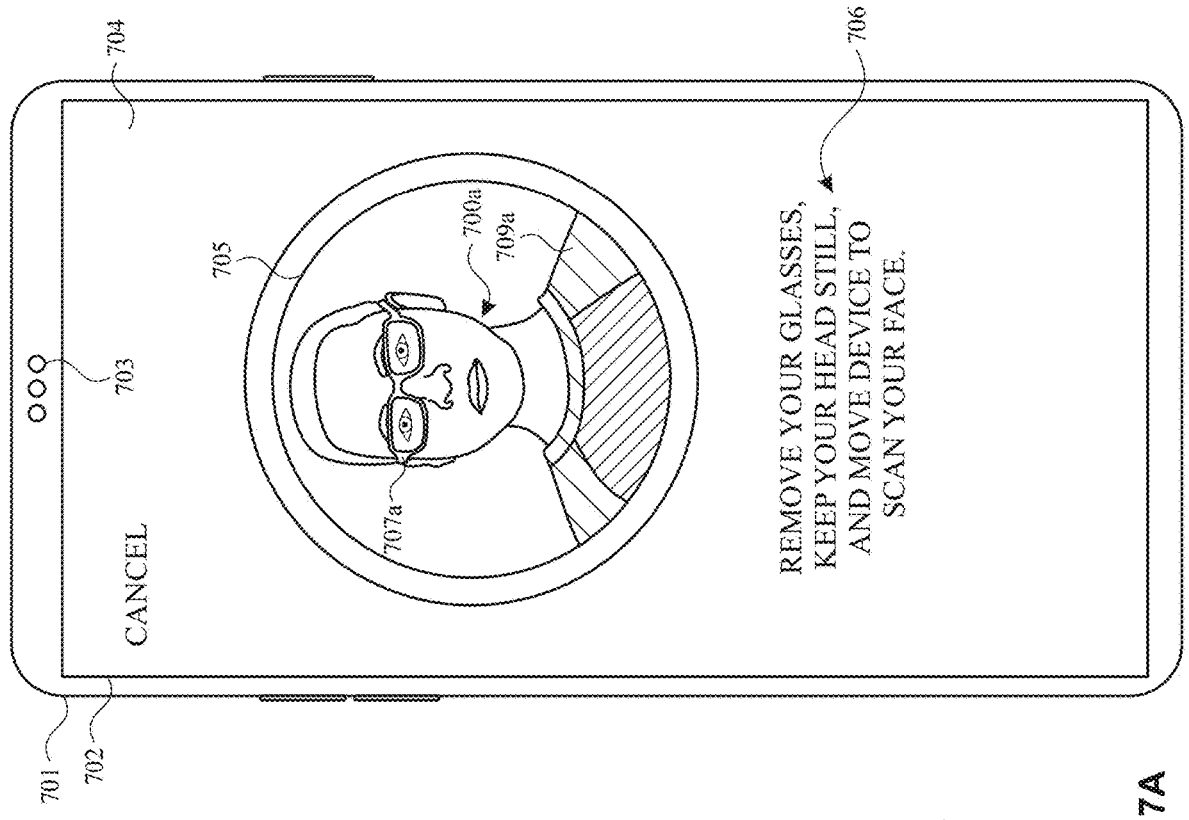
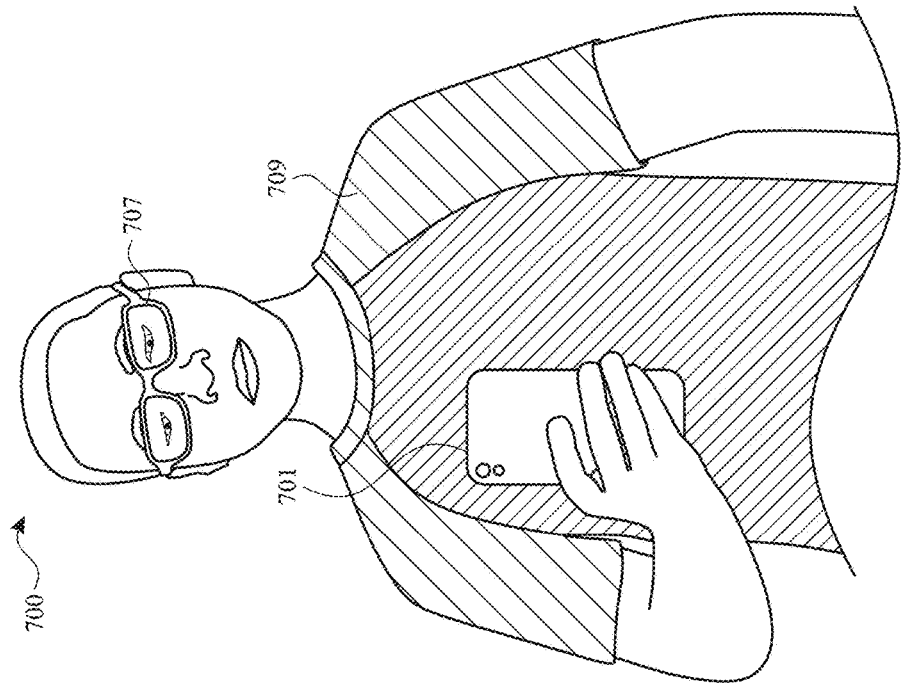
Figure 7A

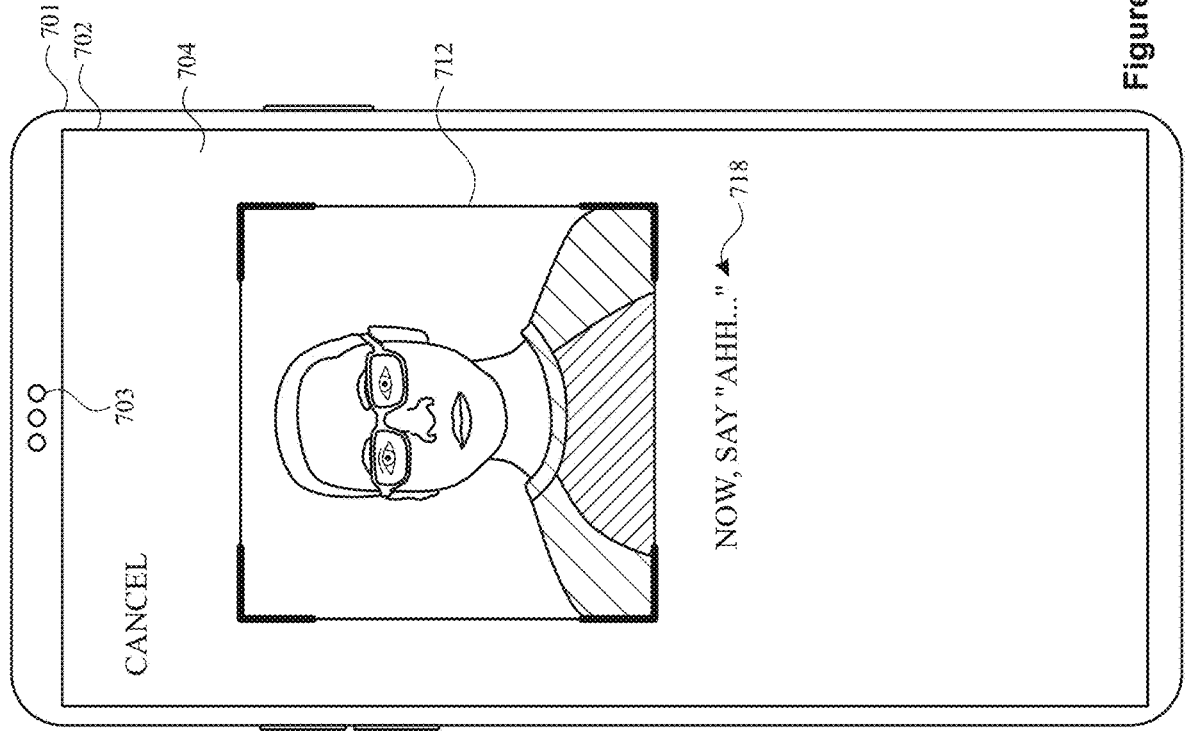
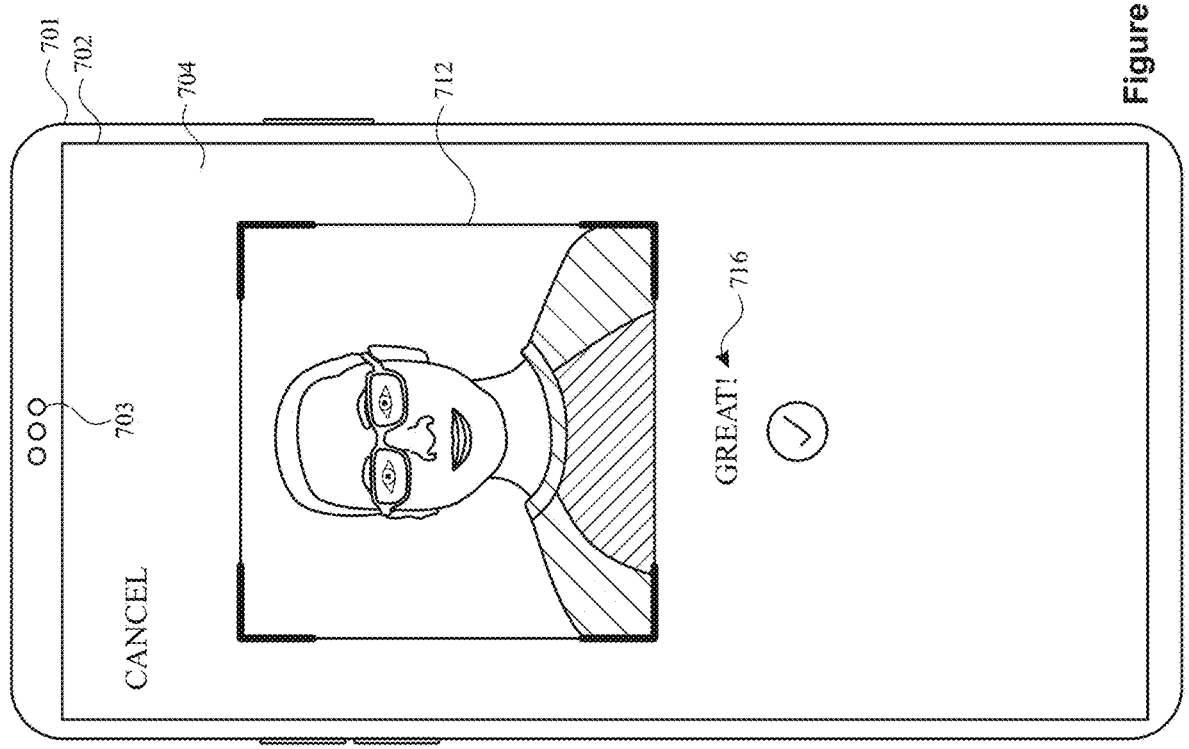

800 ↘

802
During an enrollment process that includes capturing facial data of a user via one or more cameras, display an enrollment interface for enrolling one or more features of a user, including:

804
Output a first prompt to position a first set of one or more of the user's facial features in a first predefined set of one or more facial expressions.

806
Output a second prompt to position a second set of one or more of the user's facial features in a second predefined set of one or more facial expressions different from the first predefined set of one or more facial expressions.

Figure 8

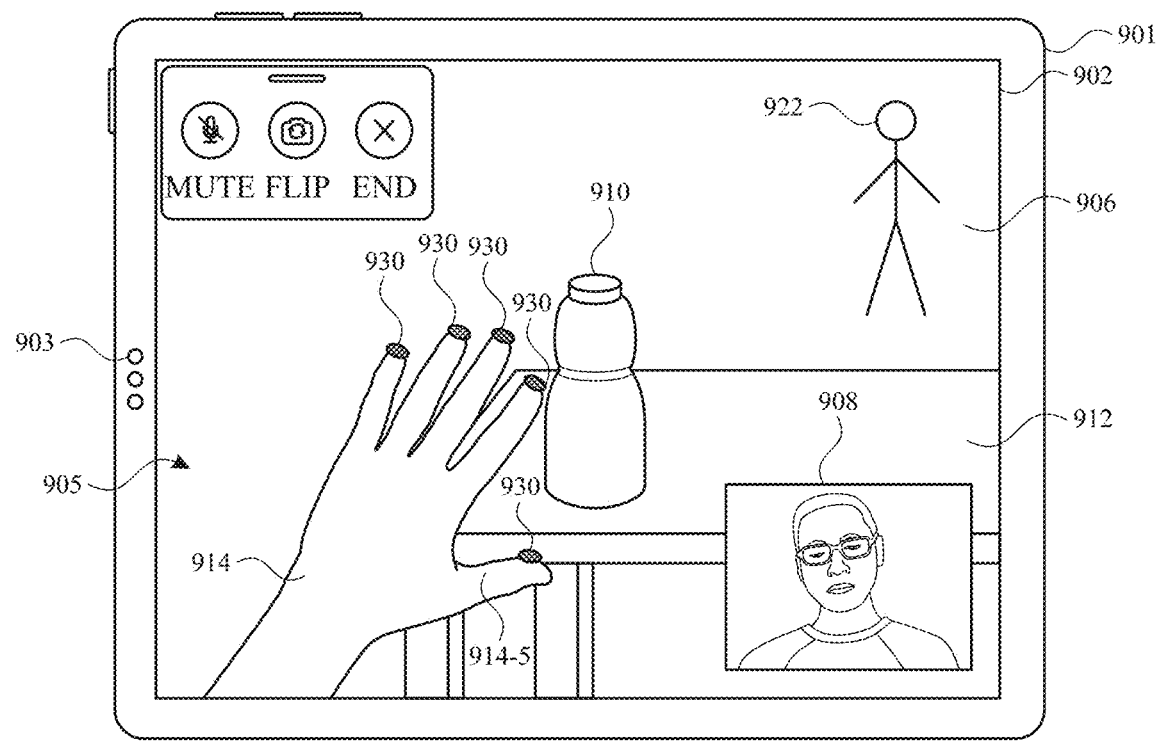
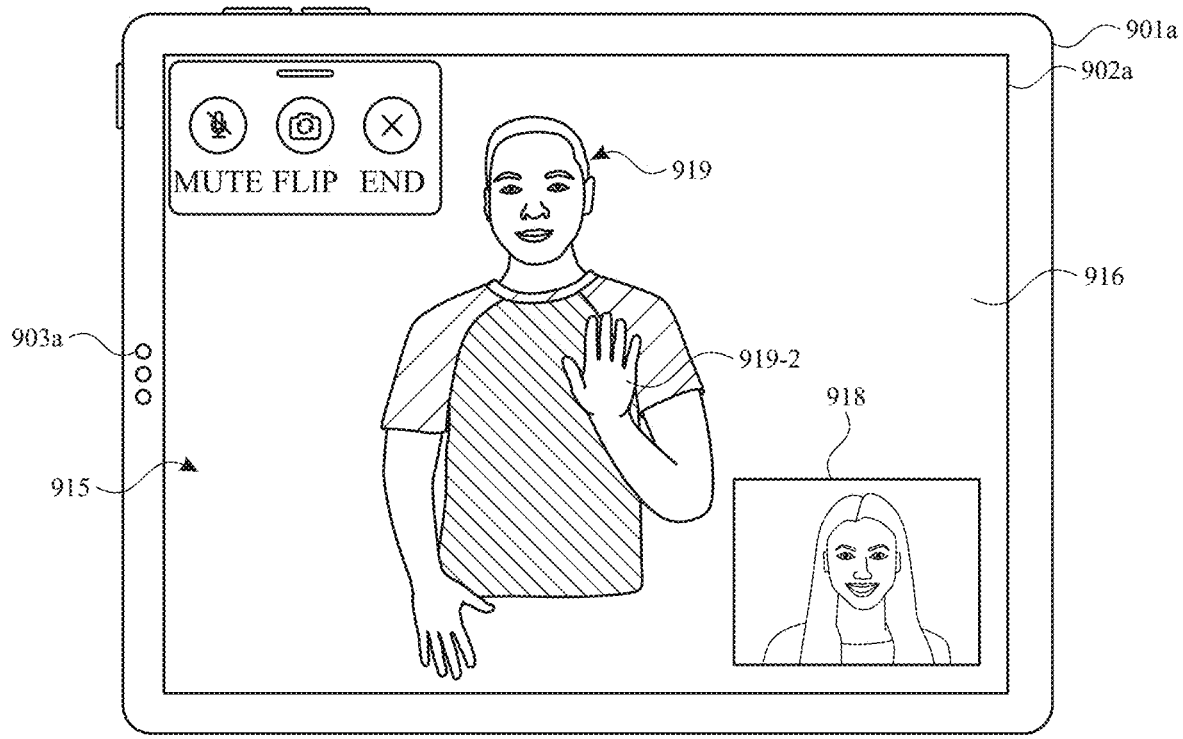
Figure 9C

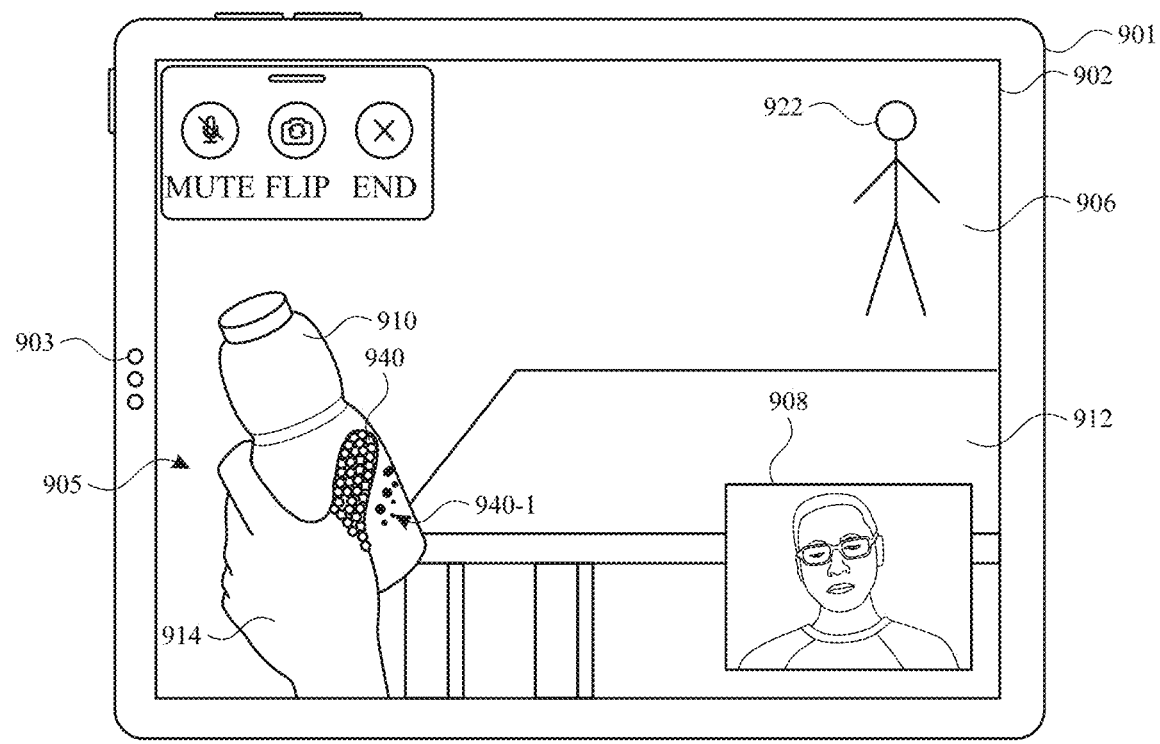
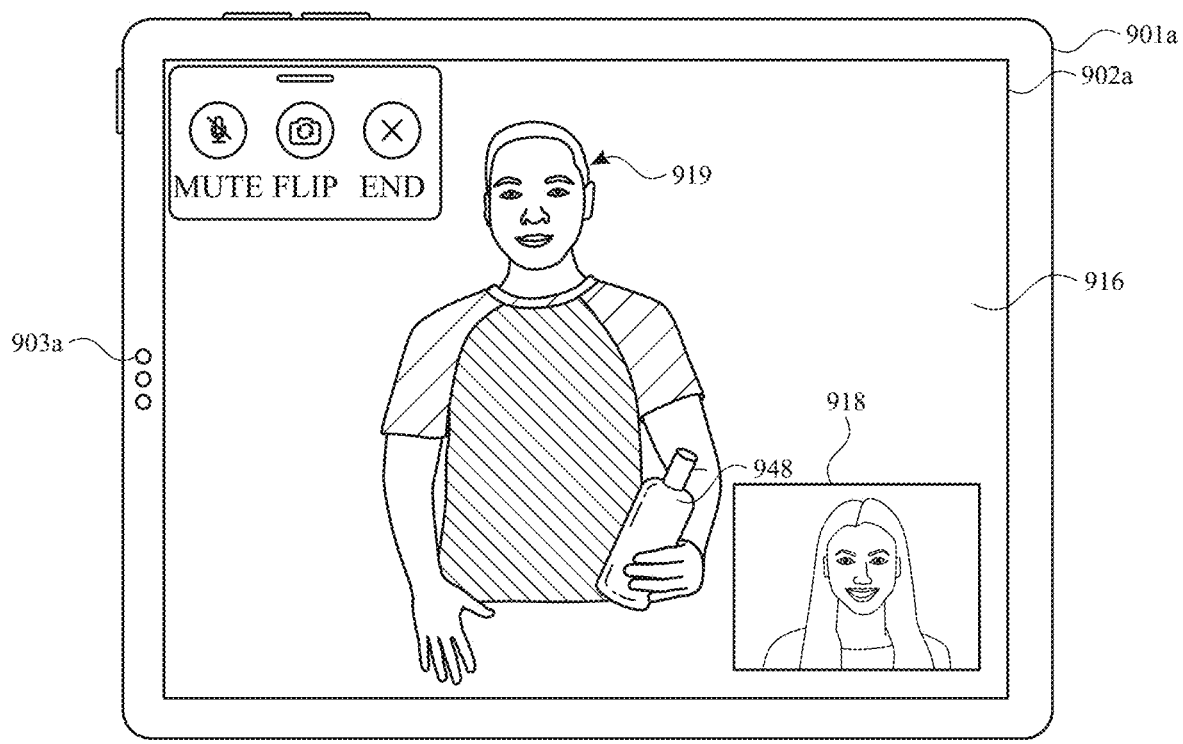
Figure 9F

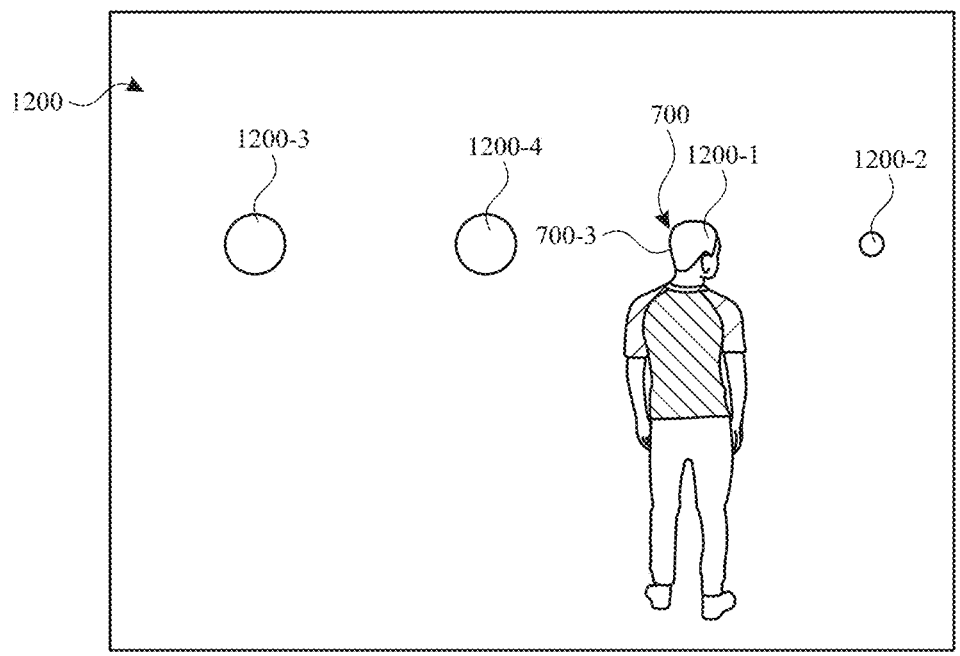
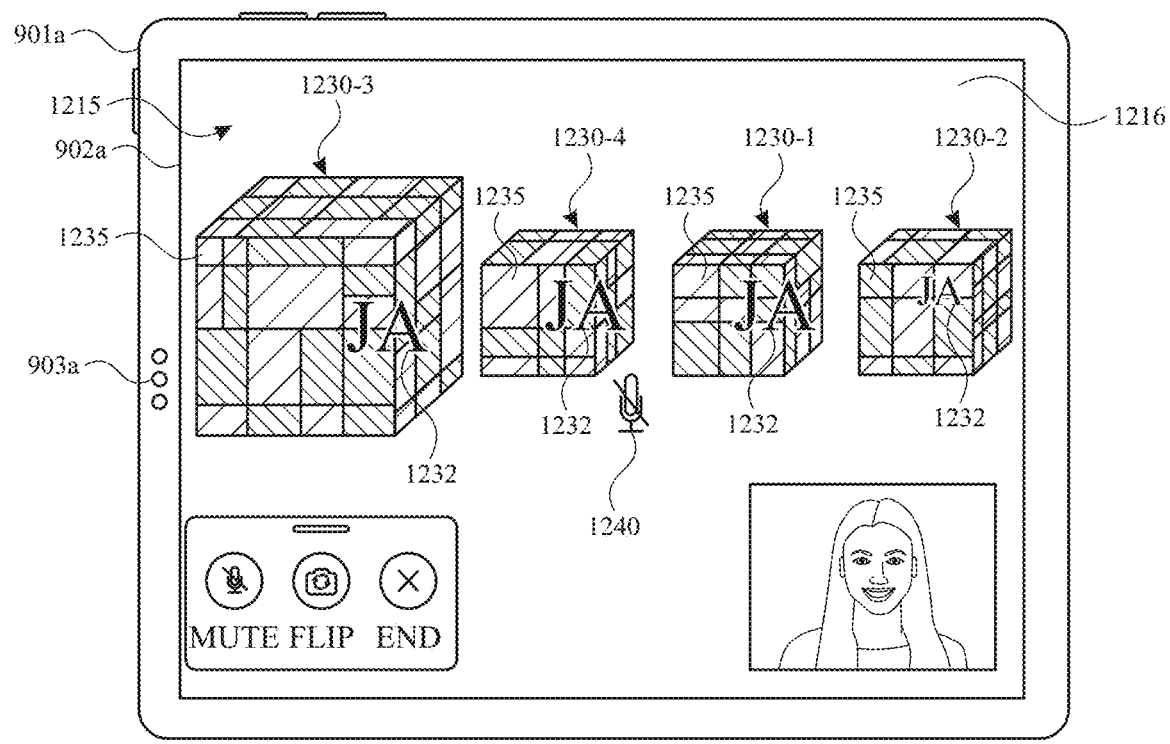
Figure 12E

1400

1402
In response to receiving a request to display a representation of a first user in an extended reality environment:

1404
In accordance with a determination that a set of glasses display criteria is met

1406
Display the representation of the first user in the extended reality environment.

1408
Display a representation of glasses positioned on the representation of the first user in the extended reality environment.

1410
In accordance with a determination that the set of glasses display criteria is not met:

1412
Display the representation of the first user in the extended reality environment without displaying the representation of glasses on the representation of the first user in the extended reality environment.

Figure 14

INTERFACES FOR PRESENTING AVATARS IN THREE-DIMENSIONAL ENVIRONMENTS

CROSS-REFERENCE TO RELATED APPLICATIONS

This application claims priority to U.S. Provisional Application No. 63/149,989, entitled "INTERFACES FOR PRESENTING AVATARS IN THREE-DIMENSIONAL ENVIRONMENTS," filed Feb. 16, 2021, the entire contents of which are hereby incorporated by reference.

TECHNICAL FIELD

The present disclosure relates generally to computer systems that are in communication with a display generation component and, optionally, one or more input devices that provide computer-generated experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems in communication with a display generation component and, optionally, one or more input devices are reduced or eliminated by the disclosed systems. In some embodiments, the computer system is a desktop computer with an associated display. In some embodiments, the computer system is a portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs, or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user, in accordance with some embodiments.

FIGS. 7A-7H illustrate user interfaces for enrolling one or more features of a user of a computer system, in accordance with some embodiments.

FIG. 8 is a flow diagram illustrating an exemplary method for enrolling one or more features of a user of a computer system, in accordance with some embodiments.

FIGS. 9A-9F illustrate various visual effects associated with a virtual avatar presented in an XR environment, in accordance with some embodiments.

FIGS. 12A-12E illustrate various presentation modes associated with a user represented in an XR environment, in accordance with some embodiments.

FIG. 14 is a flow diagram illustrating an exemplary method for displaying a virtual avatar in an XR environment, in accordance with some embodiments.

DESCRIPTION OF EMBODIMENTS

Figure 1:
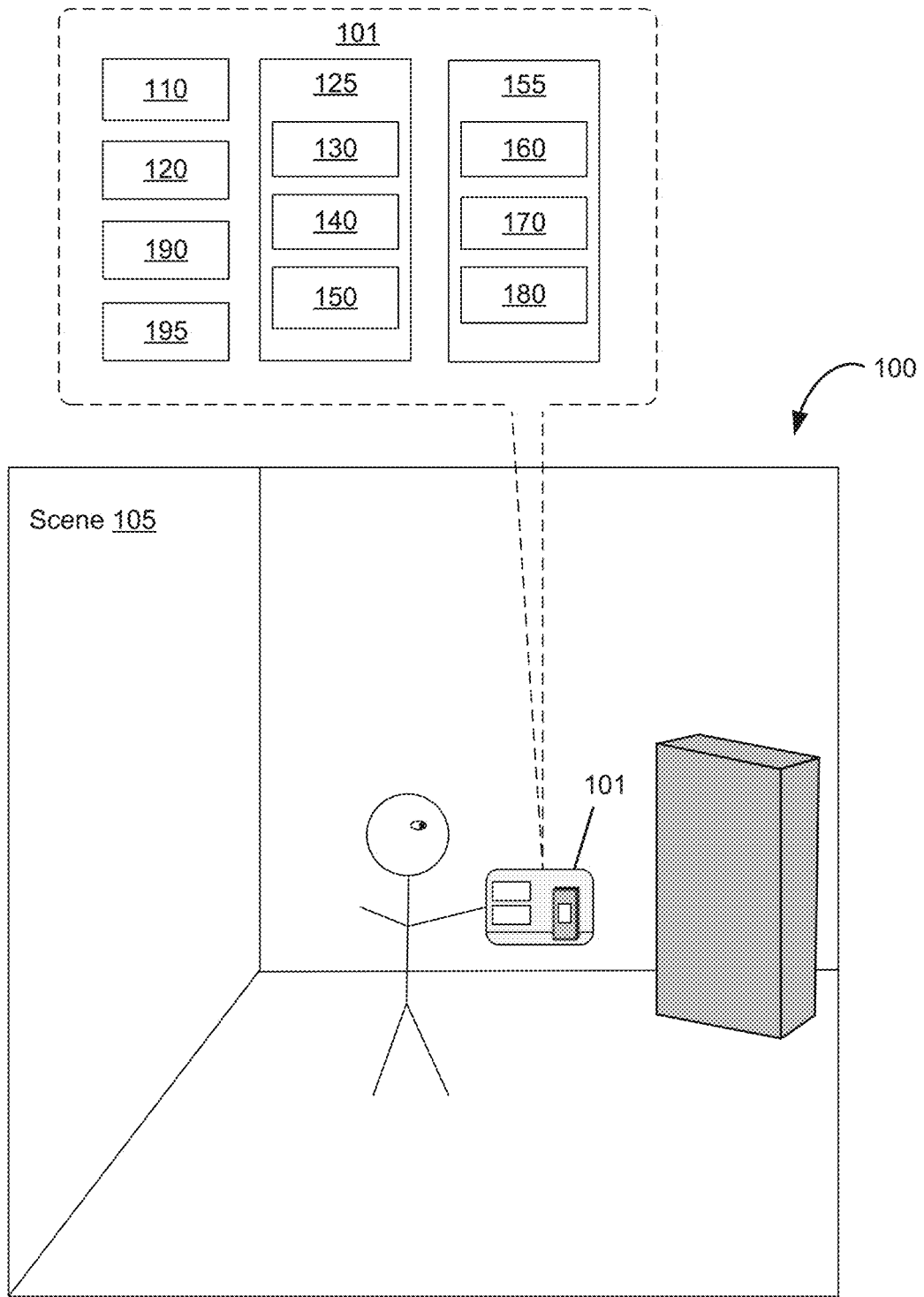
FIG. 1 is a block diagram illustrating an operating environment of a computer system for providing extended reality (XR) experiences, in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system switches between different presentation modes associated with a user represented in an XR environment. The computer system is in communication with a display generation component and an external computer system that is associated with a first user. The computer system displays, via the display generation component, a communication user interface that includes a representation of the first user of the external computer system in a first presentation mode, wherein the communication user interface displays the representation of the first user in an extended reality environment; and the representation of the first user, while in the first presentation mode, has a shape that is visually reactive to changes in movement of a first portion of the first user that are detected by the external computer system. While displaying the representation of the first user in the first presentation mode, the computer system receives first data, from the external computer system, that indicates movement of the first portion of the first user; and in response to receiving the first data, modifies the shape of the representation of the first user based on the movement of the first portion of the first user. After modifying the shape of the representation of the first user, the computer system receives second data indicating that the representation of the first user is to be displayed in a second presentation mode, different than the first presentation mode. In response to receiving the second data, the computer system displays, via the display generation component, the representation of the first user in the second presentation mode, wherein the representation of the first user, while in the second presentation mode, has a shape that is not visually reactive to changes in movement of the first portion of the first user that are detected by the external computer system. While displaying the representation of the first user in the second presentation mode, the computer system receives third data indicating movement of the first user from a first location in a physical environment to a second location in the physical environment different from the first location in the physical environment; and in response to receiving the third data, displays the representation of the first user moving from a first location in the extended reality environment to a second location in the extended reality environment different from the first location in the extended reality environment.

In some embodiments, a computer system displays a virtual avatar in an XR environment. The computer system is in communication with a display generation component and an external computer system that is associated with a first user. In response to receiving a request to display a representation of the first user in an extended reality environment, in accordance with a determination that a set of glasses display criteria is met, the computer system displays, via the display generation component, the representation of the first user in the extended reality environment; and displays, via the display generation component, a representation of glasses positioned on the representation of the first user in the extended reality environment. In accordance with a determination that the set of glasses display criteria is not met, the computer system displays, via the display generation component, the representation of the first user in the extended reality environment without displaying the representation of glasses positioned on the representation of the first user in the extended reality environment.

In some embodiments, a computer system displays user interfaces for enrolling one or more features of a user of a computer system. The computer system is in communication with a display generation component and one or more cameras. During an enrollment process that includes capturing facial data of a user via the one or more cameras, the computer system displays, via the display generation component, an enrollment interface for enrolling one or more features of a user, including: outputting a first prompt to position a first set of one or more of the user's facial features in a first predefined set of one or more facial expressions; and outputting a second prompt to position a second set of one or more of the user's facial features in a second predefined set of one or more facial expressions different from the first predefined set of one or more facial expressions.

In some embodiments, a computer system displays visual effects associated with a virtual avatar in an XR environment. The computer system that is in communication with a display generation component and one or more sensors. The computer system displays, via the display generation component, a user feature indicator interface including: a set of one or more visual indicators that correspond to a detected location of a set of one or more features of a hand of a user in a physical environment, wherein the set of one or more visual indicators are displayed in an extended reality environment and have a first displayed position that corresponds to a first detected location of the set of one or more features of the hand of the user in the physical environment. The computer system detects, via the one or more sensors, movement of at least one feature of the hand of the user in the set of one or more features of the hand of the user. In response to detecting the movement of at least one feature of the hand of the user in the set of one or more features of the hand of the user, the computer system updates display of the user feature indicator interface, including: in accordance with a determination that the set of one or more features of the hand of the user moves to a second detected location in the physical environment, displaying, via the display generation component, the set of one or more visual indicators having a second displayed position in the extended reality environment that corresponds to the second detected location of the set of one or more features of the hand of the user in the physical environment; and in accordance with a determination that the set of one or more features of the hand of the user moves to a third detected location in the physical environment different from the second detected location, displaying, via the display generation component, the set of one or more visual indicators having a third displayed position in the extended reality environment that corresponds to the third detected location of the set of one or more features of the hand of the user in the physical environment, wherein the third displayed position in the extended reality environment is different from the second displayed position in the extended reality environment.

In some embodiments, a computer system displays objects having different visual characteristics in an XR environment. The computer system is in communication with a display generation component and an external computer system that is associated with a first user. The computer system displays in an extended reality environment, via the display generation component, a representation of the first user, wherein the representation of the first user is displayed in the extended reality environment having a first pose and a shape based on a shape of at least a portion of the first user, wherein the shape of the representation of the first user is visualized with a first set of visual characteristics. The computer system receives first data that includes data indicating a change in pose of the first user; and in response to receiving the first data, updates an appearance of the representation of the first user in the extended reality environment, including: in accordance with a determination that the first data includes an indication that a first portion of the first user is contacting an object, displaying in the extended reality environment: the representation of the first user having a second pose based on the change in pose of the first user, wherein the shape of the representation of the first user is visualized with the first set of visual characteristics; and a representation of the object having a shape based on a shape of at least a portion of the object, wherein the shape of the representation of the object is visualized with a second set of visual characteristics different from the first set of visual characteristics.

Figure 10:
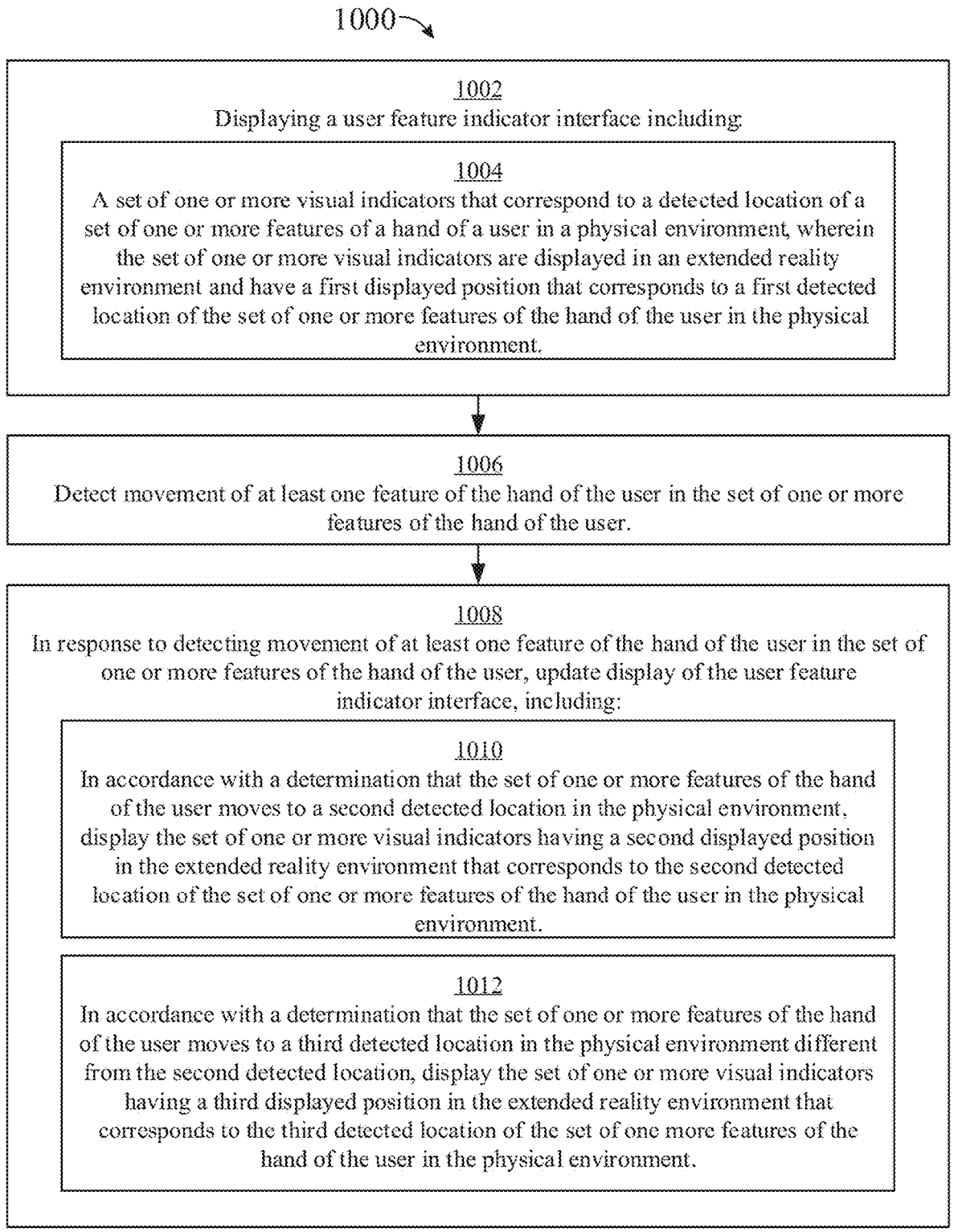
FIG. 10 is a flow diagram illustrating an exemplary method for displaying visual indicators on a hand of a virtual avatar in an XR environment, in accordance with some embodiments.
Figure 11:
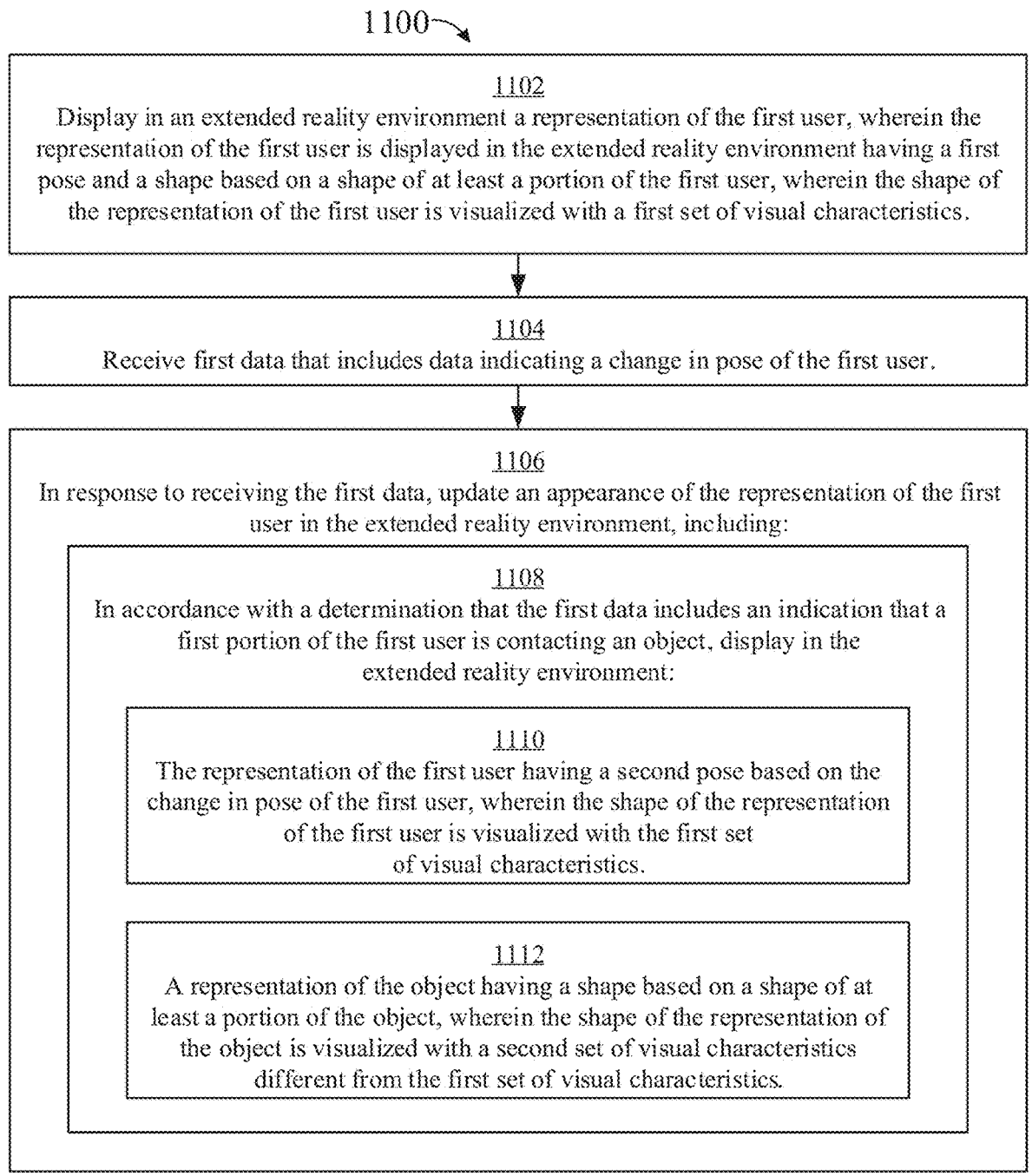
FIG. 11 is a flow diagram illustrating an exemplary method for displaying objects having different visual characteristics in an XR environment, in accordance with some embodiments.

FIGS. 1-6 provide a description of example computer systems for providing XR experiences to users. FIGS. 7A-7H illustrate user interfaces for enrolling one or more features of a user of a computer system, in accordance with some embodiments. FIG. 8 is a flowchart illustrating an exemplary method for enrolling one or more features of a user of a computer system, in accordance with various embodiments. FIGS. 7A-7H are used to illustrate the processes in FIG. 8. FIGS. 9A-9F illustrate various visual effects associated with a virtual avatar in an XR environment, in accordance with some embodiments. FIG. 10 is a flowchart illustrating an exemplary method for displaying visual indicators on a hand of a virtual avatar in an XR environment, in accordance with some embodiments. FIG. 11 is a flowchart illustrating an exemplary method for displaying objects having different visual characteristics in an XR environment, in accordance with some embodiments. FIGS. 9A-9F are used to illustrate the processes in FIGS. 10 and 11. FIGS. 12A-12E illustrate various presentation modes associated with a user represented in an XR environment, in accordance with some embodiments. FIGS. 13A and 13B are a flowchart illustrating an exemplary method for switching between different presentation modes associated with a user represented in an XR environment, in accordance with some embodiments. FIG. 14 is a flowchart illustrating an exemplary method for displaying a virtual avatar in an XR environment, in accordance with some embodiments. FIGS. 12A-12E are used to illustrate the processes in FIGS. 13A, 13B, and 14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
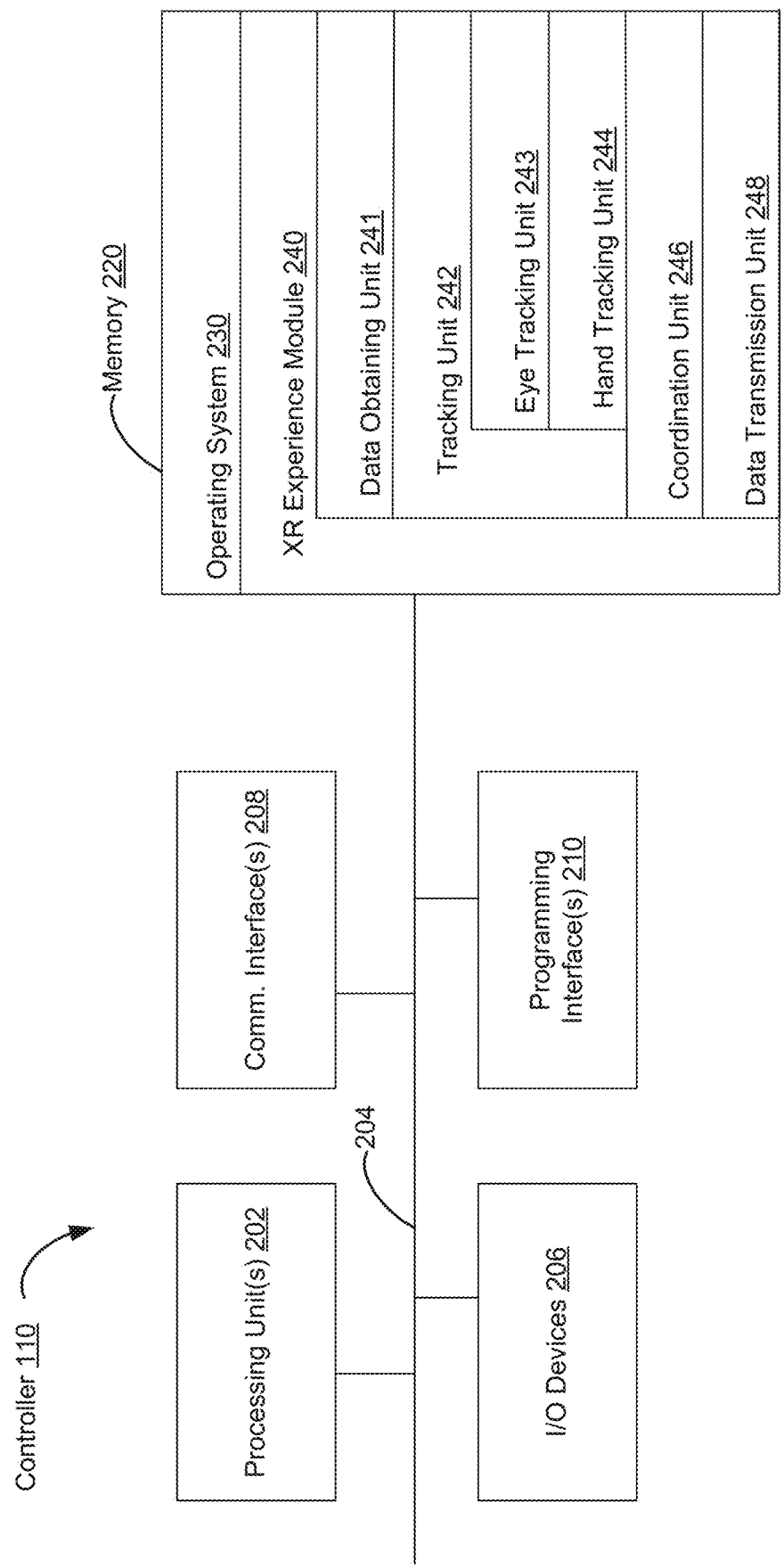
FIG. 2 is a block diagram illustrating a controller of a computer system that is configured to manage and coordinate an XR experience for the user, in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
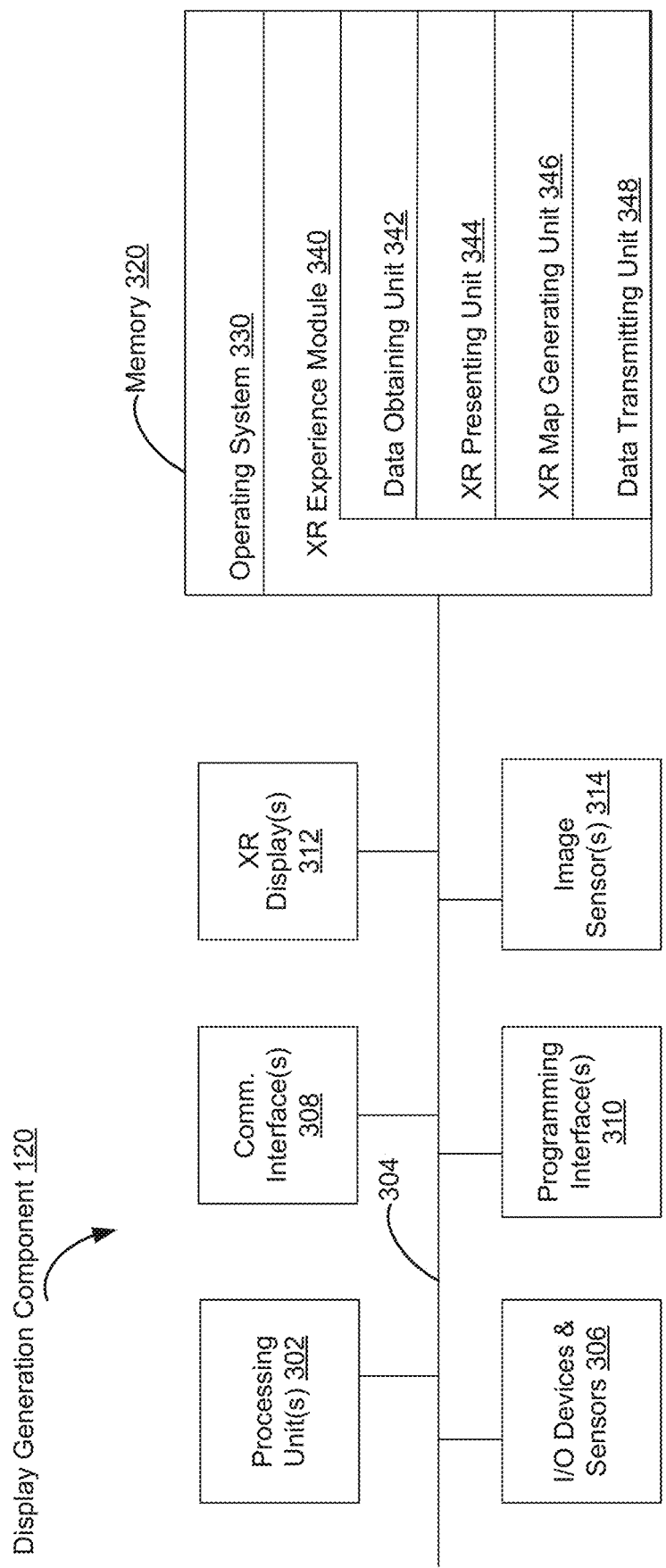
FIG. 3 is a block diagram illustrating a display generation component of a computer system that is configured to provide a visual component of the XR experience to the user, in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
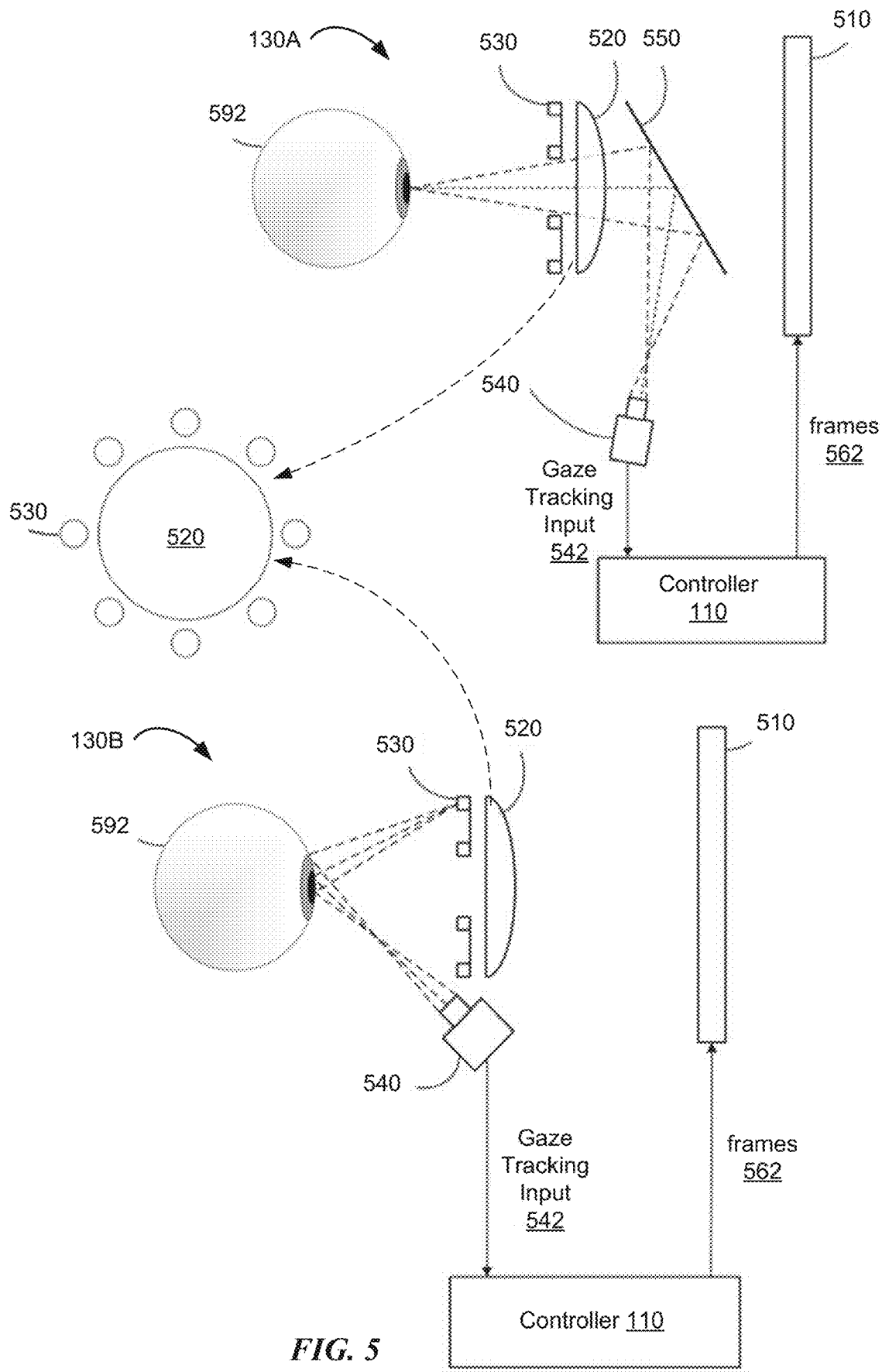
FIG. 5 is a block diagram illustrating an eye tracking unit of a computer system that is configured to capture gaze inputs of the user, in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850nm) and a camera 540 that operates at a different wavelength (e.g., 940nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
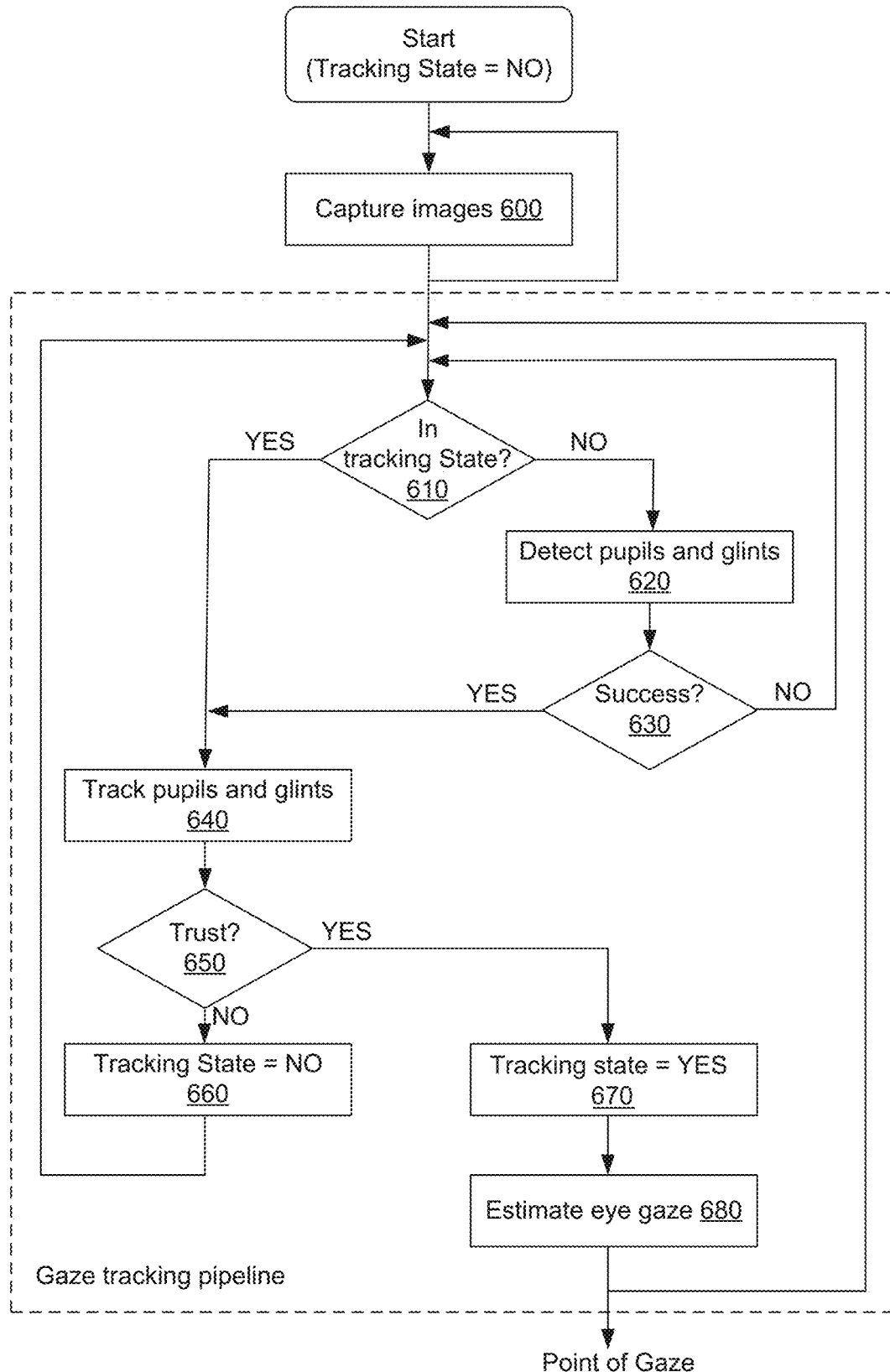
FIG. 6 is a flow diagram illustrating a glint-assisted gaze tracking pipeline, in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and (optionally) one or more sensors (e.g., cameras).

The present disclosure relates to example processes for representing a user in an XR environment. FIGS. 7A-7H and 8 depict examples in which a user is enrolled for representation in an XR environment. FIGS. 9A-9F, 10, and 11 depict examples in which various visual effects associated with a virtual avatar are presented in an XR environment. FIGS. 12A-12E, 13A-13B, and 14 depict examples of various presentation modes associated with a user represented in an XR environment. The processes disclosed herein are implemented using a computer system (e.g., computer system 101 in FIG. 1), as described above.

FIGS. 7A-7H depict an enrollment process for enrolling features of user 700. The enrollment process involves capturing data that represents various aspects of user 700 such as physical features (e.g., facial features), facial expressions, feature movement, skin tone, clothing, and eyeglasses, or other data that can be used to design and/or operate a displayed representation of user 700 in the XR environment. In some embodiments, user 700 can be represented in the XR environment as, for example, a virtual avatar or an audio representation, as discussed in greater detail below with respect to FIGS. 9A-9F and 12A-12E.

FIG. 7A depicts user 700 holding electronic device 701, which includes display 702 and camera(s) 703. User 700 is looking at device 701 and is wearing glasses 707 and an orange and yellow shirt 709. Electronic device 701 is a computer system (e.g., computer system 101 in FIG. 1).

In FIG. 7A, device 701 is displaying enrollment interface 704, which is used to guide user 700 through the enrollment process. Enrollment interface 704 includes camera view 705, which shows a representation of image and/or depth data captured from camera 703. In the embodiment shown in FIG. 7A, camera view 705 includes representation 700a of user 700 (including representation 709a of shirt 709 and representation 707a of glasses 707 worn by user 700). Enrollment interface 704 also includes various prompts instructing user 700 to complete portions of the enrollment process, as discussed in greater detail below.

In the embodiment depicted in FIG. 7A, enrollment interface 704 includes prompt 706, instructing user 700 to keep their head stationary and to move device 701 in order to scan the user's face and, in some embodiments, other portions of the user's body, such as the user's head. Device 701 performs the scan by collecting image data and/or depth data that represents the user's face/head. In some embodiments, this collected data is referred to herein as facial data. Additionally, because device 701 detects that user 700 is wearing glasses, prompt 706 also instructs user 700 to remove glasses 707, in order to collect facial data that more accurately represents the contours of the user's face and head. In some embodiments, the prompts displayed on enrollment interface 704 can include further instructions. For example, if the user has long hair that covers portions of their head or face, the prompt can include instruction(s) to pull their hair back to expose the hidden portions (e.g., ears) of the head/face.

Figure 7B:
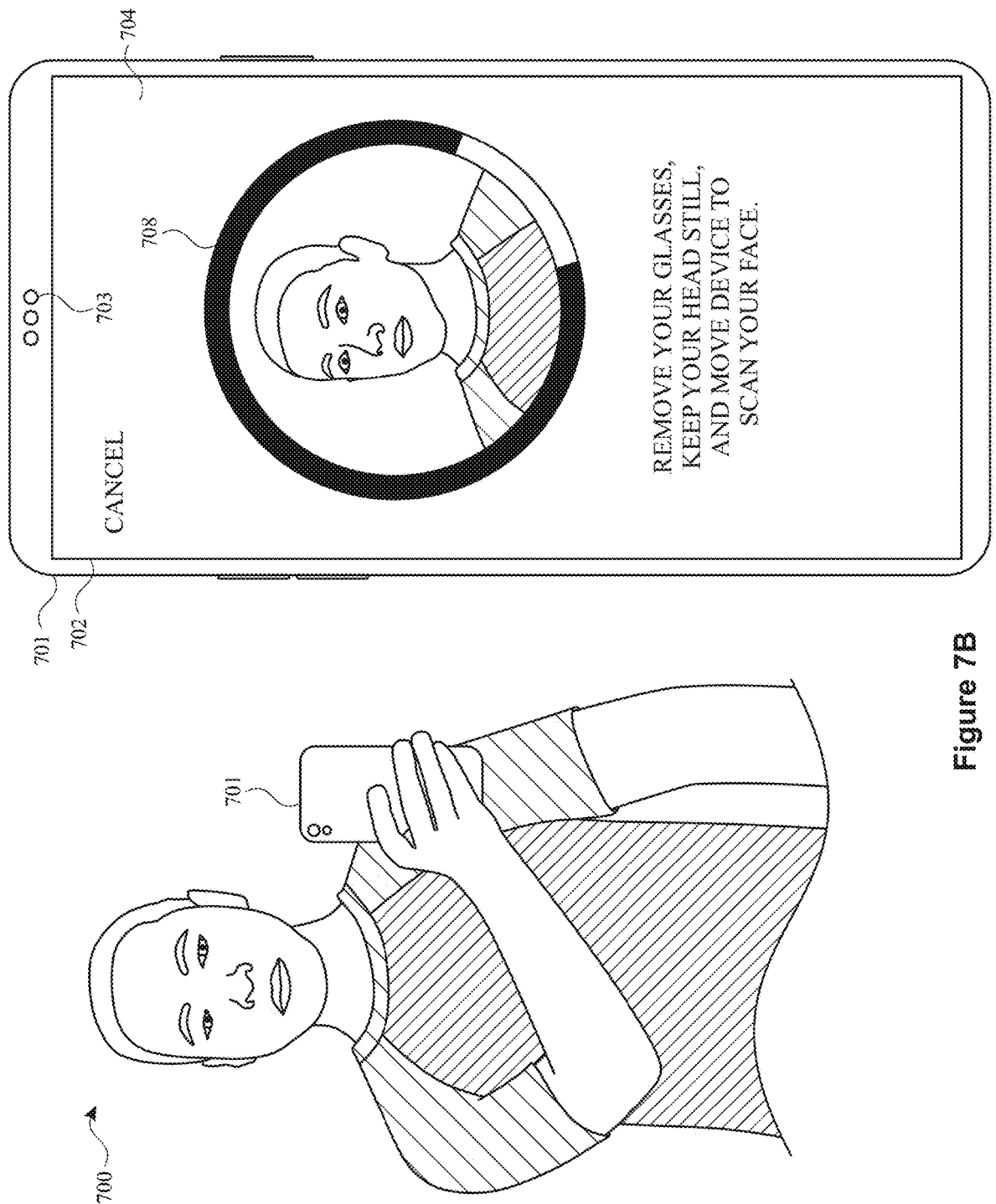

FIG. 7B depicts user 700 with glasses 707 removed, and moving device 701 to scan their face, as instructed by prompt 706. In some embodiments, device 701 instructs the user to keep their head still so as to reduce movement of any potential light glare on the user's face, which can impact the facial data collected from the scan. Enrollment interface 704 also includes progress indicator 708, which updates to show progress of the scan as device 701 collects facial data representing the user's face and/or head.

Figure 7D:
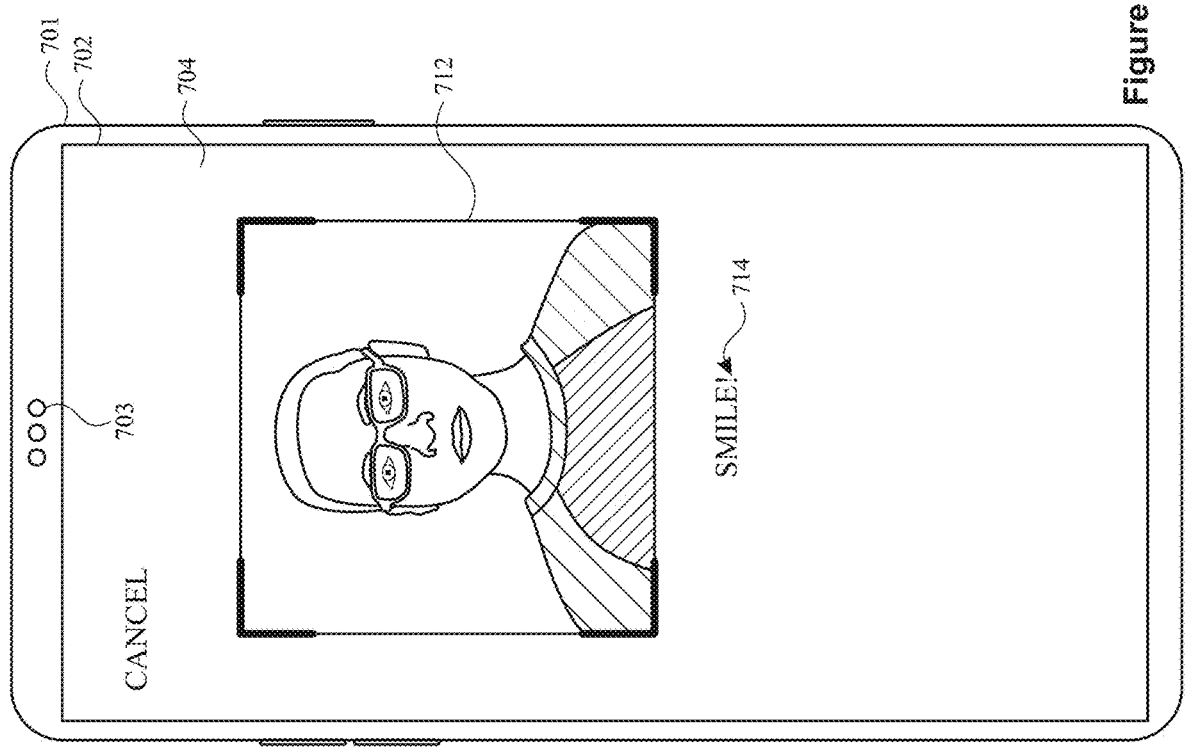
Figure 7C:
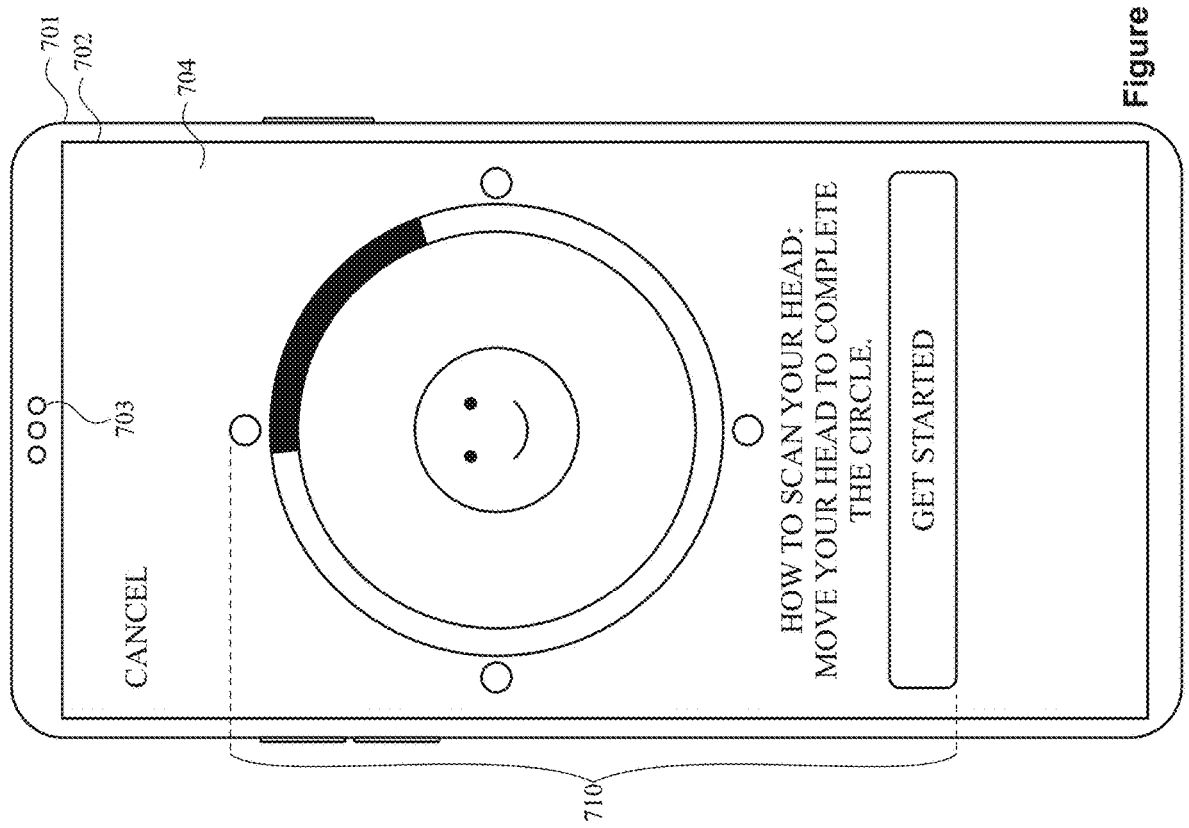

FIG. 7C depicts an alternate embodiment for the face/head scan in FIGS. 7A and 7B. In the embodiment shown in 7C, enrollment interface 704 includes prompt 710, which instructs user 700 to move their head in a circle to complete the face/head scan. In this embodiment, user 700 holds device 701 in front of them while moving their head so that different portions of the head are visible to camera 703, which captures facial data from the user's face/head as it moves in a circle.

FIGS. 7D-7G depict portions of the enrollment process in which the user is prompted to perform various facial expressions, while device 701 captures (e.g., via camera 703) facial data of user 700. Device 701 prompts user 700 to make the different facial expressions in order to capture facial data that represents movements and poses of the user's facial features for each of the facial expressions. This facial data can be used (in some embodiments, in combination with the facial data obtained from the face/head scan), for example, to inform the creation and operation of a virtual avatar that is used to represent the user in an XR environment. The prompts depicted in FIGS. 7D-7G represent an exemplary embodiment of the enrollment process. As such, the enrollment process can include a greater number of prompts, use different prompts, or use different combinations of prompts in order to obtain sufficient facial data for enrolling the physical features of user 700.

In FIG. 7D, device 701 displays enrollment interface 704 with camera preview 712 (similar to camera preview 705) and prompt 714 instructing user 700 to smile. After displaying prompt 714, device 701 evaluates the facial data collected (e.g., via camera 703), and determines whether the facial data indicates that the facial expression made by the user matches the prompt displayed in enrollment interface 704. After device 701 determines that user 700 is making the requested facial expression (a smile), device 701 ceases display of prompt 714, and confirms that the user made the requested facial expression, for example, by displaying confirmation indication(s) 716, as shown in FIG. 7E.

Figure 7G:
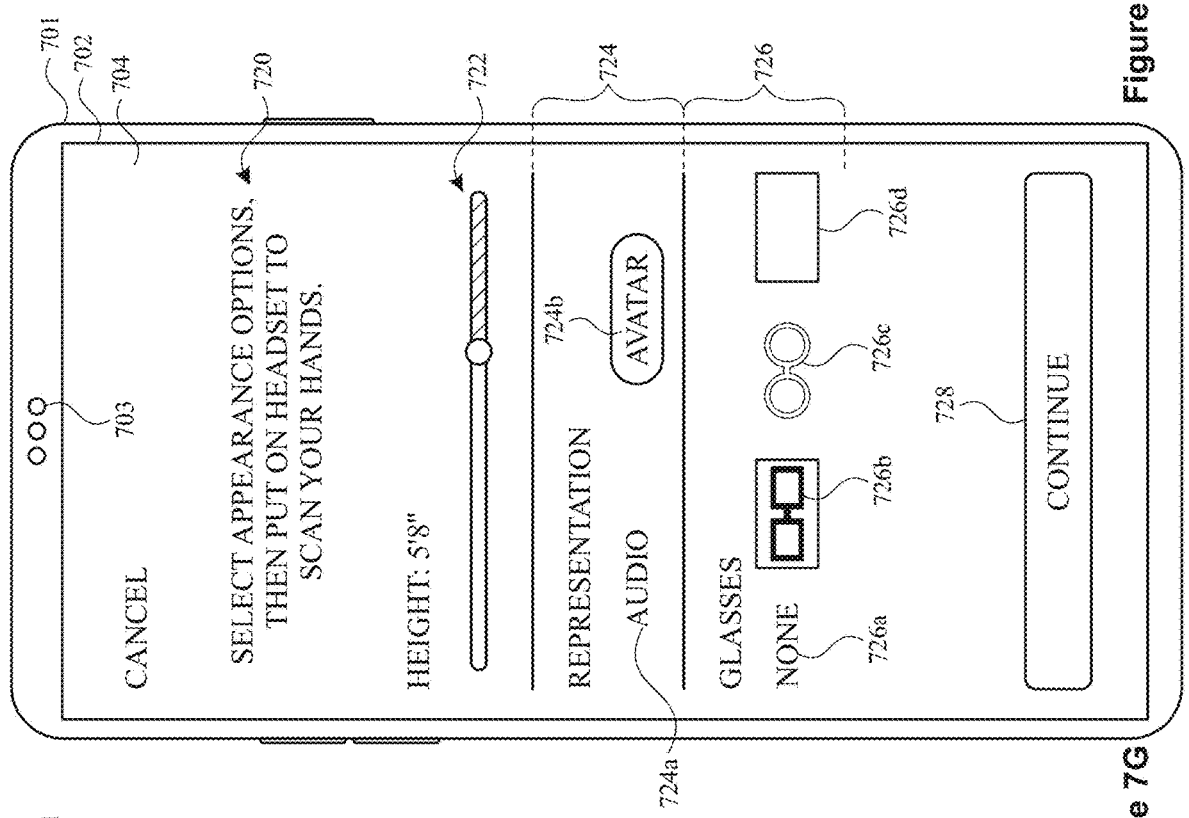

In FIG. 7F, device 701 displays enrollment interface 704 with camera preview 712 and prompt 718 instructing user 700 to say "ahh." After displaying prompt 718, device 701 evaluates the facial data collected (e.g., via camera 703), and determines whether the facial data indicates that the facial expression made by the user matches the prompt displayed in enrollment interface 704. After device 701 determines that user 700 is making the requested facial expression (saying "ahh"), device 701 ceases display of prompt 718, and confirms that the user made the requested facial expression, for example, by displaying confirmation indication(s) 719, as shown in FIG. 7G.

In some embodiments, such as those depicted in FIGS. 7D and 7E, the prompts that device 701 displays in enrollment interface 704 are instructions for the user to make specific facial expressions, such as to smile. In some embodiments, such as those depicted in FIGS. 7F and 7G, the prompts are instructions for the user to say a specific phrase or word, such as to say "ahh." The embodiments depicted in FIGS. 7D-7G are examples of specific prompts that device 701 can use to enroll the user features, and are not intended to be limiting. For example, the prompts can include instructions to make different facial expressions such as a frown, a squint, and/or a surprised expression. Similarly, the prompts can include instructions to say other phrases and/or words. As the user's facial features are posed and/or moved while making the requested facial expression or saying the requested word or phrase, device 701 captures the movement/posing of the facial features and detects additional facial features that are revealed through the movement/posing of the facial features, and uses the captured facial data to enroll the user's features, such as the user's face, mouth, tongue, lips, nose, and the like, so that those features can be properly represented in the XR environment. For example, by instructing the user to smile or to say "ahh," device 701 can determine the appearance of the user's teeth, the movement of the user's lips, whether the user has dimples, and other information that is useful for modeling and/or controlling movement of an avatar that accurately reflects physical features of the user in the XR environment.

Figure 7H:
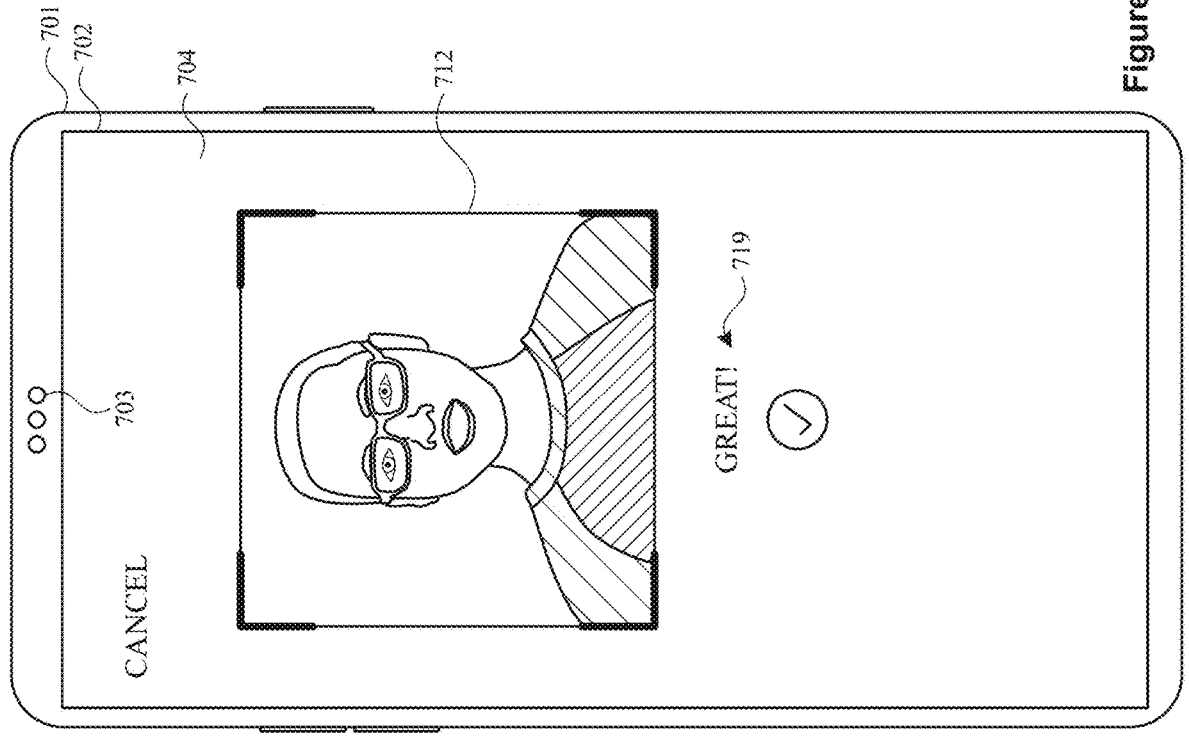

As shown in FIG. 7H, after device 701 captures facial data from the user's facial expressions, device 701 displays enrollment interface 704 having prompt 720, instructing user 700 to select various appearance options and to then use a separate device (e.g., a headset) to scan other physical features (e.g., hands) of user 700. The different appearance options shown in enrollment interface 704 include height option 722, representation options 724, and glasses options 726. Each of these appearance options are discussed in greater detail below.

Height option 722 is adjustable to indicate a height of user 700. In some embodiments, height option 722 is omitted, and the height of user 700 is determined based on data collected from other sources, such as a headset, sensors, wearable devices, or other components that are capable of approximating a height of the user.

Representation options 724 include audio option 724a and avatar option 724b. The representation options are selectable to determine a presentation mode that is used to represent user 700 in the XR environment. When audio option 724a is selected, user 700 is represented in the XR environment by an audio representation. When avatar option 724b is selected (as depicted in FIG. 7H), user 700 is represented in the XR environment by a virtual avatar. The different representation options are discussed in greater detail below with respect to FIGS. 9A-9F and 12A-12E.

Glasses options 726 include no glasses option 726a, rectangle frame option 726b, translucent frame option 726c, and headset option 726d. Glasses options 726 are used to customize an appearance of an avatar that is used to represent user 700 in the XR environment. For example, the avatar is depicted in the XR environment having glasses that correspond to the selected glasses option. If no glasses option 726a is selected, then the avatar is depicted without glasses. Similarly, if headset option 726d is selected, then the avatar is depicted with a headset device (e.g., HMD). In some embodiments, glasses options 726 are only displayed or selectable when avatar option 724b is selected. Glasses options 726 can be manually selected by user 700 or automatically selected by device 701. For example, if device 701 determines that user 700 is not wearing glasses at any point during the enrollment process, device 701 automatically selects no glasses option 726a. Similarly, if device 701 determines that user 700 is wearing glasses at any point during the enrollment process, device 701 automatically selects a glasses option (or creates one) that, optionally, matches the glasses detected on the user during enrollment.

In the embodiment depicted in FIG. 7H, device 701 detected user glasses 707 and, therefore, selected rectangle frame option 726b, which is similar in style to glasses 707.

When the desired appearance options are selected, user 700 can select continue affordance 728 to begin enrolling other parts of their body using a separate device. For example, the user can put on a headset device (e.g., an HMD such as that discussed above with respect to display generation component 120) and use the headset—specifically, one or more cameras integrated with the headset—to then collect image and/or depth data for other physical features of user 700, such as the user's hands, feet, torso, arms, shoulders, etc. As another example, the user can use another device such as electronic device 901 shown in FIG. 9A, to collect image and/or depth data for the other physical features of user 700. In some embodiments, further prompts can be displayed using the separate device (e.g., headset or device 901). For example, a prompt instructing the user to flex their fingers can be displayed on a display component of the headset device while the cameras of the headset device capture data for the user's hands and fingers. Similar to the facial data that is collected via device 701, the data collected from the separate device is used to enroll features of user 700 that can be used to create, model, and/or control various features of an avatar that is used to represent user 700 in an XR environment.

In the embodiment illustrated in FIGS. 7A-7H, device 701 is a smartphone. In some embodiments, however, the enrollment process can be performed using other devices or components that are used for interacting with the user and/or XR environment, such as computer system 101 in FIG. 1 or device 901 in FIG. 9A. Such devices can be used in lieu of, or in addition to, device 701.

Additional descriptions regarding FIGS. 7A-7H are provided below in reference to method 800 described with respect to FIG. 8 below.

FIG. 8 is a flowchart of an exemplary method 800 for enrolling one or more features of a user of a computer system, in accordance with some embodiments. Method 800 occurs at a computer system (e.g., 101; 701) (e.g., a smartphone, tablet, head-mounted display generation component) that is in communication with a display generation component (e.g., 702) (e.g., a visual output device, a 3D display, a display having at least a portion that is transparent or translucent on which images can be projected (e.g., a see-through display), a projector, a heads-up display, a display controller) and one or more cameras (e.g., 703) (e.g., an infrared camera; a depth camera; a visible light camera).

During an enrollment process that includes capturing facial data (e.g., data (e.g., image data, sensor data, and/or depth data) that represents a size, shape, position, pose, color, depth, or other characteristics of one or more features of a user's face) of a user (e.g., 700) via the one or more cameras (e.g., 703), the computer system (e.g., 701) displays (802), via the display generation component (e.g., 702), an enrollment interface (e.g., 704) for enrolling one or more features (e.g., biometric features; a face; a head; features of a head and/or face such as hair, eyes, nose, ears, mouth, eyebrows, facial hair, skin, etc.; characteristics of features such as hair color, hair texture, hairstyle, eye color, skin tone, etc.; clothing such as a hat, eyeglasses, shirt, etc.) of a user (e.g., 700).

As a part of displaying the enrollment interface (e.g., 704) for enrolling one or more features of the user (e.g., 700), the computer system (e.g., 701) outputs (804) a first prompt (e.g., 706; 710; 714; 718) (e.g., visual, audible, and/or tactile prompt) to position a first set of one or more of the user's facial features in a first predefined set of one or more facial expressions (e.g., prompt the user to make a specific facial expression (e.g., smile, squint, surprised expression, etc.) and/or to say a specific phrase or word).

As a part of displaying the enrollment interface (e.g., 704) for enrolling one or more features of the user (e.g., 700), the computer system (e.g., 701) outputs (806) a second prompt (e.g., 706; 710; 714; 718) to position a second set of one or more of the user's facial features (in some embodiments, the second set of one or more facial features includes one or more facial features from the first set) in a second predefined set of one or more facial expressions different from the first predefined set of one or more facial expressions (e.g., prompt the user to make a different, specific facial expression and/or to say a different, specific phrase or word). Outputting a first prompt to position a first set of one or more of the user's facial features in a first predefined set of one or more facial expressions and outputting a second prompt to position a second set of one or more of the user's facial features in a second predefined set of one or more facial expressions different from the first predefined set of one or more facial expressions improves the speed and accuracy of the enrollment process by providing feedback to a user of the computer system indicating a specific set of instructions for moving the user's face in order to obtain facial data for enrolling one or more features of the user. Providing improved feedback enhances the operability of the computer system, improves the speed and accuracy of the enrollment process, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first predefined set of one or more facial expressions is a specific facial expression (e.g., a smile) and the second predefined set of one or more facial expressions is a specific phrase or word (e.g., "ahh"), or vice versa.

In some embodiments, the computer system (e.g., 701) outputs the first prompt (e.g., 714) in accordance with a determination that a first set of enrollment criteria is not met (e.g., a first set of facial data has not been captured (e.g., has not been captured in a predetermined period of time)). In some embodiments, the computer system outputs the second prompt (e.g., 718) in accordance with a determination that the first set of enrollment criteria is met and a second set of enrollment criteria is not met (e.g., a first set of facial data has been captured, and a second set of facial data has not been captured (e.g., has not been captured in a predetermined period of time)). Outputting the first prompt in accordance with a determination that a first set of enrollment criteria is not met and outputting the second prompt in accordance with a determination that the first set of enrollment criteria is met and a second set of enrollment criteria is not met provides feedback to a user of the computer system indicating whether the user has satisfied the criteria for moving the user's face in order to obtain facial data for enrolling one or more features of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after outputting the first prompt (e.g., 714), the computer system (e.g., 701) captures a first set of facial data of the user (e.g., 700) via the one or more cameras (e.g., 703) (e.g., capturing facial data for the user while the user is making the first facial expression (e.g., positioning the first set of one or more facial features in the first predefined set of one or more facial expressions)). In some embodiments, after outputting the second prompt (e.g., 718), the computer system captures a second set of facial data of the user via the one or more cameras (e.g., capturing facial data for the user while the user is making the second facial expression (e.g., positioning the second set of one or more facial features in the second predefined set of one or more facial expressions)).

In some embodiments, after (e.g., in response to) capturing the first set of facial data of the user (e.g., 700) via the one or more cameras (e.g., 703) (in some embodiments, and in accordance with a determination that the first set of facial data of the user satisfies a first set of expression criteria (e.g., the data is identified as corresponding to a facial expression of a first type (e.g., a smile; an expression that corresponds to the first prompt)), the computer system (e.g., 701) ceases display of the first prompt (e.g., prompt 714 is no longer displayed, as depicted in FIG. 7E). In some embodiments, after (e.g., in response to) capturing the second set of facial data of the user via the one or more cameras (in some embodiments, and in accordance with a determination that the second set of facial data of the user satisfies a second set of expression criteria (e.g., the data is identified as corresponding to a facial expression of a second type (e.g., a frown; an expression that corresponds to the second prompt)), the computer system (e.g., 701) ceases display of the second prompt (e.g., prompt 718 is no longer displayed, as depicted in FIG. 7G). Ceasing display of the first prompt after capturing the first set of facial data and ceasing display of the second prompt after capturing the second set of facial data provides feedback to a user of the computer system indicating that the user has satisfied a specific set of instructions (e.g., the instructions in the first prompt and the instructions in the second prompt) for moving the user's face in order to obtain facial data for enrolling one or more features of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first predefined set of one or more facial expressions is selected from the group consisting of a smile, a frown, a squint, and a surprised expression (e.g., mouth and eyes opened with eyebrows raised) (e.g., as indicated by prompt 714 in FIG. 7D).

In some embodiments, the second prompt (e.g., 718) includes a prompt for the user (e.g., 700) to speak a set of one or more words (e.g., a word or phrase (e.g., "say 'ahh'" as indicated by prompt 718 in FIG. 7F)). In some embodiments, the user is instructed to speak specific words or phrases so that the user's face will achieve specific facial expressions while speaking, and the computer system (e.g., 701) captures facial data of the user while the user is speaking.

In some embodiments, as a part of displaying the enrollment interface (e.g., 704) for enrolling one or more features of the user (e.g., 700), the computer system (e.g., 701) outputs a third prompt (e.g., 706; 710) (e.g., visual, audible, and/or tactile prompt) to change a position of the user's head (e.g., a prompt to move the user's head so that different portions of the head are within a field-of-view of the one or more cameras (e.g., 703)). Outputting a third prompt to change a position of the user's head provides feedback to a user of the computer system indicating a specific set of instructions for moving the user's head in order to obtain facial data for enrolling one or more features of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 701) outputs the third prompt (e.g., 706; 710) before at least one of the first prompt (e.g., 714) or the second prompt (e.g., 718) (e.g., the prompts for different facial expressions are output after the prompt to move the user's head).

In some embodiments, as a part of displaying the enrollment interface (e.g., 704) for enrolling one or more features of the user (e.g., 700), the computer system (e.g., 701) outputs a fourth prompt (e.g., 706) (e.g., visual, audible, and/or tactile prompt) to change a position of the one or more cameras (e.g., 703) relative to the user's head while keeping the user's head stationary (e.g., a prompt to move the one or more cameras about the user's head without moving the user's head). Outputting a fourth prompt to change a position of the one or more cameras relative to the user's head while keeping the user's head stationary provides feedback to a user of the computer system indicating a specific set of instructions for moving the one or more cameras relative to the user's head in order to reduce the impact of light glare while obtaining facial data for enrolling one or more features of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, moving the user's head causes light glare to move on the user's head while the head is moving. The changing position of the glare can cause issues with the capture of facial data. Therefore, in order to avoid these issues, the computer system (e.g., 701) prompts the user (e.g., 700) to move the camera (e.g., 703; 701) without moving the user's head, thereby allowing the camera to capture facial data of the user's head from different angles without changing the position of any light glare from the user's head.

In some embodiments, as a part of displaying the enrollment interface (e.g., 704) for enrolling one or more features of the user (e.g., 700), the computer system (e.g., 701) outputs a fifth prompt (e.g., 722) (e.g., visual, audible, and/or tactile prompt) to indicate a height of the user. Outputting a fifth prompt to indicate a height of the user provides feedback to a user of the computer system indicating a specific set of instructions for providing data to enroll one or more features of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in conjunction with outputting the fifth prompt, the computer system displays one or more user interface objects (e.g., a text entry field; a virtual keyboard or keypad; a slide bar) for entering a height.

In some embodiments, as a part of displaying the enrollment interface (e.g., 704) for enrolling one or more features of the user (e.g., 700), the computer system (e.g., 701) outputs a sixth prompt (e.g., 706) (e.g., visual, audible, and/or tactile prompt) to remove a set of glasses (e.g., 707) (e.g., eyeglasses; spectacles; framed, corrective lenses; framed, decorative lenses; framed, protective lenses) from the user's face for at least a portion of the enrollment process. Outputting a sixth prompt to remove a set of glasses from the user's face for at least a portion of the enrollment process provides feedback to a user of the computer system indicating a specific set of instructions for eliminating the impact of wearing glasses while obtaining facial data for enrolling one or more features of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the sixth prompt is outputted in accordance with a determination (e.g., based on data captured by the one or more cameras) that the user is currently wearing the set of glasses).

In some embodiments, an avatar is generated (e.g., at the computer system (e.g., 701); at another computer system (e.g., 901 and/or 901*a* discussed below)) using at least a portion of the facial data captured during the enrollment process. In some embodiments, the avatar (e.g., 919 and/or 1220 discussed below) is displayed using an external computer system (e.g., 901; 901*a*) that is different from the computer system (e.g., 701) (e.g., a computer system different from the computer system that is used to perform the enrollment process) (e.g., a headset device for interacting in an augmented reality, virtual reality, and/or extended reality environment). In some embodiments, the enrollment process is performed using a first device (e.g., 701) (e.g., a smartphone), and the avatar that is generated from the enrollment process is displayed (e.g., in an extended reality environment) using a different device (e.g., 901*a*) (e.g., a headset device). In some embodiments, using a different device for the enrollment process allows the computer system to offload specific enrollment tasks to a device that is equipped to more conveniently facilitate those tasks.

In some embodiments, as a part of displaying the enrollment interface (e.g., 704) for enrolling one or more features of the user (e.g., 700), the computer system (e.g., 701) outputs a seventh prompt (e.g., 720) (e.g., visual, audible, and/or tactile prompt) to capture a pose of a non-facial feature of the user (e.g., a prompt to enroll a non-facial feature such as ears, arms, hands, upper torso, etc.). Outputting a seventh prompt to capture a pose of a non-facial feature of the user provides feedback to a user of the computer system indicating a specific set of instructions for enrolling one or more non-facial features of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, if the user's hair covers their ears, the prompt (e.g., 706; 710; 714; 718; 720) instructs the user to pull their hair back to expose the ears so that the ears can be scanned (e.g., data is captured that represents a size, shape, position, pose, color, depth, or other characteristics of the ear). In some embodiments, the prompt (e.g., 720) instructs the user to wear a device (e.g., a headset) to capture the pose of the non-facial feature. For example, the user (e.g., 700) is instructed to put on a headset to scan their hands. In some embodiments, the user is prompted to move the non-facial feature during enrollment. For example, the user is instructed to flex their fingers while scanning their hands.

Note that details of the processes described above with respect to method 800 (e.g., FIG. 8) are also applicable in an analogous manner to methods 1000, 1100, 1300, and 1400 described below. For example, methods 1000, 1100, 1300, and/or 1400 optionally include one or more of the characteristics of the various methods described above with reference to method 800. For brevity, these details are not repeated below.

FIGS. 9A-9F, 10, and 11 depict examples in which various visual effects associated with a virtual avatar are presented in an XR environment.

Figure 9A:
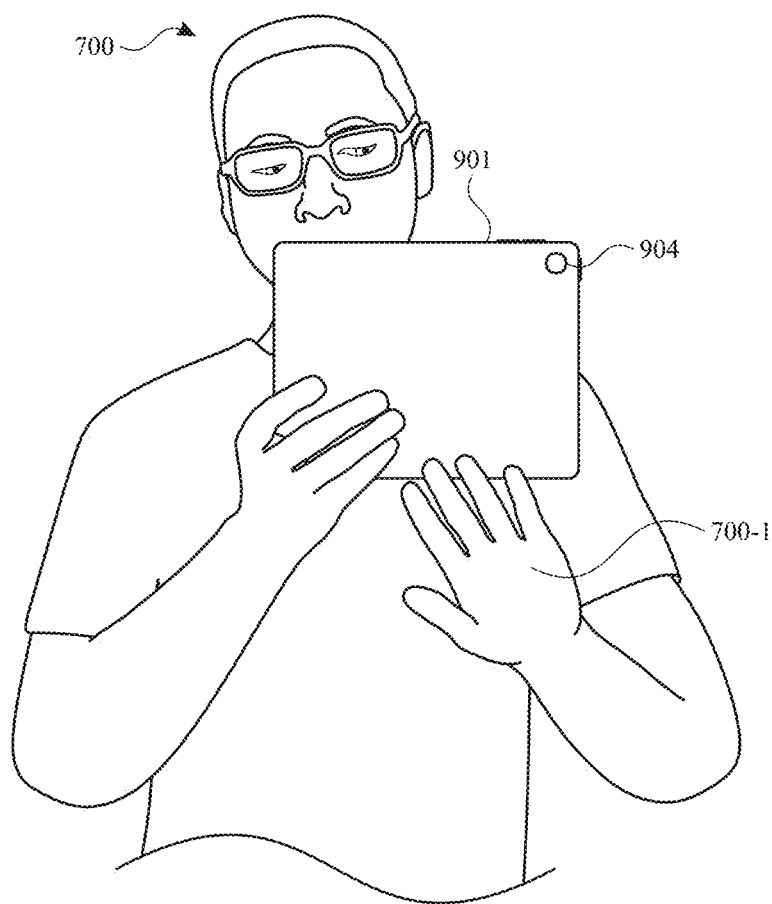
Figure 9B:
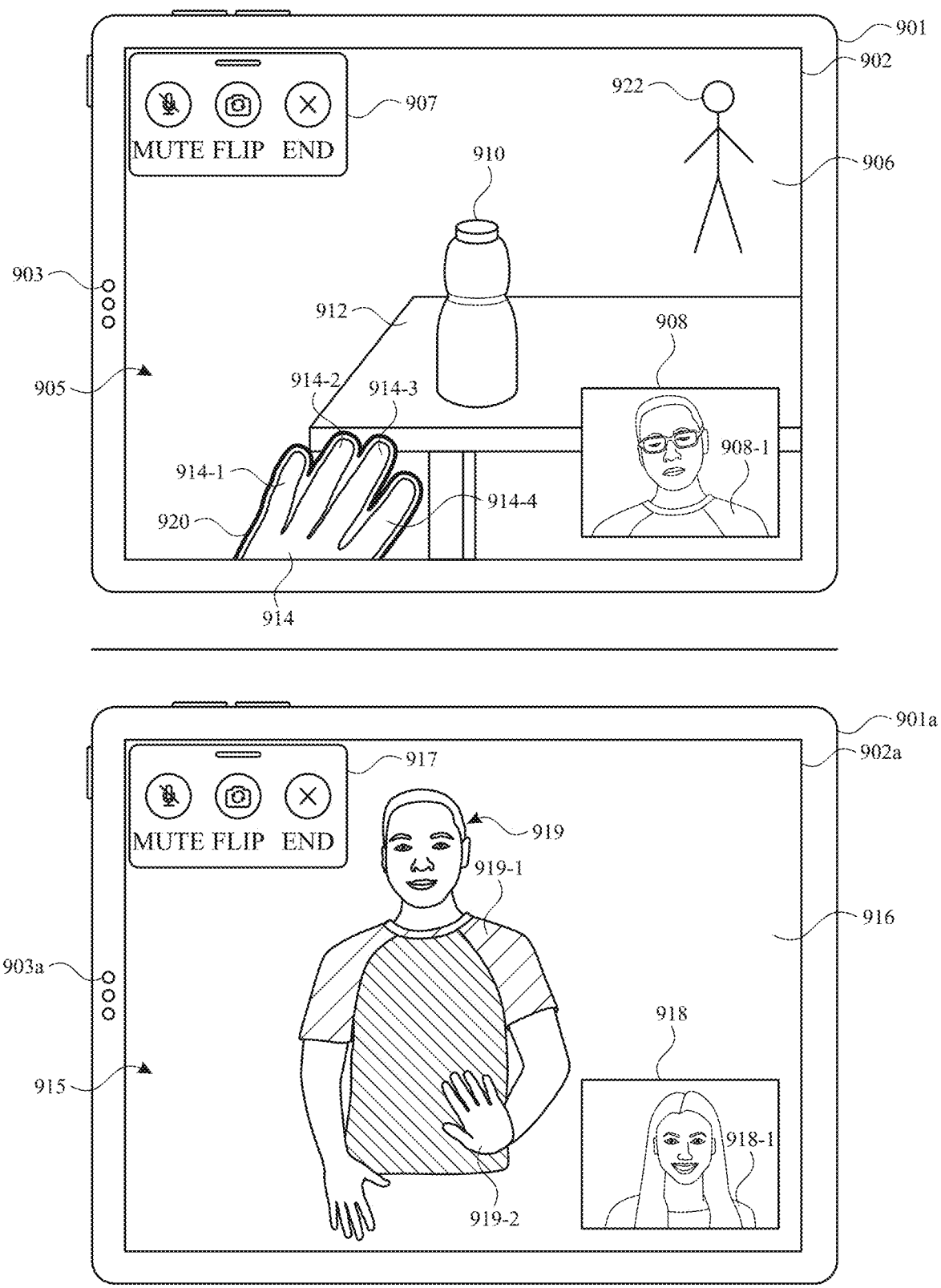

FIG. 9A depicts user 700 holding electronic device 901, which is a computer system (e.g., computer system 101 in FIG. 1) that is used to view the XR environment. Device 901 includes camera 904 (e.g., a rear-facing camera) and, as shown in FIG. 9B, display 902 and camera(s) 903 (e.g., a front-facing camera). In some embodiments, camera 904 is used to capture image and/or depth data of the physical environment for rendering the XR environment using display 902. For example, in FIG. 9A, user 700 is positioning hand 700-1 within the field-of-view of camera 904, for interacting with the XR environment. In some embodiments, device 901 is a tablet. However, device 901 can be one or more alternative electronic devices capable of viewing an XR environment such as, for example, a smartphone or a headset device.

FIG. 9B illustrates device 901 and device 901a displaying interfaces depicting an XR environment. Device 901a is similar to device 901 and includes similar features as device 901, including display 902a, camera(s) 903a, and, in some embodiments, a camera that is positioned on the opposite side of device 901a, similar to camera 904. Device 901a is used by a second user (e.g., a user that is represented by avatar 922 on device 901 and rendering 918-1 on device 901a) to view an XR environment. In some embodiments, user 700 and the second user are in the same physical environment (e.g., the same room). In some embodiments, user 700 and the second user are in different physical environments (e.g., different rooms or geographic locations).

Device 901 displays, via display 902, XR interface 906, which is an interface for an XR session for viewing XR environment 905. XR interface 906 includes a rendering of XR environment 905 using image and/or depth data captured via camera 904 (e.g., camera 904 is currently selected for capturing image/depth data for rendering the XR environment). XR interface 906 optionally includes control options 907 and camera preview 908. Control options 907 are selectable to perform various operations such as muting audio (e.g., audio at device 901), flipping the camera view (e.g., switching from a view that includes data captured from camera 904 to a view that includes data captured from camera 903), and terminating the XR session. Camera preview 908 provides a rendering of the data captured within the field-of-view of a camera is not currently selected for capturing data for rendering the XR environment. For example, in FIG. 9B, camera preview 908 provides rendering 908-1 of user 700 as captured via camera 903.

Device 901 displays XR environment 905 having representations of physical objects that are physically present in the physical environment of user 700 and positioned within the field-of-view of camera 904. The representations of physical objects include bottle 910, table 912, and user hand 914 (with fingers 914-1 to 914-5) (hand 700-1 of user 700 is positioned in front of camera 904 as shown in FIG. 9A). In the embodiment depicted in FIG. 9B, the representations of the physical objects are displayed as pass-through video of the physical environment. For example, in some embodiments, hand 914 is a pass-through video feed of hand 700-1. In some embodiments, device 901 includes a transparent display component and the physical objects are visible through the transparent display component due to its transparent nature. In some embodiments, device 901 renders the physical objects as virtual objects such as, for example, when device 901 is operating in a fully virtual mode (e.g., a VR mode). For example, in such embodiments, hand 914 is a virtual representation of user hand 700-1. The position, pose, movement, or other aspect of hand 914 (and/or fingers 914-1 to 914-5) is determined based on a corresponding position, pose, movement or other aspect of the user's physical hand 700-1. For the sake of simplicity, however, reference is sometimes made to hand 914 (and/or fingers 914-1 to 914-5) when describing the corresponding position, pose, movement, or other aspect of the user's physical hand 700-1 and/or the user's physical fingers.

Device 901 also displays XR environment 905 having virtual objects that are rendered in XR environment by device 901. The virtual objects include highlighting 920 and avatar 922. Avatar 922 is a representation (e.g., a virtual representation) of the second user in XR environment 905. In some embodiments, avatar 922 is rendered at device 901 based on data received at and/or obtained by device 901 and/or device 901a. Highlighting 920 is a visual hand effect (e.g., a visual indicator) displayed around a perimeter of a portion of user's hand 914 that is positioned within the field-of-view of camera 904 and rendered on display 902. The displayed visual hand effect, such as highlighting 920 and others discussed below, indicates that device 901 recognizes user hand 914 as a hand. This provides feedback to user 700 indicating that device 901 is recognizing hand 700-1 and, as such, is responsive to movement of the hand. Various attributes of highlighting 920 are described below. It should be appreciated, however, that these attributes are applicable in an analogous manner to the other visual hand effects described herein, unless specified otherwise.

As the user's hand 700-1 moves within the field-of-view of camera 904, device 901 displays highlighting 920 moving with hand 914. In some embodiments, the amount of highlighting 920 that is displayed changes based on the amount of hand 914 that is visible on display 902. For example, as more of the user's hand 700-1 moves into the field-of-view of camera 904, a greater amount of hand 914 is displayed on display 902 and a greater amount of highlighting 920 is displayed around the perimeter of hand 914 as it moves farther onscreen. Similarly, as the user's hand 700-1 moves out of the field-of-view of camera 904, the amount of hand 914 displayed on display 902 decreases, and less highlighting 920 is displayed around the perimeter of hand 914 as it moves off-screen. In some embodiments, as the user manipulates the pose of their hand 700-1 (e.g., making a fist, making a grabbing gesture, crossing their fingers, etc.), highlighting 920 adapts to changes in the perimeter of hand 914 as the hand pose is manipulated. In some embodiments, device 901 displays other visual hand effects in addition to, or in lieu of, highlighting 920. These other visual hand effects are discussed in greater detail below, including with reference to FIGS. 9C-9F, 10, and 11.

Device 901a displays XR interface 916, which is similar to XR interface 906. XR interface 916 includes control options 917 (similar to control options 907) and camera preview 918 (similar to camera preview 908), which provides rendering 918-1 of the second user as captured via camera 903a. XR interface 916 depicts XR environment 915, which is the XR environment rendered on display 902a and being displayed to the second user during the XR session.

As depicted in FIG. 9B, device 901a displays XR environment 915 having avatar 919. Avatar 919 is a representation of user 700 in XR environment 915. In the embodiments depicted herein, avatar 919 is a virtual avatar having virtual features such as a virtual shirt 919-1 and virtual hands 919-2. In the embodiment depicted in FIG. 9B, XR environment 915 does not include a representation of the physical objects depicted on device 901 (e.g., the second user is in a different physical environment than user 700). As depicted in FIGS. 9B-9F, device 901b displays XR environment 915 with avatar 919 having avatar hand 919-2, which is a virtual representation of user hand 700-1 (e.g., similar to hand 914), but does not display the visual hand effect (e.g., highlighting 920) on avatar hand 919-2.

In some embodiments, one or more attributes of the appearance of avatar 919 are determined based on profile settings, appearance settings, enrollment data, and/or data obtained at device 901 (e.g., data collected from one or more cameras/sensor of device 901 that indicates a position, pose, appearance of user 700 (or portions (e.g., 700-1) thereof) and the like). In some embodiments, data collected from device 901 is transmitted to device 901a and is used to determine various attributes of the appearance of avatar 919 or other aspects of XR environment 915. In some embodiments, one or more attributes of the appearance of avatar 919 are determined based on data collected from device 901a. For example, if user 700 and the second user are in a same room, device 901a can determine a pose of avatar 919 based on a pose of user 700 within a field-of-view of a camera of device 901a, as discussed in greater detail below.

In some embodiments, portions of avatar 919 can be derived from the enrollment of user 700, as discussed above with respect to FIGS. 7A-7H. For instance, in FIG. 9B, avatar 919 is depicted wearing shirt 919-1, which represents the same orange and yellow shirt 709 that user 700 was wearing during the enrollment process, even though user 700 is currently wearing a different shirt, as shown in FIG. 9A and in preview 908-1. Avatar 919 has an appearance that is determined, in some embodiments, based on various appearance settings selected by user 700. For example, avatar 919 is not depicted wearing glasses because user 700 has selected no glasses option 726a discussed above with respect to FIG. 7H.

In some embodiments, the appearance of avatar 919 is determined based on data collected in real time using, for example, device 901. For example, avatar 919 is depicted with its left hand raised to model the pose of user hand 914, which is based on the detected position of user hand 700-1 using camera 904 of device 901. In some embodiments, avatar 919 can have an appearance (e.g., a pose) determined based on data collected from other sources such as, for example, camera 903 of device 901. For example, when user 700 opens their mouth, the open mouth is detected by camera 903. This data is communicated to device 901a, which then displays avatar 919 opening its mouth in a similar manner. As yet another example, device 901 can determine, from the data collected via camera 903, that user 700 is wearing glasses and, in response, update the avatar appearance settings to select a glasses appearance option (e.g., option 726b) for avatar 919. The update to the appearance settings is then detected by device 901a, which then updates display of avatar 919 to include the selected glasses.

FIG. 9C depicts an embodiment similar to that in FIG. 9B, except that user 700 has moved their hand 700-1 toward the bottle (as depicted by the position of hand 914 relative to bottle 910), and the visual hand effect is now depicted as highlighted dot indicators 930 located on the fingertips of fingers 914-1 to 914-5. In response to the detected movement of the user's hand 700-1, device 901 updates display of XR interface 906 to depict hand 914 reaching toward bottle 910, and device 901a updates display of XR interface 916 to depict avatar 919 moving avatar hand 919-2 in a similar manner.

Similar to highlighting 920, highlighted dot indicators 930 are a visual hand effect that changes based on movement of user hand 700-1, specifically, the movement of the fingers. Device 901 displays highlighted dot indicators 930 at the tips of fingers 914-1 to 914-5 of hand 914. As the fingertips move, dot indicators 930 move accordingly.

In some embodiments, device 901 modifies the displayed visual hand effect in response to detecting a particular gesture performed by user's hand 700-1. For example, in FIG. 9D, user 700 performs a pinching gesture with hand 700-1, as depicted by hand 914. In response to detecting the pinching gesture, device 901 increases the displayed size and brightness of highlighted dot indicators 930-1 and 930-2. The modification to the visual hand effect provides feedback to user 700 indicating that the gesture was recognized by device 901. In some embodiments, device 901 is responsive to the gesture by performing one or more operations (other than modifying dot indicators 930-1 and 930-2) that are associated with the gesture.

Figure 9D:
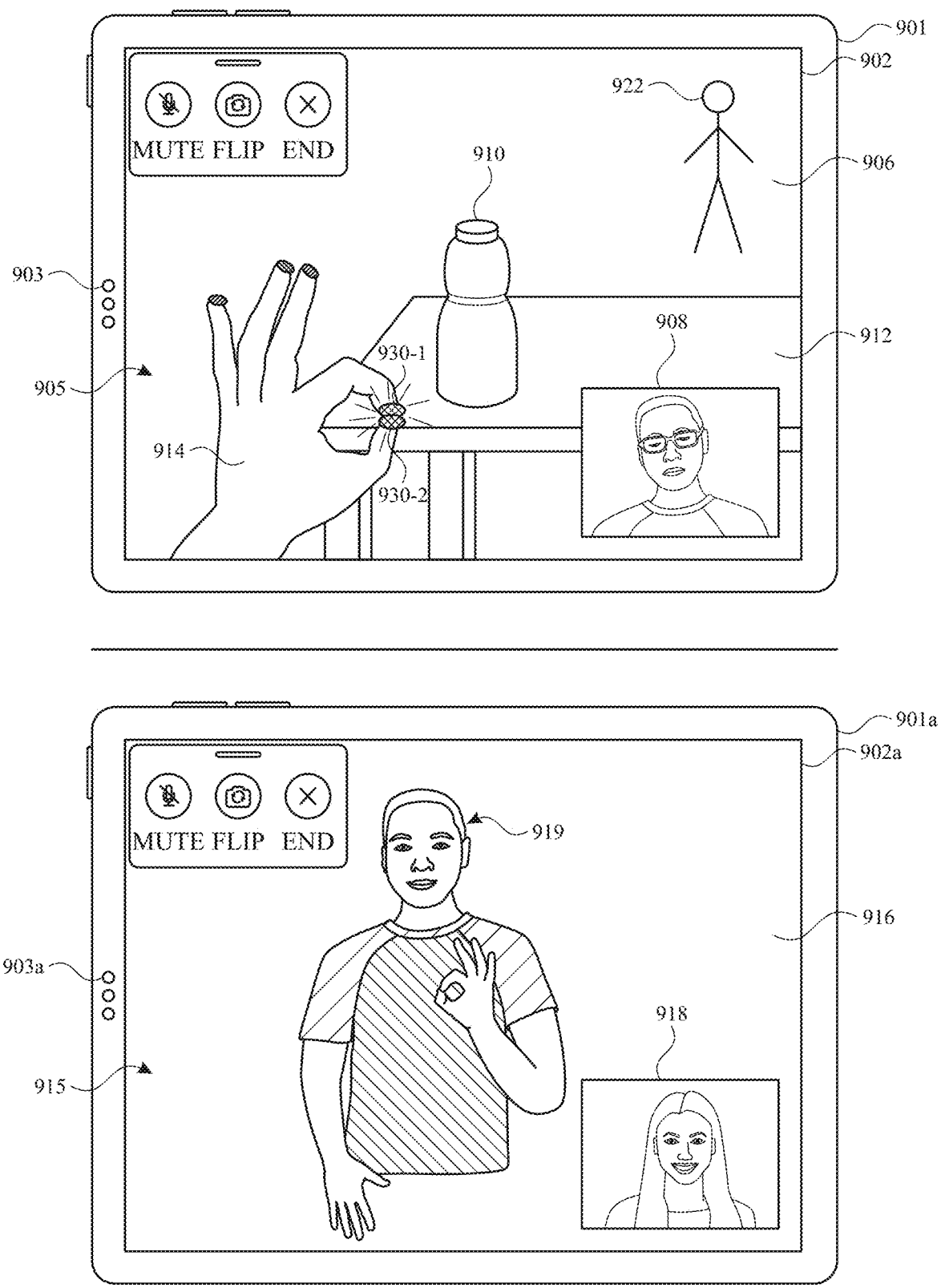

As depicted in FIG. 9D, device 901a modifies the display of XR interface 916 to depict avatar 919 performing the pinch gesture, but does not display the visual hand effect.

Figure 9E:
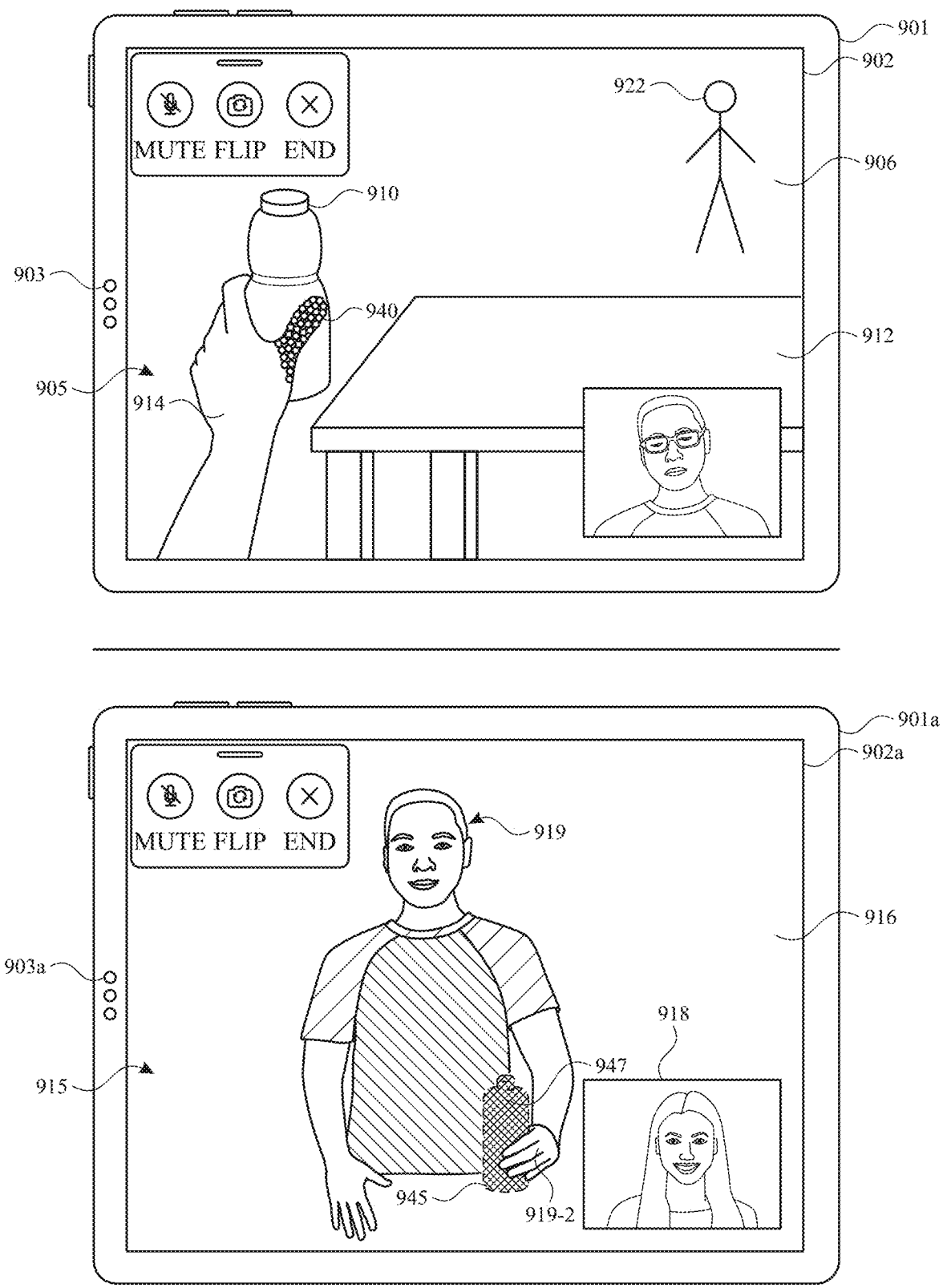

In FIG. 9E, device 901 detects user 700 holding the bottle and, in response, displays hand 914 holding bottle 910. In the embodiments depicted in FIGS. 9E and 9F, the visual hand effect is now displayed as particles 940 appearing on fingers of hand 914. As the user's hand moves, particles trail along with the moving fingers, as shown in FIG. 9F. In some embodiments, particles 940 have an animated appearance, moving or shifting around on respective fingers of hand 914.

As discussed above, data collected from device 901 and/or device 901a can be used to determine the pose of user 700. Similarly, such data can be used to determine that user 700 is holding a physical object, namely, bottle 910. In response to determining that the user is holding a physical object, device 901a updates display of XR interface 916 to include rendered bottle 945 in hand 919-2 of avatar 919.

Rendered bottle 945 is a representation of the physical bottle held by user 700 that does not have the same appearance as bottle 910. For example, rendered bottle 945 is displayed having a different shape than bottle 910. Additionally, rendered bottle 945 is displayed in FIG. 9E having an altered visual characteristic (e.g., represented by hatching 947) that distinguishes it from avatar 919.

In some embodiments, the visual characteristic includes one or more of an amount of blurriness, opacity, color, visual smoothing, attenuation, particle density, resolution, or other visual parameter. The altered visual characteristic distinguishes the appearance of rendered bottle 945 from the appearance of avatar 919 by contrasting one or more of the visual characteristics of rendered bottle 945 with those of avatar 919 (e.g., avatar hand 919-2). For example, rendered bottle 945 can be displayed with greater (or lesser) blurring than avatar 919. As another example, rendered bottle 945 can be displayed having a low amount of particle density such that rendered bottle 945 appears to be a loose collection of particles with more and/or larger gaps between the particles forming the bottle, when compared to avatar 919, which is rendered with densely packed particles with fewer and/or smaller gaps. As another example, rendered bottle 945 can be displayed with less visual smoothing than avatar 919. As yet another example, rendered bottle 945 can be displayed having a more pixelated appearance than avatar 919. It should be appreciated that the foregoing examples of the altered visual characteristic can be switched with respect to the rendered bottle and the avatar. For example, instead of displaying rendered bottle 945 with greater pixelation, rendered bottle 945 can be displayed having a less pixelated appearance than avatar 919.

As user 700 moves the physical bottle, devices 901 and 901a modify their respective XR interfaces based on the detected movement. For example, as user 700 tilts the bottle in FIG. 9F, device 901 detects the movement within the field-of-view of camera 904 and, in response, updates XR interface 906 to display hand 914 tilting bottle 910 accordingly. As hand 914 moves, device 901 also displays particles 940 moving with the fingers of hand 914 and having a trailing effect indicated by particles 940-1.

Device 901a modifies the display of avatar 919 and rendered bottle 945 (e.g., the position of rendered bottle 945) based on the detected movement of the user's hand 700-1 and the bottle. In some embodiments, device 901a displays rendered bottle 945 having the appearance (e.g., shape and altered visual characteristic(s)) depicted in FIG. 9E while moving.

In some embodiments, device 901a displays the rendered bottle having an appearance that is generated based on a library of image data (e.g., images, video, etc.) or other data that is not received from device 901 and can be used to generate a rendering of a physical object being held by user 700. In the embodiment depicted in FIG. 9F, device 901a replaces rendered bottle 945 with rendered bottle 948. Rendered bottle 948 has a different shape than bottle 910 (and rendered bottle 945), because rendered bottle 948 is rendered based on the library of image data, rather than data (e.g., image data) captured for the physical bottle. In some embodiments, rendered bottle 948 has a realistic appearance. In some embodiments, rendered bottle 948 has an altered visual characteristic. In some embodiments, rendered bottle 948 has the same visual characteristics as avatar 919.

In some embodiments, device 901 selectively displays visual hand effects (e.g., highlighting 920, dot indicators 930, particles 940) based on a position, pose, or shape of the user's hand 700-1. For example, in some embodiments, device 901 does not display the visual hand effect unless user hand 700-1 is within a predefined region of the camera (e.g., camera 904) field-of-view, or if the hand is otherwise determined to be relevant (e.g., the user is looking at their hand). In some embodiments, device 901 does not display the visual hand effect depending on the currently enabled visual hand effect and the pose of user hand 700-1. For example, if the user's hand is in the shape of a fist, the user's fingertips are not displayed and, therefore, device 901 does not display a dot indicators 930 on the hand's fingertips. In some embodiments, device 901 does not display any visual hand effect when hand 700-1 has a particular pose (e.g., a fist) or is otherwise determined not to be relevant to a particular scenario.

In some embodiments, the device (e.g., device 901) is a headset device and/or the camera (e.g., camera 904) has a position that is offset (e.g., vertically) from the display (e.g., display 902), and the visual hand effects are displayed having a predicted line-of-sight so that the visual hand effects align with the user's line of sight so as to appear to be positioned on the user's hand when viewing the visual hand effects on the display.

Additional descriptions regarding FIGS. 9A-9F are provided below in reference to methods 1000 and 1100 described with respect to FIGS. 10 and 11 below.

FIG. 10 is a flowchart of an exemplary method 1000 for displaying visual indicators on a hand of a virtual avatar in an XR environment, in accordance with some embodiments. The method occurs at a computer system (e.g., 101; 901) (e.g., a smartphone, tablet, head-mounted display generation component) that is in communication with a display generation component (e.g., 902) (e.g., a visual output device, a 3D display, a display having at least a portion that is transparent or translucent on which images can be projected (e.g., a see-through display), a projector, a heads-up display, a display controller) and one or more sensors (e.g., 903; 904) (e.g., an infrared camera; a depth camera, a visible light camera).

The computer system (e.g., 901) displays (1002), via the display generation component (e.g., 902), a user feature indicator interface (e.g., 906). The user feature indicator interface includes (1004) a set of one or more visual indicators (920; 930; 940) (e.g., virtual objects and/or visual effects) that correspond to a detected location (e.g., the location is detected via the one or more sensors) of a set of one or more features (914-1; 914-2; 914-3; 914-4; 914-5) (e.g., a hand; a portion of a hand; one or more fingers; one or more portions of one or more fingers (e.g., finger tips, knuckles)) of a hand (e.g., 700-1; 914) of a user (e.g., 700) (e.g., a hand of a user of the computer system) in a physical environment. The set of one or more visual indicators are displayed in an extended reality environment (e.g., 905) and have a first displayed position that corresponds to (e.g., co-located with; is based on; overlaps) a first detected location of the set of one or more features of the hand (e.g., 700-1) of the user in the physical environment (e.g., 920 displayed around hand 914 in FIG. 9B; 930 displayed on fingers 914-1 to 914-5 in FIG. 9C; 940 displayed on finger 914-5 in FIG. 9E). In some embodiments, the set of one or more visual indicators are displayed in the interface so as to, from the perspective of the user, overlap (e.g., overlay) the first detected location so as to appear to the user to be positioned on at least one feature of the set of one or more features of the user's hand. In some embodiments, the computer system displays the visual indicators in the user's line of sight (e.g., predicted/estimated line of sight) between the user and the user's hand (or portion(s) thereof) so as to appear, to the user, to be positioned on the user's hand (or portion(s) thereof) in the extended reality environment. In some embodiments, the location of the user's hand is detected using the one or more sensors, and the perspective of the user is a line-of-sight perspective that is different from the perspective of the one or more sensors (e.g., a camera) that capture the position of the user's hand in the physical environment.

The computer system (e.g., 901) detects (1006), via the one or more sensors (e.g., 904), movement (e.g., a change in position; a change in pose; a hand gesture; etc.) of at least one feature (e.g., 914-1; 914-2; 914-3; 914-4; 914-5) of the hand (e.g., 700-1; 914) of the user (e.g., 700) in the set of one or more features of the hand of the user. In some embodiments, the computer system receives data (e.g., depth data, image data, sensor data (e.g., image data from a camera)) indicating a change in position (e.g., physical position, orientation, gesture, movement, etc.) of at least a portion of the user's hand in the physical environment.

In response to detecting the movement of at least one feature (e.g., 914-1; 914-2; 914-3; 914-4; 914-5) of the hand (e.g., 700-1; 914) of the user (e.g., 700) in the set of one or more features of the hand of the user, the computer system (e.g., 901) updates (1008) display of the user feature indicator interface (e.g., 906).

As a part of updating display of the user feature indicator interface (e.g., 906), and in accordance with a determination that the set of one or more features (e.g., 914-1; 914-2; 914-3; 914-4; 914-5) of the hand (e.g., 914) of the user (e.g., 700) moves (in some embodiments, from the first detected location) to a second detected location in the physical environment (e.g., FIG. 9D) (e.g., the user's hand(s) is detected moving from a first location in the physical environment to a second location in the physical environment), the computer system (e.g., 901) displays (1010), via the display generation component (e.g., 902), the set of one or more visual indicators (e.g., 920; 930; 940) having a second displayed position in the extended reality environment that corresponds to the second detected location of the set of one or more features of the hand of the user in the physical environment. In some embodiments, displaying the set of one or more visual indicators includes displaying one or more of the visual indicators moving so as to appear, to the user, to move in concert with one or more features of the user's hand. In some embodiments, the set of one or more visual indicators are displayed positioned in the interface so as to, from the perspective of the user, overlap (e.g., overlay) the second detected location so as to appear to the user to be positioned on at least one feature of the set of one or more features of the user's hand.

As a part of updating display of the user feature indicator interface (e.g., 906), and in accordance with a determination that the set of one or more features (e.g., 914-1; 914-2; 914-3; 914-4; 914-5) of the hand (e.g., 914) of the user (e.g., 700) moves (in some embodiments, from the first detected location) to a third detected location in the physical environment different from the second detected location (e.g., FIG. 9E), the computer system (e.g., 901) displays (1012), via the display generation component (e.g., 902), the set of one or more visual indicators (e.g., 920; 930; 940) having a third displayed position in the extended reality environment that corresponds to the third detected location of the set of one or more features of the hand of the user in the physical environment, wherein the third displayed position in the extended reality environment is different from the second displayed position in the extended reality environment. Displaying the set of one or more visual indicators having a second or third displayed position in the extended reality environment that corresponds to the second or third detected location of the set of one or more features of the hand of the user in the physical environment provides feedback to a user of the computer system indicating a detected location of the set of one or more features of the hand of the user and increases the accuracy of the displayed visual indicators in the extended reality environment by accounting for movement of the set of one or more features of the hand of the user in the physical environment. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, as a part of detecting the movement of the at least one feature (e.g., 914-1; 914-2; 914-3; 914-4; 914-5) of the hand (e.g., 914) of the user (e.g., 700) in the set of one or more features of the hand of the user, the computer system (e.g., 901) detects (e.g., via the one or more sensors (e.g., 904)) a magnitude and/or direction of the movement of the at least one feature of the hand of the user in the set of one or more features of the hand of the user. In some embodiments, displaying the set of one or more visual indicators (e.g., 920; 930; 940) having the second displayed position in the extended reality environment includes displaying the set of one or more visual indicators moving from the first displayed position to the second displayed position, wherein the movement from the first displayed position to the second displayed position is based on (e.g., a characteristic of the movement (e.g., the speed, the magnitude, the direction) is based on) the detected magnitude and/or direction of the movement of the at least one feature of the hand of the user in the set of one or more features of the hand of the user. In some embodiments, displaying the set of one or more visual indicators having the third displayed position in the extended reality environment includes displaying the set of one or more visual indicators moving from the first displayed position to the third displayed position, wherein the movement from the first displayed position to the third displayed position is based on (e.g., a characteristic of the movement (e.g., the speed, the magnitude, the direction) is based on) the detected magnitude and/or direction of the movement of the at least one feature of the hand of the user in the set of one or more features of the hand of the user. Displaying movement of the set of one or more visual indicators moving in the extended reality environment from the first displayed position to the second or third displayed position based on the detected magnitude and/or direction of the movement of the at least one feature of the hand of the user in the set of one or more features of the hand of the user provides feedback to a user of the computer system indicating a detected location of the set of one or more features of the hand of the user and increases the accuracy of the displayed visual indicators by accounting for the magnitude and/or direction of movement of the at least one feature of the hand of the user in the set of one or more features of the hand of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, one or more of the visual indicators (e.g., 920; 930; 940) are displayed moving so as to appear, to the user, to move in concert with one or more corresponding features (e.g., 914-1; 914-2; 914-3; 914-4; 914-5) of the user's hand (e.g., 914).

In some embodiments, the display generation component includes a transparent display component (e.g., a see-through display upon which content is displayed (e.g., projected), and through which the physical environment is visible due to the transparent nature of the display), and the set of one or more visual indicators (e.g., 920; 930; 940) are displayed at a location on the transparent display component (e.g., the visual indicators are projected onto the transparent display so that the user's hand is visible through the transparent display, and the visual indicators appear to be positioned on the user's hand by virtue of their being projected onto the transparent display) that is predicted (e.g., estimated; by the computer system (e.g., 901)) to be along a line-of-sight between the eyes of the user (e.g., 700) and a detected location of the set of one or more features (e.g., 914-1; 914-2; 914-3; 914-4; 914-5) of the hand (e.g., 914) (e.g., the computer system displays the visual indicators in the user's line of sight (e.g., predicted/estimated line of sight) between the user and the user's hand (or portion(s) thereof) so as to appear, to the user, to be positioned on the user's hand (or portion(s) thereof) in the extended reality environment). Displaying the set of one or more visual indicators at a location on the transparent display component that is predicted to be along a line-of-sight between the eyes of the user and a detected location of the set of one or more features of the hand provides feedback to a user of the computer system indicating a detected location of the set of one or more features of the hand of the user and increases the accuracy of the displayed visual indicators by accounting for a visual offset from the user's line of sight and a perspective of the sensors that detected the location of the set of one or more features of the hand of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the location of the user's hand (e.g., 914) is detected using the one or more sensors (e.g., 904), and the perspective of the user (e.g., 700) is a line-of-sight perspective that is different from the perspective of the one or more sensors (e.g., a camera) that capture the position of the user's hand in the physical environment.

In some embodiments, displaying the set of one or more visual indicators (e.g., 920; 930; 940) includes displaying, in the extended reality environment (e.g., 905), a virtual highlighting effect (e.g., 920) at a location that corresponds to (e.g., is at or near) a perimeter region (e.g., see FIG. 9B) of the set of one or more features of the hand (e.g., 914) of the user (e.g., 700) (e.g., the visual indicator is displayed as highlighting around at least a portion of the user's hand(s)). Displaying a virtual highlighting effect at a location that corresponds to a perimeter region of the set of one or more features of the hand of the user provides feedback to a user of the computer system indicating a detected location of the at least a portion of the set of one or more features of the hand of the user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, as a part of displaying the set of one or more visual indicators (e.g., 920; 930; 940) having the second displayed position in the extended reality environment (e.g., 905), the computer system (e.g., 901) displays the set of one or more visual indicators (e.g., 940) moving from the first displayed position to the second displayed position (e.g., FIG. 9F). In some embodiments, as a part of displaying the set of one or more visual indicators (e.g., 920; 930; 940) having the second displayed position in the extended reality environment (e.g., 905), the computer system displays a second set of one or more visual indicators (e.g., 940-1) (e.g., particles; a particle effect; a residual trail of indicators that are left in the wake of the movement of the set of one or more visual indicators) that follow (e.g., that trail; that move along the same path behind the set of one or more visual indicators) the set of one or more visual indicators as the set of one or more visual indicators move from the first displayed position to the second displayed position (e.g., FIG. 9F).

In some embodiments, as a part of displaying the set of one or more visual indicators (e.g., 920; 930; 940) having the third displayed position in the extended reality environment (e.g., 905), the computer system (e.g., 901) displays the set of one or more visual indicators (e.g., 940) moving from the first displayed position to the third displayed position. In some embodiments, as a part of displaying the set of one or more visual indicators having the third displayed position in the XR environment, the computer system displays a third set of one or more visual indicators (e.g., 940-1) (e.g., particles; a particle effect; a residual trail of indicators that are left in the wake of the movement of the set of one or more visual indicators) that follow (e.g., that trail; that move along the same path behind the set of one or more visual indicators) the set of one or more visual indicators as the set of one or more visual indicators moves from the first displayed position to the third displayed position (e.g., FIG. 9F). Displaying a second or third set of one or more visual indicators that follow the set of one or more visual indicators as they move from the first displayed position to the second or third displayed position provides feedback to a user of the computer system indicating a detected location and movement of the user's fingers. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the at least one feature of the hand (e.g., 914) of the user (e.g., 700) is a tip of a finger (e.g., 914-1; 914-2; 914-3; 914-4; 914-5) of the hand of the user. In some embodiments, displaying the set of one or more visual indicators (e.g., 920; 930; 940) includes displaying, in the extended reality environment (e.g., 905), a highlighting effect (e.g., 930) (e.g., a highlighted dot or orb) at a location that corresponds to (e.g., is at or near) the tip of the finger of the hand of the user (e.g., the visual indicator is displayed as a highlighted dot or orb that is located at the user's fingertip(s)) (e.g., multiple fingers are detected, and a visual indicator is displayed as a highlighted dot or orb that is located at each of the fingertips of the detected fingers).

Displaying a highlighting effect at a location that corresponds to the tip of the finger of the hand of the user provides feedback to a user of the computer system indicating a detected location of the user's fingertip. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 901) displays the user feature indicator interface (e.g., 906) in accordance with a determination that the device (e.g., computer system; 901) is prepared to accept input based on a position and/or movement of the hand (e.g., 914) of the user (e.g., 700) (e.g., the hand of the user is in a position and/or orientation where it is available to provide inputs to the electronic device) (e.g., the set of one or more features of the hand of the user satisfy a set of indicator display criteria (e.g., the computer system only displays the visual indicators when the user's hand(s) is active (e.g., when the user is looking at their hands, the user's hands are in a predefined pose, the user's hands are located at a predefined region of the one or more sensors and/or display))). Displaying the one or more visual indicators in accordance with a determination that the hand of the user is prepared to accept input based on a position and/or movement of the hand of the user conserves computational resources by eliminating the need to perform computations for tracking the hands of the user and displaying the visual indicators unless the device is prepared to accept input based on the position and/or movement of the user's hand. Reducing computational workload enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination that the hand (e.g., 914) of the user (e.g., 700) is not active (e.g., a determination that the hand of the user does not meet movement criteria (e.g., sufficient degree of movement) and/or a determination (e.g., predication) that the user's gaze is not currently directed at the hand of the user and/or that the hand of the user is currently not within the predicted field of view of the user), the computer system (e.g., 901) ceases to display the visual indicators (e.g., 920; 930; 940) or, in some embodiments, the user feature indicator interface (e.g., 906).

In some embodiments, the device (e.g., computer system; 901) is prepared to accept input based on a position and/or movement of the hand (e.g., 914) of the user (e.g., 700) when a determination is made that the user is looking at the hand (e.g., the computer system determines and/or predicts that the user's gaze is directed to a determined position of the user's hand).

In some embodiments, the device (e.g., computer system; 901) is prepared to accept input based on a position and/or movement of the hand (e.g., 914) of the user (e.g., 700) when a determination is made that the hand has at least one of a set of one or more predefined poses (e.g., the computer system determines that the user's hand has a predefined pose (e.g., hand opened, fingers spread, finger pointing, etc.)).

In some embodiments, the feature indicator interface (e.g., 906) is displayed in accordance with a determination that a first set of display criteria is met (e.g., the first set of display criteria is met when a mixed reality display mode is enabled). In some embodiments, in accordance with a determination that a second set of display criteria is met (e.g., the second set of display criteria is met when a virtual reality display mode is enabled), the computer system (e.g., 901) displays, via the display generation component (e.g., 902), a virtual representation of the hand of the user in a virtual reality environment (e.g., the hand of the user is displayed completely virtual in the VR environment). Displaying a virtual representation of the hand of the user in a virtual reality environment provides feedback to a user of the computer system about the detected location of the user's hands in the virtual environment. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the virtual environment, the display generation component (e.g., 902) is opaque and does not pass-through light or video from the physical environment in at least a portion of the display generation component that is displaying the virtual representation of the hand. In some embodiments, when the second set of display criteria is met, the computer system (e.g., 901) forgoes displaying the set of one or more visual indicators (e.g., 920; 930; 940). In some embodiments, when the second set of display criteria is met, the computer system continues to display the set of one or more visual indicators with the virtual representation of the hand of the user.

In some embodiments, the computer system (e.g., 901) is in communication with an external computer system (e.g., 901a) (e.g., an external computer system that is associated with a first user (e.g., that is being operated by the first user (e.g., a user that is in a communication session (e.g., an extended reality, virtual reality, and/or video conference) with the user of the computer system))). While the computer system (e.g., 901) is displaying, via the display generation component (e.g., 902), the user feature indicator interface (e.g., 906) including the set of one or more visual indicators (e.g., 920; 930; 940), the external computer system (e.g., 901a) displays a virtual representation of the hand (e.g., 919-2) of the user in the extended reality environment (e.g., 915) (in some embodiments, without displaying the set of one or more visual indicators and/or image data (e.g., camera image data) of the hand). Displaying the user feature indicator interface including the set of one or more visual indicators while the external computer system displays a virtual representation of the hand of the user in the extended reality environment provides feedback to a user of the external computer system indicating where the hands of the user of the computer system are located and how they are moving while also providing visual feedback to the user of the computer system about the location and movement of their hands. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the user (e.g., 700) of the computer system (e.g., 901) views the extended reality environment (e.g., 905) with the visual indicators (e.g., 920; 930; 940) positioned on a pass-through view of the user's hand (e.g., 914) (e.g., due to the transparent nature of the display; due to a video pass-through of the user's hand), and other users viewing the extended reality environment (e.g., 915) view a virtual representation of the user's hands (e.g., 919-2) (e.g., with or without the visual indicators, and without displaying image data of the physical hand).

In some embodiments, the computer system (e.g., 901) detects, via the one or more sensors (e.g., 904), at least one gesture (e.g., FIG. 9D) from a set of predefined gestures (e.g., a pointing gesture, a snapping gesture, a pinching gesture, a grabbing gesture, a predefined movement of the user's hand and/or finger(s)). In response to detecting the at least one gesture, the computer system modifies an appearance of the set of one or more visual indicators (e.g., 930-1; 930-2) (e.g., increasing a brightness, changing a shape of the visual indicator(s), displaying additional visual indicators and/or portions thereof, removing displayed portions of the visual indicators). Modifying an appearance of the set of one or more visual indicators in response to detecting the at least one gesture provides feedback to a user of the computer system indicating whether or not a gesture is recognized by the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the modified appearance of the set of one or more visual indicators (e.g., 930-1; 930-2) is temporary. For example, a temporary increase in brightness of the visual indicators to indicate the computer system (e.g., 901) recognized the gesture. In some embodiments, the computer system continues to move the visual indicators based on the movement of the user's hand (e.g., 914), and also modifies the appearance of the visual indicators when one of the gestures is recognized.

In some embodiments, as a part of displaying the set of one or more visual indicators (e.g., 920; 930; 940), the computer system (e.g., 901) displays, via the display generation component (e.g., 902) (e.g., an opaque display; a non-transparent display; a display upon which a video feed of the user's hands is displayed, and through which the physical environment is not visible due to the opaque nature of the display), the visual indicators positioned on a video feed (e.g., a pass-through video feed) of the set of one or more features of the hand (e.g., 914) of the user (e.g., 700) in the physical environment. Displaying the set of one or more visual indicators positioned on a video feed of the set of one or more features of the hand of the user in the physical environment provides feedback to a user of the computer system indicating the detected location of the set of one or more features of the hand of the user relative to a video feed of the set of one or more features of the hand. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1000 (e.g., FIG. 10) are also applicable in an analogous manner to methods 800, 1100, 1300, and 1400 described herein. For example, methods 800, 1100, 1300, and/or 1400 optionally include one or more of the characteristics of the various methods described above with reference to method 1000. For brevity, these details are not repeated below.

FIG. 11 is a flowchart illustrating an exemplary method 1100 for displaying objects having different visual characteristics in an XR environment, in accordance with some embodiments. The method occurs at computer system (e.g., 101; 901*a*) (e.g., a smartphone, tablet, head-mounted display generation component) that is in communication with a display generation component (e.g., 902*a*) (e.g., a visual output device, a 3D display, a display having at least a portion that is transparent or translucent on which images can be projected (e.g., a see-through display), a projector, a heads-up display, a display controller) and an external computer system (e.g., 901) that is associated with a first user (e.g., 700) (e.g., that is being operated by the first user (e.g., a user that is in a communication session (e.g., an extended reality and/or video conference) with the user of the computer system).

The computer system (e.g., 901*a*) displays (1102) in an extended reality environment (e.g., 915), via the display generation component (e.g., 902*a*), a representation (e.g., 919) (e.g., an avatar; a virtual avatar (e.g., the avatar is a virtual representation of at least a portion of the first user); in some embodiments, the virtual avatar is displayed, in an extended reality environment, in lieu of the first user)) of the first user (e.g., 700) (e.g., a user in a physical environment). The representation of the first user is displayed in the extended reality environment (e.g., 915) having a first pose (e.g., physical position, orientation, gesture, etc.) and a shape (e.g., a three-dimensional shape) based on a shape of at least a portion of the first user (e.g., avatar 919 has avatar hands 919-2 based on the shape of the user's hand (e.g. 914) (e.g., having a same pose as the user's hand)). The shape of the representation of the first user is visualized (e.g., visually represented) with a first set of visual characteristics (e.g., a set of one or more visual parameters of the rendering of the avatar; an amount of blurriness, opacity, color, visual smoothing, attenuation/density, resolution, etc.).

In some embodiments, the representation of the first user (e.g., 919) is displayed having a mode (e.g., virtual presence mode) in which the first user (e.g., 700) is represented in the extended reality environment (e.g., 915) by a rendering (e.g., a virtual avatar) that has anthropomorphic features (e.g., a head, arms, legs, hands, etc.)) or as an animated character (e.g., a human; a cartoon character; an anthropomorphic construct of a non-human character such as a dog, a robot, etc.)). In some embodiments, the representation of the first user is displayed having a same pose of the first user. In some embodiments, the representation of the first user is displayed having a portion (e.g., 919-2) that has a same pose as a corresponding portion (e.g., 914) of the first user. In some embodiments, the representation of the first user is an avatar (e.g., virtual avatar) that changes pose in response to a detected change in pose of at least a portion of the first user in the physical environment. For example, the avatar is displayed in the extended reality environment (e.g., 915) as an animated character that mimics the detected movements of the first user in the physical environment.

The computer system (e.g., 901*a*) receives (1104) first data (e.g., depth data, image data, sensor data (e.g., image data from a camera)) that includes data indicating a change in pose (e.g., physical position, orientation, gesture, movement, etc.) of the first user (e.g., 700) (e.g., a change, in the physical environment, in the pose of the first user). In some embodiments, the data includes sensor data (e.g., image data from a camera (e.g., 904; 903); movement data from an accelerometer; location data from a GPS sensor; data from a proximity sensor; data from a wearable device (e.g., a watch, a headset device)). In some embodiments, the sensor can be connected to, or integrated with, the computer system (e.g., 901a; 901). In some embodiments, the sensor can be an external sensor (e.g., a sensor of a different computer system (e.g., another user's electronic device)).

In response to receiving the first data, the computer system (e.g., 901a) updates (1106) an appearance of the representation of the first user (e.g., 919) in the extended reality environment (e.g., 915) (e.g., based on at least a portion of the first data). Updating the appearance of the representation of the first user in the extended reality environment includes, in accordance with a determination that the first data includes an indication (e.g., data indicating a change in pose) that a first portion of the first user (e.g., 914) (e.g., the first user's physical hand) is contacting (e.g., touching, holding, grasping, manipulating, interacting with, etc.) an object (e.g., 910) (e.g., a physical object in the physical environment) (in some embodiments, the first portion of the first user was not previously determined to be contacting the object in the physical environment before receiving the first data), the computer system (e.g., 901a) displays (1108) in the extended reality environment, the items reference in steps 1110 and 1112 of method 1100.

At 1110, the computer system (e.g., 901a) displays the representation of the first user (e.g., 919) having a second pose (e.g., a pose in FIG. 9E) based on (e.g., at least one of a magnitude or direction of) the change in pose (e.g., FIG. 9E) of the first user (e.g., 700) (e.g., the pose of the avatar is updated by a magnitude and/or in a direction corresponding to the magnitude and/or direction of the change in pose of the first user). The shape of the representation of the first user (e.g., 919) is visualized with the first set of visual characteristics (e.g., as depicted in FIG. 9E).

At 1112, the computer system (e.g., 901a) displays a representation of the (e.g., 945; 948) object having a shape (e.g., a three-dimensional shape) based on a shape of at least a portion of the object (e.g., 910) (e.g., the representation of the object has a shape that is similar to that of the physical object or a portion thereof). The shape of the representation of the object is visualized with a second set of visual characteristics (e.g., 947) different from the first set of visual characteristics. Displaying the representation of the first user having the second pose based on the change in pose of the first user and visualized with the first set of visual characteristics, and displaying the representation of the object having a shape based on a shape of at least a portion of the object and visualized with a second set of visual characteristics different from the first set of visual characteristics provides feedback to a user of the computer system that the first user is contacting the object in the physical environment and that the object is separate from the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the physical object (e.g., 910) has a relative position with respect to the first portion of the first user (e.g., 914) in the physical environment, and the representation of the object (e.g., 945) is displayed, in the extended reality environment (e.g., 915), having the same relative position with respect to a representation of the first portion (e.g., 919-2) of the first user in the extended reality environment.

In some embodiments, as a part of updating an appearance of the representation of the first user (e.g., 919) in the extended reality environment (e.g., 915), and in accordance with a determination that the first data does not include an indication that the first portion (e.g., 914) of the first user (e.g., 700) is contacting the object (e.g., 910) (e.g., the first user is not contacting the object) (e.g., user 700 is not holding the bottle in FIG. 9D), the computer system (e.g., 901a) displays, in the extended reality environment (e.g., 915), the representation of the first user (e.g., 919) having the second pose (e.g., FIG. 9D) based on the change in pose of the first user (e.g., 700). The shape of the representation of the first user (e.g., 919) is visualized with the first set of visual characteristics. The computer system also forgoes displaying, in the extended reality environment (e.g., 915), the representation of the object (e.g., 945) having a shape based on a shape of at least a portion of the object and visualized with a second set of visual characteristics different from the first set of visual characteristics (e.g., the representation of the object is not displayed in the extended reality environment if the user is not contacting the object (e.g., see FIG. 9D)). Displaying the representation of the first user having the second pose based on the change in pose of the first user and forgoing displaying the representation of the object having a shape based on a shape of at least a portion of the object and visualized with a second set of visual characteristics different from the first set of visual characteristics provides feedback to a user of the computer system that the first user is not contacting the object in the physical environment and reduces computational workload by eliminating computations for rendering the representation of the object in the extended reality environment. Providing improved feedback and reducing computational workload enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first set of visual characteristics includes a first amount of blurring (e.g., a first degree of blurriness or sharpness) of the shape of the representation of the first user (e.g., 919), and the second set of visual characteristics (e.g., 947) includes a second amount of blurring of the shape of the representation of the object (e.g., 945) that is different from (e.g., greater than; less than) the first amount of blurring (e.g., the shape of the representation of the object is displayed with greater blurriness (less sharpness), or with less blurriness (greater sharpness), than the shape of the representation of the first user). Displaying the shape of the representation of the first user visualized with a different amount of blurring than the shape of the representation the object provides feedback to a user of the computer system that the first user is contacting the object in the physical environment and that the object is separate (e.g., distinct) from the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first set of visual characteristics includes a first density of particles (e.g., an amount and/or size of spacing between the particles) comprising the shape of the representation of the first user (e.g., 919), and the second set of visual characteristics (e.g., 947) includes a second density of particles comprising the shape of the representation of the object (e.g., 945) that is different from (e.g., greater than; less than) the first density (e.g., the shape of the representation of the first user is displayed with greater particle density (e.g., smaller and/or fewer gaps between the particles), or less particle density (e.g., larger and/or more gaps between the particles), than the shape of the representation of the object). Displaying the shape of the representation of the first user visualized with a different density of particles than the shape of the representation the object provides feedback to a user of the computer system that the first user is contacting the object in the physical environment and that the object is separate (e.g., distinct) from the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first set of visual characteristics includes a first amount of visual smoothing (e.g., image smoothing) of the shape of the representation of the first user (e.g., 919), and the second set of visual characteristics (e.g., 947) includes a second amount of visual smoothing of the shape of the representation of the object (e.g., 945) that is different from (e.g., greater than; less than) the first amount of visual smoothing (e.g., the shape of the representation of the first user is displayed with greater visual smoothing (e.g., image smoothing), or less visual smoothing, than the shape of the representation of the object). Displaying the shape of the representation of the first user visualized with a different amount of visual smoothing than the shape of the representation the object provides feedback to a user of the computer system that the first user is contacting the object in the physical environment and that the object is separate (e.g., distinct) from the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first set of visual characteristics includes a first amount of pixilation (e.g., resolution; a size of particles comprising the shape of the representation of the first user) of the shape of the representation of the first user (e.g., 919), and the second set of visual characteristics (e.g., 947) includes a second amount of pixelation of the shape of the representation of the object (e.g., 945) that is different from (e.g., greater than; less than) the first amount of pixelation (e.g., the shape of the representation of the first user is displayed with less pixelation (e.g., higher resolution), or greater pixelation (e.g., lower resolution), than the shape of the representation of the object). Displaying the shape of the representation of the first user visualized with a different amount of pixelation than the shape of the representation the object provides feedback to a user of the computer system that the first user is contacting the object in the physical environment and that the object is separate (e.g., distinct) from the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the object (e.g., 948) is based, at least in part, on data (e.g., image data; model data) from a library of objects (e.g., a library accessible by the computer system and/or by the external computer system). In some embodiments, the computer system (e.g., 901*a*) and/or the external computer system (e.g., 901) determines an identity of the object (e.g., 910) and determines matching data from the library of objects based on the identity of the object. Displaying the representation of the object based on data from a library of objects provides feedback to a user of the computer system that the object is identified from the library of objects and is displayed using data from the library of objects, which reduces computational workload by eliminating computations for rendering the representation of the object based on other data (e.g., data detected by the computer system in real time). Providing improved feedback and reducing computational workload enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the first user (e.g., 919-1) is based, at least in part, on data (e.g., image data) from an enrollment process for the first user (e.g., 700) (e.g., an enrollment process such as that discussed with respect to FIGS. 7A-7H). In some embodiments, the computer system (e.g., 901*a*) displays the representation of the first user (e.g., 919) having an appearance based on the image data from the enrollment process, rather than image data from another source (e.g., a library of images). Displaying the representation of the first user based on data from an enrollment process for the first user enhances the user-system experience by providing a more realistic appearance of the first user and enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 901*a*) is displaying, via the display generation component (e.g., 902*a*), the representation of the first user (e.g., 919) and the representation of the object (e.g., 945), the external computer system (e.g., 901) forgoes displaying the representation of the first user (e.g., 919) and the representation of the object (e.g., 945) (e.g., the first user sees a pass-through view of their hand and of the physical object, instead of a representation of the first user's hand and a representation of the object).

In some embodiments, while displaying the representation of the object (e.g., 945) having a first position (e.g., in FIG. 9E) and the representation of the first user (e.g., 919;

919-2) having the second pose (e.g., in FIG. 9E), the computer system (e.g., 901a) receives second data that includes data indicating movement of at least the first portion of the first user (e.g., 914). In response to receiving the second data, the computer system updates display of the representation of the object (e.g., 945; 948) and the representation of the first user (e.g., 919; 919-2) in the extended reality environment (e.g., 915). As a part of updating display of the representation of the object and the representation of the first user, the computer system displays the representation of the first user (e.g., 919) having a third pose based on the movement of at least the first portion of the user (e.g., the pose in FIG. 9F) (e.g., the representation of the first user moves based on the movement of the first user's hand) (e.g., the shape of the representation of the first user is visualized with the first set of visual characteristics). The computer system also displays the representation of the object (e.g., 945; 948) having a second position based on the movement of at least the first portion of the user (e.g., the position in FIG. 9F) (e.g., the representation of the object moves with the first user's hand) (e.g., the shape of the object is visualized with the second set of visual characteristics). Displaying the representation of the first user having the third pose and displaying the representation of the object having the second position based on the movement of at least the first portion of the user provides feedback to a user of the computer system that the first user continues to contact the object and has moved the object to a different position. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1100 (e.g., FIG. 11) are also applicable in an analogous manner to methods 800, 1000, 1300, and 1400 described herein. For example, methods 800, 1000, 1300, and/or 1400 optionally include one or more of the characteristics of the various methods described above with reference to method 1100. For brevity, these details are not repeated below.

FIGS. 12A-12E, 13A-13B, and 14 depict examples of various presentation modes associated with a user represented in an XR environment.

Figure 12A:
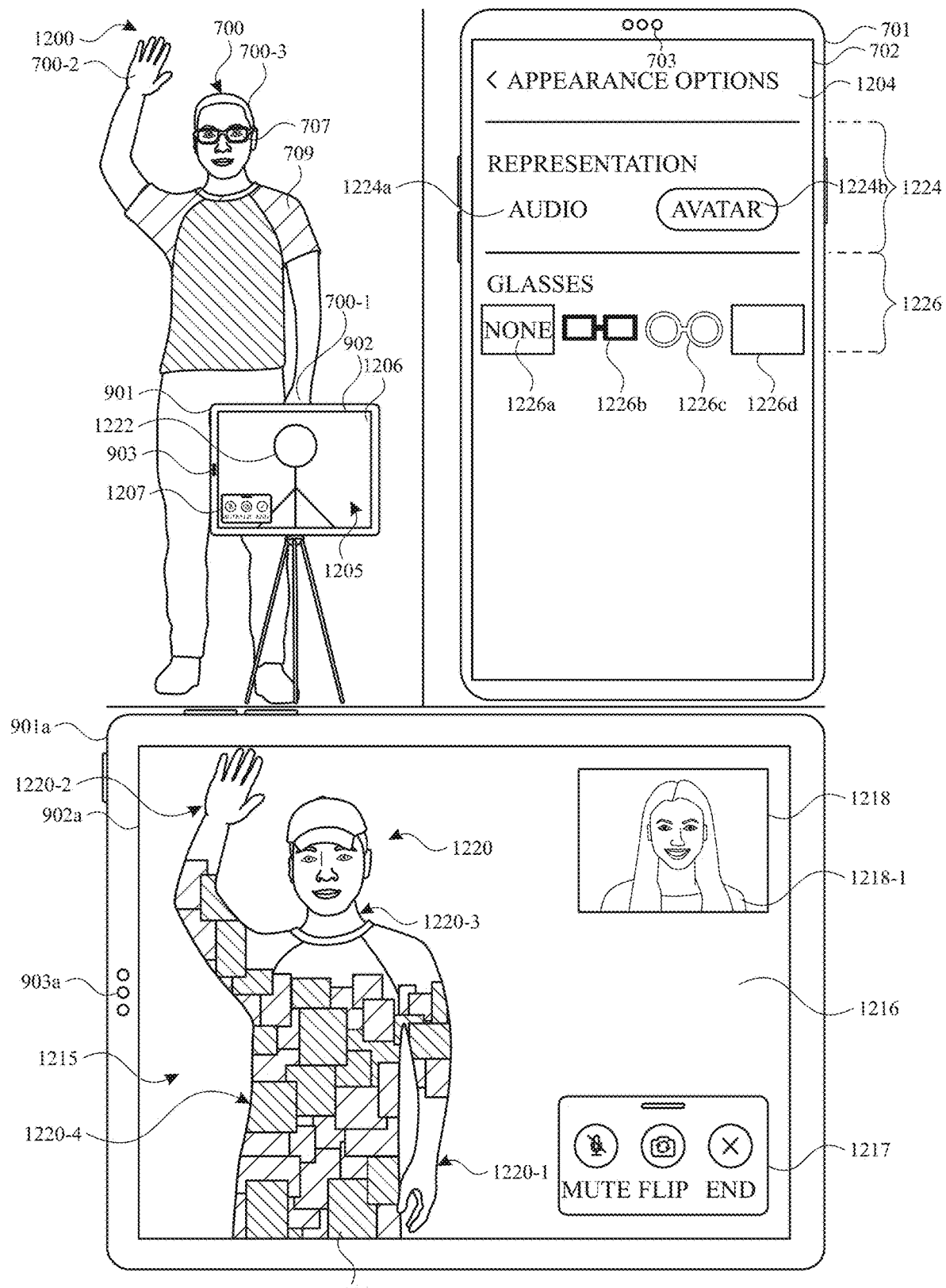
Figure 13A:
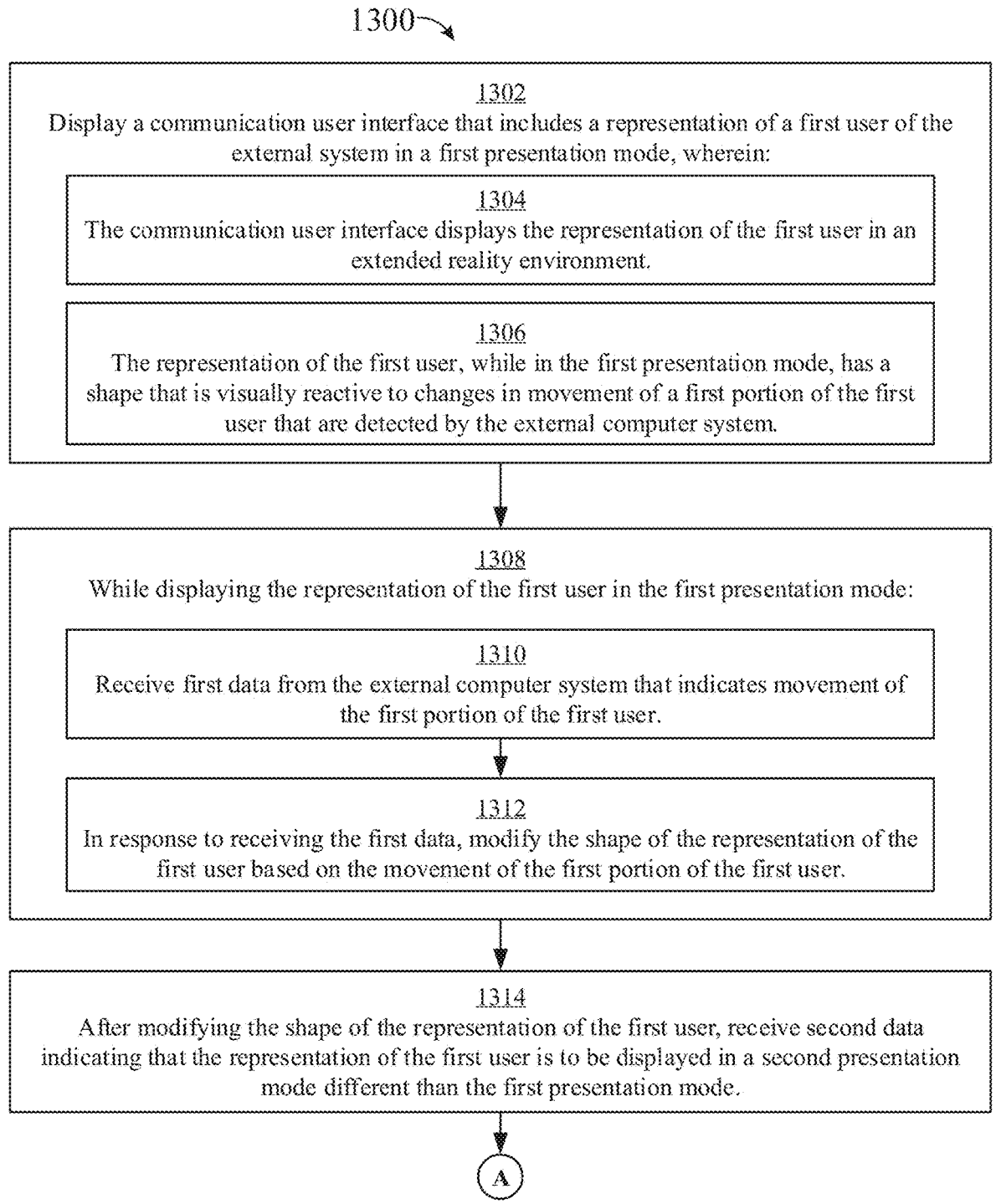
FIGS. 13A and 13B are a flow diagram illustrating an exemplary method for switching between different presentation modes associated with a user represented in an XR environment, in accordance with some embodiments.
Figure 13B:
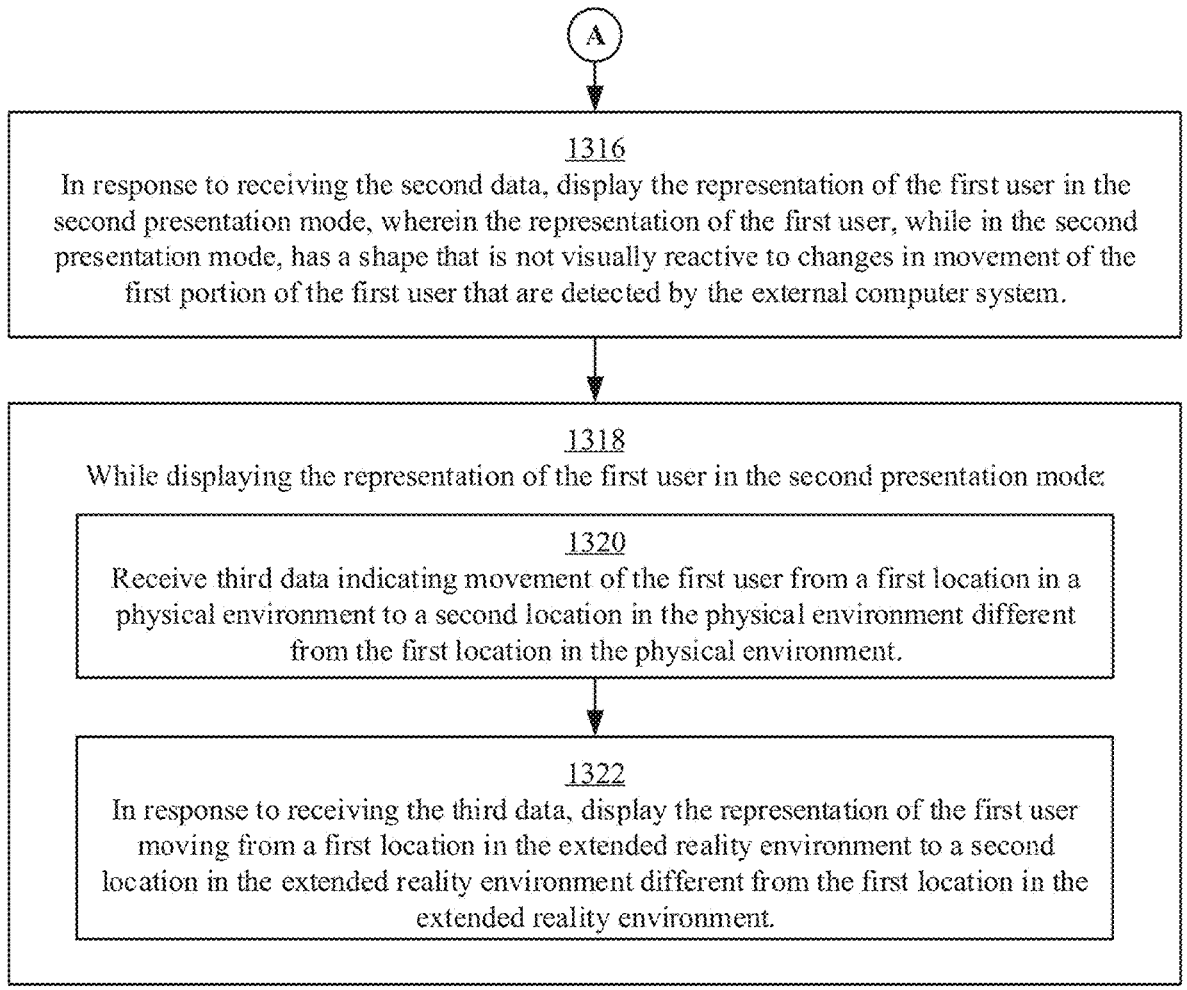

FIG. 12A depicts physical environment 1200, which includes user 700 standing in front of device 901 (at least partially within the field-of-view of camera 904) with head 700-3 facing forward and hand 700-2 raised while participating in an XR session with the second user in a manner similar to that discussed above with respect to FIGS. 9A-9F. Device 901 displays, via display 902, XR interface 1206, which is similar to XR interface 906. XR interface 1206 includes XR environment 1205 (similar to XR environment 905) and control options 1207 (similar to control options 907). As shown in FIG. 12A, XR environment 1205 currently includes avatar 1222 (similar to avatar 922), which represents the presence of the second user in the XR environment.

FIG. 12A also depicts device 901a displaying, via display 902a, XR interface 1216, which is similar to XR interface 916. XR interface 1216 includes preview 1218 with rendering 1218-1 of the second user, who is positioned within the field-of-view of camera 903a. XR interface 1216 also displays XR environment 1215 (similar to XR environment 915) and control options 1217. In the embodiment depicted in FIG. 12A, XR environment 1215 currently includes a representation of user 700 in the form of avatar 1220 (similar to avatar 919). Devices 901 and 901a display XR interfaces 1206 and 1216, respectively, in a manner similar to that described above with respect to FIGS. 9A-9F. For the sake of brevity, these details are not repeated below.

In the embodiment depicted in FIG. 12A, avatar 1220 includes portions 1220-1, 1220-2, 1220-3, and 1220-4, which are displayed as a virtual representation of user 700. Portion 1220-1 forms the avatar's left forearm and hand and has an appearance (e.g., position, pose, orientation, color, shape, etc.) that is determined based on various aspects (e.g., position, pose, orientation, color, movement, etc.) of the user's left forearm and hand 700-1 that are detected, for example, by camera 904 of device 901. Similarly, portion 1220-2 forms the avatar's right forearm and hand and has an appearance that is determined based on various aspects of the user's right forearm and hand 700-2. Portion 1220-3 forms the avatar's head and shoulders region and has an appearance that is determined based on various aspects of user's head 700-3 and shoulders. Portion 1220-4 forms the remaining portions of avatar 1220 and has a visual appearance that is different from that of portions 1220-1 to 1220-3. For example, as illustrated in FIG. 12A, portion 1220-4 has an appearance formed of elements 1225 having various colors and, optionally, shapes (optionally different shapes; optionally overlapping or not overlapping), whereas portions 1220-1 to 1220-3 have an appearance that is visually representative of (e.g., similar to, having a shape of one or more human features) the corresponding portions of user 700. For example, portion 1220-2 has the same shape and pose as the corresponding portions of user 700 (e.g., the user's right forearm and hand 700-2). In some embodiments, portion 1220-4 (or sub-portions thereof) has an amorphous shape formed of elements 1225. In some embodiments, portion 1220-4 has a shape of one or more human features such as a torso, elbow, legs, and the like. In some embodiments, elements 1225 (or a subset thereof) create a visual effect (e.g., a bokeh effect) that is shaped to form one or more human features. In some embodiments, the colors of elements 1225 in portion 1220-4 correspond to the colors of the clothes being worn by user 700 in physical environment 1200. In some embodiments, the colors of elements 1225 in portion 1220-4 are automatically selected by device 901 and/or device 901a. For example, in some embodiments, the colors of elements 1225 in portion 1220-4 are selected to match the colors of clothes (e.g., shirt 709) worn by user 700 during the enrollment process described above with respect to FIGS. 7A-7H. In some embodiments, the colors of elements 1225 in portion 1220-4 are selected to have a warm color palette, whereas colors of other aspects (e.g., system elements) of device 901 or device 901a, such as a representation of a virtual assistant, are selected to have a cool color palette. In some embodiments, portion 1220-4 is not displayed. In some embodiments, only parts of portion 1220-4 are displayed, such as a subset of elements 1225 that are immediately adjacent portions 1220-1, 1220-2, and/or 1220-3. In some embodiments, portion 1220-4 represents portion(s) of avatar 1220 for which the appearance (e.g., pose) of corresponding portion(s) of user 700 is unknown, not detected, or there is insufficient data (or less than a threshold amount of data) to determine the appearance.

As indicated above, device 901a displays a representation of user 700 (e.g., avatar 1220) in XR environment 1215 based, at least in part, on various appearance settings that dictate various aspects of the appearance of the representation of user 700. For reference, these appearance settings are depicted in appearance settings interface 1204, which is illustrated as being displayed by device 701 (e.g., using display 702). Appearance settings interface 1204 includes various appearance settings, similar to those depicted in FIG. 7H, for controlling the appearance of a representation of user 700 in an XR environment. For example, appearance settings interface 1204 includes representation options 1224 (similar to representation options 724) and glasses options 1226 (similar to glasses options 726). As shown in FIG. 12A, avatar option 1224b and no glasses option 1226a are selected. As such, the representation of user 700 has the appearance of an avatar that does not include glasses, as shown by avatar 1220 displayed on device 901a.

Figure 12B:
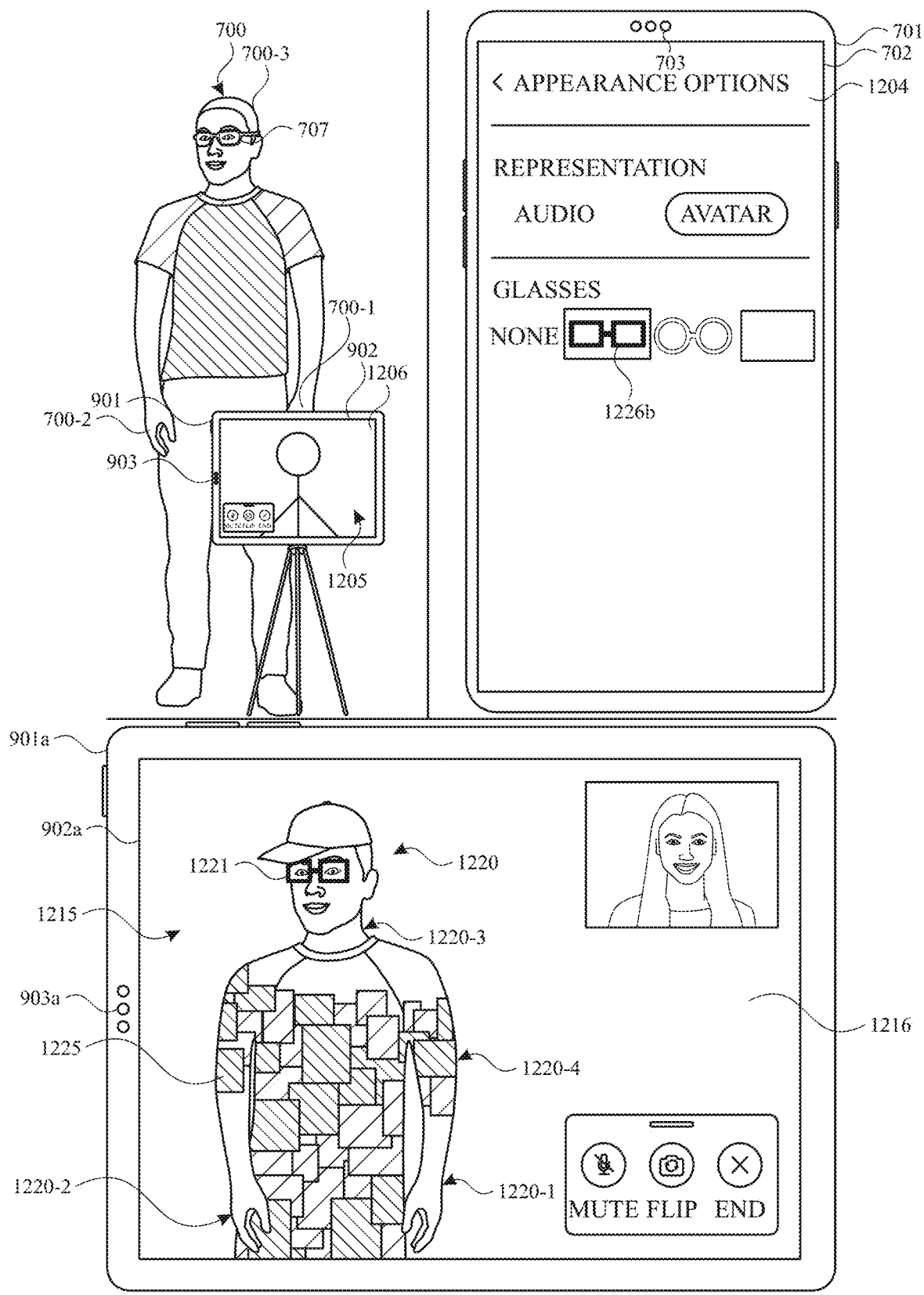

In FIG. 12B, user 700 has turned their head 700-3 and lowered their right arm, placing hand 700-2 at their side, and rectangle frame option 1226b is selected in appearance settings interface 1204. Accordingly, device 901a updates XR interface 1216 to display avatar 1220 having an updated appearance based on the change in pose of user 700 and the updated appearance settings. Specifically, device 901a displays avatar 1220 with portion 1220-2 lowered as depicted in FIG. 12B, and portion 1220-3 is updated to show the avatar's head turned to the side and glasses 1221 displayed on the avatar's face.

In some embodiments, the portions of avatar 1220 change shape based on the change in pose of user 700. For example, portion 1220-2 is displayed with the hand relaxed in FIG. 12B, changing the displayed shape (e.g., outline; geometry; contour) of portion 1220-2 when compared to the shape of portion 1220-2 when in the raised position with fingers spread, as shown in FIG. 12A. In some embodiments, as user 700 moves, some portions of the user move in or out of the field-of-view of camera 904, causing different portions of the user to be detected (e.g., by device 901), and avatar 1220 is updated accordingly. For example, in FIG. 12B, a greater amount of the user's right forearm is visible to camera 904 and, as a result, the shape of portion 1220-2 is changed because a greater amount of the avatar's right forearm is represented in portion 1220-2 (consequently, less of portion 1220-4 is displayed because some of the elements 1225 that were previously represented in portion 1220-4 are no longer displayed and the corresponding portion of the avatar 1220 is now included in the forearm in portion 1220-2).

In some embodiments, glasses 1221 include a frames portion, but do not include arms or temple pieces, as depicted in FIG. 12B. In some embodiments, glasses 1221 have an appearance that corresponds to the selected glasses option. For example, in FIG. 12B, glasses 1221 are rectangle frames that have a same appearance as the glasses depicted in rectangle frames option 1226b. In some embodiments, glasses 1221 have a default appearance that is not based on the appearance of user's glasses 707. In some embodiments, glasses 1221 have an appearance that corresponds to glasses 707 detected on user 700. In some embodiments, the glasses option is selected automatically (e.g., by device 701, device 901, and/or device 901a). For example, device 901 detects glasses 707 on the user's face and, in response, changes the appearance settings to select rectangle frames option 1226b. In some embodiments, rectangle frames option 1226b is selected because that option most accurately depicts the appearance of glasses 707 on user 700. In some embodiments, rectangle frames option 1226b is manually selected by user 700. In some embodiments, the display of avatar glasses (e.g., 1221) are automatically enabled (and one of the glasses options is selected) (e.g., by device 701) in response to detecting glasses 707 on the user's face during at least a portion of the enrollment process.

Figure 12C:
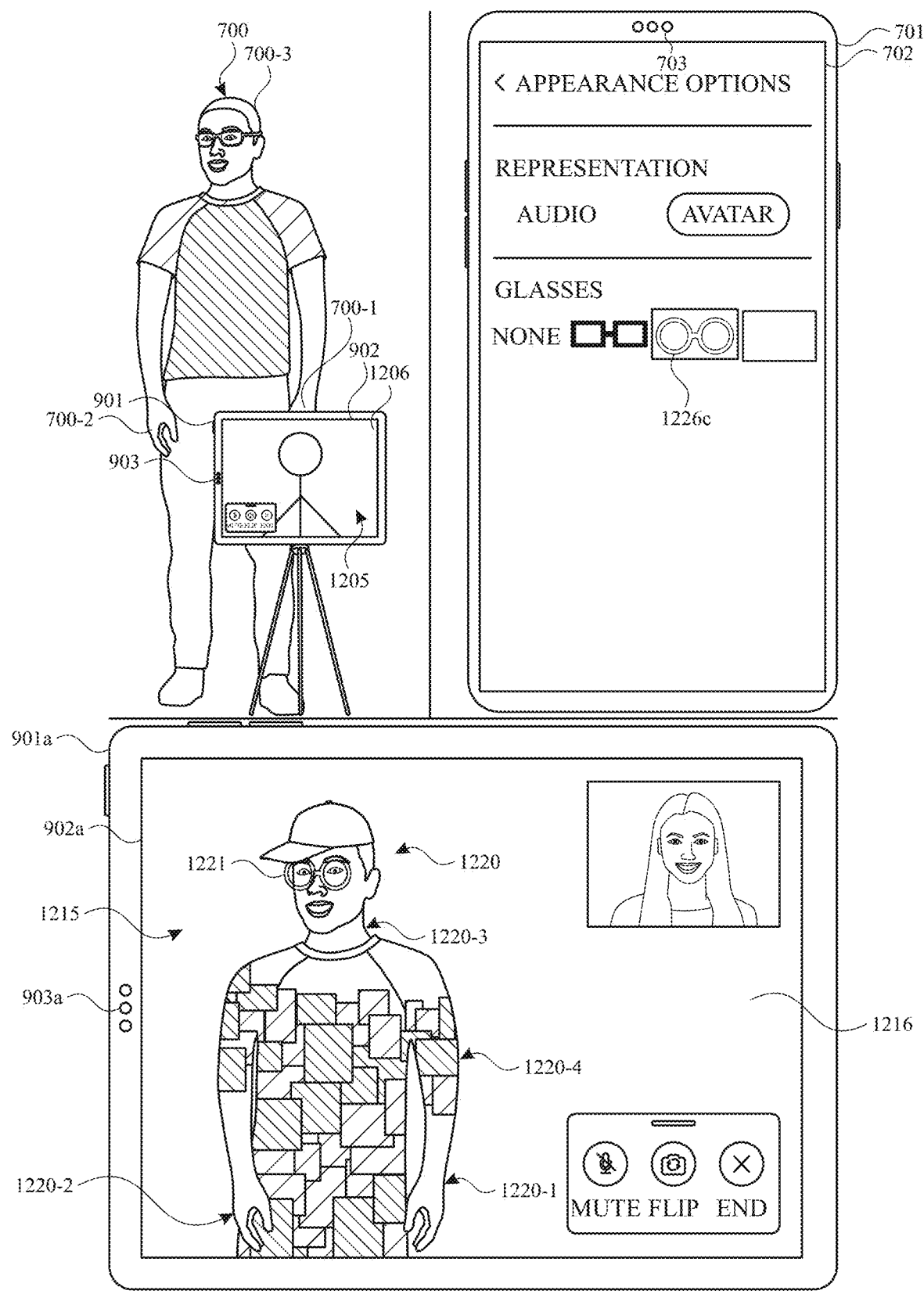

In FIG. 12C, user 700 remains still while talking, and translucent frame option 1226c is selected in appearance settings interface 1204. Accordingly, device 901a updates XR interface 1216 to display avatar 1220 having an updated appearance based on the updated appearance settings. Specifically, device 901a displays avatar 1220 with glasses 1221 having an appearance that is updated to a translucent frame, as displayed on the avatar's face in FIG. 12C. Because user 700 has not moved, device 901a does not change the shape of portions 1220-1 to 1220-4. User 700 is talking, however, so device 901a displays the avatar's mouth moving without changing the shape of the portions of avatar 1220. Additionally, device 901a does not change the appearance of any portions of avatar 1220 (including portion 1220-4 and elements 1225) in response to audio detected (e.g., by device 901 and/or device 901a) from user 700 talking.

Figure 12D:
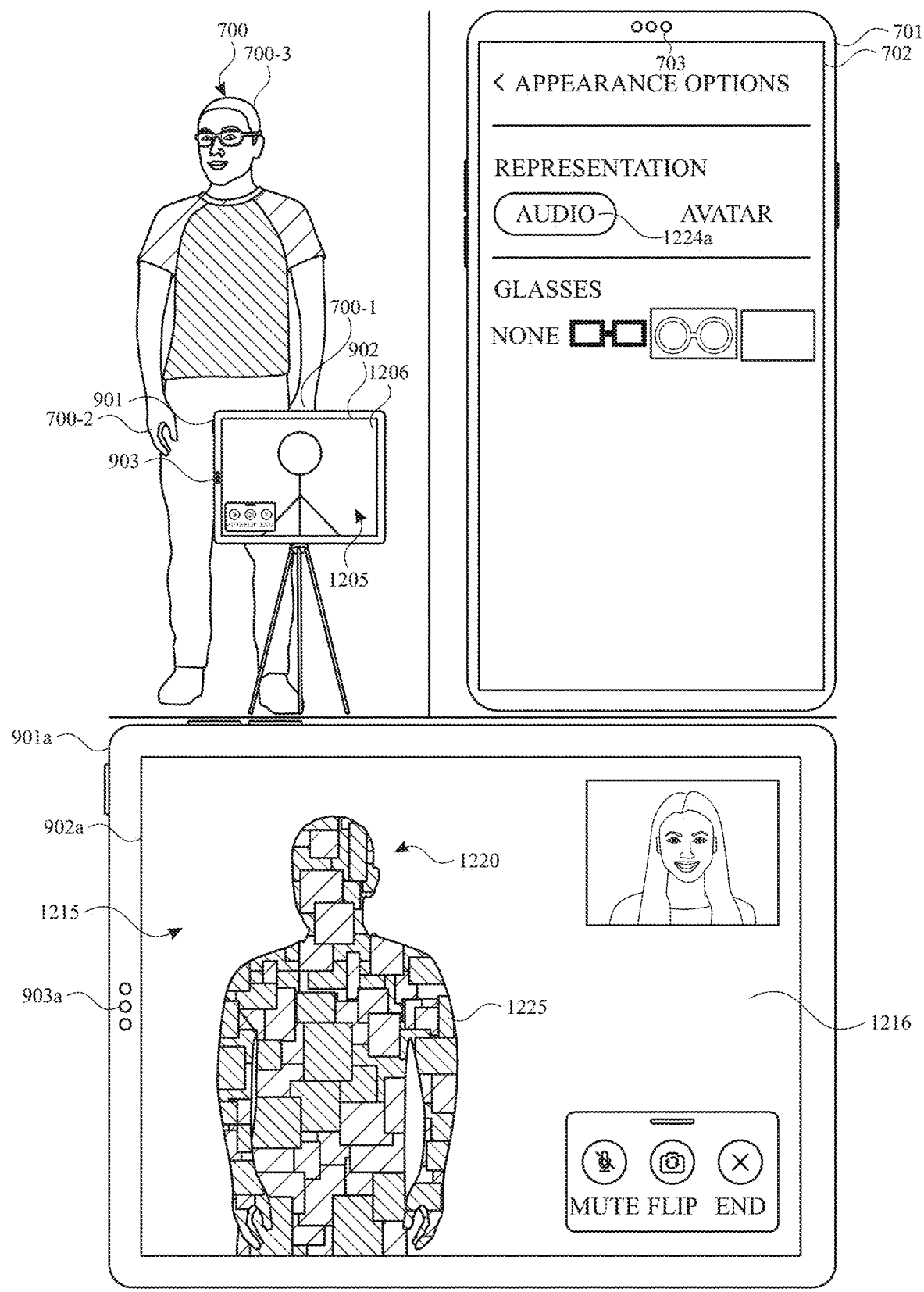

In FIG. 12D, audio option 1224a is selected, and device 901a updates XR interface 1216 to display the representation of user 700 transitioning from an avatar representation to an audio representation. In FIG. 12D, the transition is depicted as an animation in which portions 1220-1 to 1220-3 are replaced or overlaid by elements 1225, and elements 1225 begin moving around to change the shape of the representation of user 700 to a two- or three-dimensional shape (e.g., a cube, sphere, or orb) that represents user 700 in XR environment 1215, when the user is in the audio representation mode. During the transition, elements 1225 move together, while some elements begin overlapping and other elements disappear as the shape of the representation transitions to the cube shape depicted in FIG. 12E.

When user 700 is participating in the XR session in an audio presentation mode, audio from user 700 is communicated to the device(s) of other users participating in the XR session (e.g., device 901a of the second user), and the representation of user 700 is displayed as an audio representation that does not change shape in response to movement of user 700. For example, as user 700 moves (e.g., walking, raising hand 700-2, and/or turning head 700-3) the audio representation maintains the same geometric shape. In some embodiments, device 901a displays the audio representation moving around XR environment 1215 based on the movement of user 700 in physical environment 1200. For example, as user 700 walks around physical environment 1200, device 901a optionally displays the audio representation (e.g., audio representation 1230-1) moving (e.g., changing locations) similarly in XR environment 1215. Various examples of the audio representation of user 700 are depicted in FIG. 12E, each associated with a different set of conditions detected in the physical environment. Each example of the audio representation is displayed as a cube. However, it should be appreciated that the audio representation can have different forms such as a sphere, an orb, an amorphous three-dimensional shape, and the like.

In the embodiments described herein, reference is made to a specific audio representation, such as audio representation 1230-1, to describe various features of the audio representation of user 700 in XR environment 1215. It should be appreciated, however, that the reference to a specific audio representation is not intended to limit the described feature to the specific audio representation. Accordingly, the various features described with respect to a specific audio representation can be applied analogously to other audio representations described herein (e.g., audio representations 1230-2 to 1230-4). For the sake of brevity, these details are not repeated herein.

In some embodiments, audio representation 1230-1 is formed of a collection of particles 1235 having different sizes and colors. In some embodiments, particles 1235 are similar to elements 1225. In some embodiments, the colors of particles 1235 correspond to the colors of the clothes being worn by user 700 in physical environment 1200 and/or the skin tone of user 700. In some embodiments, the colors of particles 1235 are automatically selected by device 901 and/or device 901a. For example, in some embodiments, the colors are selected to match the colors of clothes (e.g., shirt 709) worn by user 700 during the enrollment process described above with respect to FIGS. 7A-7H. In some embodiments, the colors of particles 1235 are selected to have a warm color palette, whereas colors of other aspects (e.g., system elements) of device 901 or device 901a, such as a representation of a virtual assistant, are selected to have a cool color palette. In some embodiments, particles 1235 can have different forms such as rectangles, squares, circles, spheres, and the like.

In some embodiments, particles 1235 move along the surface(s) of audio representation 1230-1, changing size and, optionally, shape. For example, in some embodiments, particles 1235 change position and size as part of a gradual animation of audio representation 1230-1. In this manner, audio representation 1230-1 changes appearance over time independent of whether or not user 700 is speaking. In some embodiments, audio representations 1230-1, 1230-2, 1230-3, and 1230-4 represent different appearances of a single audio representation as depicted at different points in time, and the particles 1235 forming the audio representation have different positions, sizes, and colors, thereby illustrating the changed appearance of the audio representation over time as a result of the animation.

As mentioned above, the audio representations depicted in FIG. 12E correspond to different appearances of the audio representation, based on the position and/or behavior of user 700 in physical environment 1200, as determined at different moments in time. For example, device 901a displays XR interface 1216, with audio representation 1230-1 representing user 700 in XR environment 1215, when user 700 is at location 1200-1, facing away from the camera (e.g., camera 904) of device 901 as illustrated in FIG. 12E. Similarly, device 901a displays audio representation 1230-2 when user 700 is at location 1200-2. Device 901a displays audio representation 1230-3 when user 700 is at location 1200-3. Device 901a displays audio representation 1230-4 when user 700 is at location 1200-4. In some embodiments, the different locations (e.g., 1200-1 to 1200-4) in physical environment 1200 correspond to different depths from the camera of device 901. For example, location 1200-2 represents a greater distance from the camera than location 1200-4 and, therefore, is depicted having a smaller size in FIG. 12E. In some embodiments, locations 1200-1, 1200-3, and 1200-4 all have a similar distance from the camera.

Audio representation 1230-1 includes element 1232, which is a two-dimensional (or substantially two-dimensional) feature that associates the audio representation with user 700. For example, in FIG. 12E, element 1232 is a monogram that includes the initials of user 700. In some embodiments, element 1232 can include, in lieu of or in addition to the initials, the user's first and/or last name or other identifying information such as the user's phone number, email address, user name, or the like.

In some embodiments, multiple users can participate in the XR session and, to each user participating in the XR session, audio representation 1230-1 appears to be facing the respective user, regardless of whether or not user 700 is actually facing the respective user in the physical environment or the XR environment. For example, in FIG. 12E, although user 700 is facing away from the second user, device 901a displays audio representation 1230-1 (including element 1232) in XR environment 1215 facing toward the second user, giving the appearance to the second user that user 700 is facing the second user, thereby interacting and/or communicating with them in XR environment 1215 by way of audio representation 1230-1. In some embodiments, additional users, such as a third (or fourth, fifth, sixth, etc.) user, are also participating in the XR session with user 700 and the second user. To each of these additional users, the audio representation of user 700 has the same appearance as audio representation 1230-1, such that the audio representation (including element 1232) appears to be facing that particular user. In some embodiments, audio representation 1230-1 appears to face the respective user, even as that user moves around (changing orientation) the XR environment.

In some embodiments, device 901a displays audio representation 1230-1 at a location in XR environment 1215 that corresponds to the location (e.g., 1200-1) of user head 700-3 in physical environment 1200 and/or the position at which the avatar's head would be displayed if the user was being represented in XR environment 1215 by avatar 1220. By displaying audio representation 1230-1 at the position of the user's and/or avatar's head, audio representation 1230-1 remains aligned with the eye line of user 700 so that when the second user is looking at audio representation 1230-1, the second user appears (from the perspective of user 700) to be maintaining eye contact. In some embodiments, device 901a displays audio representation 1230-1 at a location in XR environment 1215 that corresponds to a perceived or determined spatial location of an audio source (e.g., that corresponds to audio from user 700) in XR environment 1215.

In some embodiments, various attributes of element 1232 are used to indicate information about the position and/or location of user 700 within physical environment 1200 or XR environment 1205. For example, in some embodiments, the size of element 1232 is used to convey a distance of user 700 from the camera of device 901. For example, when user 700 is at location 1200-2, device 901a displays audio representation 1230-2 having the same size as audio representation 1230-1, but with element 1232 having a smaller size (when compared to the size of element 1232 in audio representation 1230-1) to convey the greater distance of user 700 from the camera. Thus, as user 700 walks away from the camera from location 1200-1 to location 1200-2, device 901a displays the audio representation moving from the location of audio representation 1230-1 to the location of audio representation 1230-2, with element 1232 shrinking in size as user 700 moves farther from the camera. Conversely, the larger size of element 1232 in audio representation 1230-1 indicates that user 700 is closer to the camera when he is at location 1200-1. In some embodiments, device 901a modifies the displayed size of the entire audio representation (including element 1232) to indicate changes in distance of user 700 from the camera.

In some embodiments, device 901a modifies the audio representation in response to detecting audio from user 700 (as user 700 is speaking). In some embodiments, the modification includes changes in size, brightness, or other visual characteristics of the displayed audio representation. For example, in FIG. 12E, audio representation 1230-3 represents a temporarily displayed larger size of the audio representation in response to detecting user 700 talking when he is at location 1200-3. In some embodiments, the audio representation expands and contracts in sync with detected changes in the audio characteristics of user 700 speaking, such as changes in tone, pitch, volume, and the like. In some embodiments, display 901*a* changes other visual characteristics of audio representation 1230-3 in response to the audio such as, for example, pulsing the brightness of the displayed audio representation. In some embodiments, in response to detecting user 700 speaking, device 901*a* modifies the visual characteristics of audio representation 1230-3, but does not modify visual characteristics of avatar 1220, as discussed above.

In some embodiments, device 901*a* modifies the appearance of the audio representation when the audio of user 700 (e.g., as detected at device 901) is muted. For example, in FIG. 12E, device 901*a* displays audio representation 1230-4 with mute icon 1240 to indicate that the audio of user 700 is muted as user 700 is at location 1200-4.

In some embodiments, device 901*a* displays the representation of user 700 having the audio representation (e.g., audio representation 1230-1) when the avatar representation (e.g., avatar 1220) is unavailable. In some embodiments, the audio representation is unavailable if conditions are insufficient for rendering the avatar in the XR environment (e.g., poor lighting in environment 1200 and/or the second user's environment) or if there is insufficient data to depict the avatar representation. In some embodiments, there is insufficient data to depict the avatar representation if user 700 has not performed the enrollment operation described above with respect to FIGS. 7A-7H.

Additional descriptions regarding FIGS. 12A-12E are provided below in reference to methods 1300 and 1400 described with respect to FIGS. 13A-13B and 14 below.

FIGS. 13A-13B are a flowchart of an exemplary method 1300 for switching between different presentation modes associated with a user represented in an XR environment, in accordance with some embodiments. Method 1300 occurs at a computer system (e.g., 101; 901*a*) (e.g., a smartphone, tablet, head-mounted display generation component) that is in communication with a display generation component (e.g., 902*a*) (e.g., a visual output device, a 3D display, a display having at least a portion that is transparent or translucent on which images can be projected (e.g., a see-through display), a projector, a heads-up display, a display controller) and an external computer system (e.g., 901) that is associated with a first user (e.g., 700) (e.g., that is being operated by the first user (e.g., a user that is in a communication session (e.g., an extended reality and/or video conference) with the user of the computer system (e.g., the second user))).

The computer system (e.g., 901*a*) displays (1302), via the display generation component (e.g., 902*a*), a communication user interface (e.g., 1216) that includes a representation (e.g., 1220) (e.g., an animated representation, an avatar representation; a virtual avatar (e.g., the avatar is a virtual representation of at least a portion of the first user); in some embodiments, the virtual avatar is displayed, in an extended reality environment, in lieu of the first user) of the first user (e.g., 700) of the external computer system (e.g., 901) in a first presentation mode (e.g., indicated by 1224*b*) (e.g., a virtual presence mode; a mode in which the first user is represented in the extended reality environment by a rendering (e.g., a virtual avatar) that has humanistic or anthropomorphic features (e.g., a head, arms, legs, hands, etc.)) or as an animated character (e.g., a human; a cartoon character; an anthropomorphic construct of a non-human character such as a dog, a robot, etc.)). In some embodiments, the representation of the first user is displayed having a same pose of the first user. In some embodiments, the representation of the first user is displayed having a portion (e.g., 1220-1; 1220-2; 1220-3) that has a same pose as a corresponding portion (e.g., 700-1; 700-2; 700-3) of the first user.

The communication user interface (e.g., 1216) displays (1304) the representation of the first user (e.g., 1220) in an extended reality environment (e.g., 1215) (e.g., the computer system (e.g., 901*a*) displays the communication user interface having the representation of the first user in an extended reality environment). The representation of the first user (e.g., 1220), while in the first presentation mode (e.g., 1224*b*), is displayed (1306) (e.g., by the computer system (e.g., via the display generation component (e.g., 902*a*))) having a shape (e.g., appearance; geometry) that is visually reactive to (e.g., changes appearance in response to) changes in movement of a first portion (e.g., 700-1; 700-2; 700-3) (e.g., a hand, or a portion of a hand (e.g., palm, fingers, etc.)) of the first user (e.g., 700) that are detected by the external computer system (e.g., 901) (e.g., when in the first presentation mode, the representation of the user is visually reactive in response to movement of the user's hand(s) that is detected in the physical environment and/or extended reality environment). In some embodiments, the representation of the first user is an avatar (e.g., virtual avatar) that changes pose in response to a detected change in pose of at least a portion of the first user in the physical environment. For example, the avatar is displayed in the extended reality environment as an animated character that mimics the detected movements of the first user in the physical environment.

While the computer system (e.g., 901*a*) displays (1308) the representation of the first user (e.g., 1220) in the first presentation mode (e.g., 1224*b*), the computer system receives (1310) first data (e.g., depth data, image data, sensor data (e.g., image data from a camera)), from the external computer system (e.g., 901; 904), that indicates movement of the first portion (e.g., 700-1; 700-2; 700-3) of the first user (e.g., 700). In some embodiments, the first data includes sensor data (e.g., image data from a camera (e.g., 904); movement data from an accelerometer; location data from a GPS sensor; data from a proximity sensor; data from a wearable device (e.g., a watch, a headset)).

While the computer system (e.g., 901*a*) displays (1308) the representation of the first user (e.g., 1220) in the first presentation mode (e.g., 1224*b*), and in response to receiving the first data, the computer system modifies (1312) the shape of the representation of the first user (e.g., displaying a greater amount or lesser amount of the representation of the user (e.g., virtual avatar); changing a shape of a portion (e.g., 1220-2; 1220-3) of the representation of the user; changing a geometry of a portion of the representation of the user; changing the contours and/or outline of the appearance of the representation of the user) based on the movement (e.g., a magnitude and/or direction of the movement) of the first portion (e.g., 700-1; 700-2; 700-3) of the first user (e.g., 700) (e.g., see FIG. 12B).

After modifying the shape of the representation of the first user (e.g., 1220), the computer system (e.g., 901*a*) receives (1314) second data (e.g., from the external computer system (e.g., 901); via an input at the computer system (e.g., 701)) indicating that the representation of the first user is to be displayed in a second presentation mode (e.g., indicated by 1224*a*) (e.g., an audio presence mode; a mode in which the first user is represented in the extended reality environment by a rendering (e.g., 1230-1; 1230-2; 1230-3; 1230-4) (e.g., an icon, a monogram) that does not have anthropomorphic features and/or is an inanimate object), different than the first presentation mode. In some embodiments, the computer system receives an indication (e.g., from the external computer system) that the first user has transitioned their representation from being in the first presentation mode to being in the second presentation mode.

In response to receiving the second data, the computer system (e.g., 901*a*) displays (1316), via the display generation component (e.g., 902*a*), the representation of the first user (e.g., 1230-1; 1230-2; 1230-3; 1230-4) in the second presentation mode, wherein the representation of the first user, while in the second presentation mode, has a shape (e.g., appearance; geometry (e.g., a disk, or spherical shape; a cube; a rectangular prism)) that is not visually reactive to changes in movement of the first portion (e.g., 700-1; 700-2; 700-3) of the first user (e.g., 700) that are detected by the external computer system (e.g., 901) (e.g., when in the second presentation mode, the representation of the user is not visually reactive in response to movement of the user's hand(s) that is detected in the physical environment and/or extended reality environment).

While the computer system (e.g., 901*a*) displays (1318) the representation of the first user in the second presentation mode (e.g., 1230-1; 1230-2; 1230-3; 1230-4), the computer system receives (1320) third data (e.g., from the external computer system (e.g., 901); from a sensor that detects movement or positioning; via an input at the computer system) indicating movement of the first user (e.g., 700) from a first location (e.g., 1200-1; 1200-2; 1200-3; 1200-4) in a physical environment (e.g., 1200) (e.g., in the physical environment of the first user) to a second location (e.g., 1200-1; 1200-2; 1200-3; 1200-4) in the physical environment different from the first location in the physical environment. In some embodiments, the third data includes sensor data (e.g., image data from a camera; movement data from an accelerometer; location data from a GPS sensor; data from a proximity sensor; data from a wearable device (e.g., a watch, a headset device)). In some embodiments, the sensor can be connected to, or integrated with, the computer system. In some embodiments, the sensor can be an external sensor (e.g., a sensor of a different computer system (e.g., the external computer system)).

While the computer system (e.g., 901*a*) displays (1318) the representation of the first user in the second presentation mode (e.g., 1230-1; 1230-2; 1230-3; 1230-4), and in response to receiving the third data, the computer system displays (1322) the representation of the first user moving from a first location (e.g., the location of 1230-1 in FIG. 12E) in the extended reality environment (e.g., 1215) to a second location (e.g., the location of 1230-2 in FIG. 12E) in the extended reality environment different from the first location in the extended reality environment. Displaying the representation of the first user moving from a first location in the extended reality environment to a second location in the extended reality environment in response to receiving the third data provides feedback to a user of the computer system that the first user is moving about their physical location and that the movement about the physical location corresponds to movement of the representation of the first user in the extended reality environment. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first location (e.g., the location of 1230-1 in FIG. 12E) in the extended reality environment (e.g., 1215) represents the first location (e.g., 1200-1) of the first user (e.g., 700) in the physical environment (e.g., 1200) of the first user, and the second location (e.g., the location of 1230-2 in FIG. 12E) in the extended reality environment represents the second location (e.g., 1200-2) of the first user in the physical environment of the first user (e.g., the representation of the first user moves about the extended reality environment to represent physical movement of the first user about the physical environment of the first user).

In some embodiments, while in the second presentation mode (e.g., 1224*a*), the representation of the first user (e.g., 1230-2; 1232) (e.g., a portion of the representation of the first user (e.g., 1232)) is displayed changing sizes to indicate the relative position of the representation of the first user with respect to a user of the computer system (e.g., 901*a*) (e.g., the second user) as the representation of the first user moves toward or away from the user of the computer system. For example, as the representation of the first user moves away from the user of the computer system, the representation of the first user is displayed shrinking in size. Conversely, as the representation of the first user moves closer to the user of the computer system, the representation of the first user is displayed growing in size.

In some embodiments, the first portion (e.g., 700-1; 700-2) of the first user (e.g., 700) includes at least a portion of a hand of the first user (e.g., is a hand of the user; is detected and/or recognized by at least the external computer system (e.g., 901) as at least a portion of a hand of the user).

In some embodiments, in response to receiving the second data, the computer system (e.g., 901*a*) displays, via the display generation component (e.g., 902*a*), an animation (e.g., a sequenced graphical transition) (e.g., see FIG. 12D) of the representation of the first user (e.g., 700) transitioning from the first presentation mode (e.g., 1224*b*) to the second presentation mode (e.g., 1224*a*). In some embodiments, the transition is depicted as an animation in which particles (e.g., 1225) (e.g., from a bokeh effect) forming the representation of the first user (e.g., 1220) in the first presentation mode move together to form the representation of the first user (e.g., 1230-1) in the second presentation mode.

In some embodiments, the representation of the first user (e.g., 1230-1) in the second presentation mode includes a set of one or more colors (e.g., on particles 1235) that is selected (e.g., automatically; without user input; by the computer system) based on one or more colors that are associated with the first user (e.g., 700) (e.g., a set of colors that are determined based on an appearance of the user). In some embodiments, the one or more colors that are associated with the first user include colors of the clothes (e.g., 709) that the first user is wearing in the physical environment (e.g., 1200), colors of the clothes that the first user is wearing during an enrollment process (e.g., an enrollment process as discussed with respect to FIGS. 7A-7H), colors of the clothes that the representation of the first user is wearing in the XR environment, colors of the first user's skin tone, and/or colors of the skin tone of the representation of the first user. In some embodiments, data representing the colors of the representation of the first user in the second presentation mode are provided by the external computer system (e.g., 901; 701) to the computer system (e.g., 901*a*). In some embodiments, a second user, different than the first user, is represented in the second presentation mode using colors that are associated with the second user, which are different than the colors associated with the first user.

In some embodiments, the representation of the first user (e.g., 1230-1) in the second presentation mode (e.g., 1224a) includes a set of one or more colors (e.g., on particles 1235) that is selected (e.g., automatically; without user input; by the computer system) from a predetermined set of color palettes (e.g., a predetermined set of colors that are not determined based on an appearance of the user). Displaying the representation of the first user in the second presentation mode having a set of one or more colors that is selected from a predetermined set of color palettes reduces the computational resources expended by the computer system by reducing the number of user inputs required to display the representation of the first user in the second presentation mode, eliminating the need to sample colors of the user, and or by eliminating issues that may occur when the colors associated with the user are undesirable (e.g., black and/or white colors may obscure the appearance of the representation of the first user in the second presentation mode) or undetected (e.g., during enrollment). Reducing computational workload enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the first user (e.g., 1230-1) in the second presentation mode (e.g., 1224a) includes a set of one or more colors (e.g., on particles 1235) that is selected (e.g., automatically; without user input; by the computer system) from a set of warm color palettes (e.g., a set of warm color tones (e.g., orange-, red-, and/or yellow-based colors; colors with a lower color temperature relative to the average)). Displaying the representation of the first user in the second presentation mode having a set of one or more colors that is selected from a set of warm color palettes provides feedback to a user of the computer system that the representation of the first user represents a person, even when the representation of the first user is not an anthropomorphic construct. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 901a) displays, via the display generation component (e.g., 902a), a representation of a system element (e.g., a virtual assistant; a visual representation of something other than the first user), wherein the representation of the system element includes a set of one or more colors that is selected (e.g., automatically; without user input; by the computer system) from a set of cool color palettes (e.g., a set of cool color tones (e.g., blue-, green-, and/or violet-based colors; colors with a higher color temperature relative to the average)). Displaying a representation of a system element having a set of one or more colors that is selected from a set of cool color palettes provides feedback to a user of the computer system that the representation of the system element represents something other than a person (e.g., does not represent another user in the extended reality environment). Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the first user (e.g., 1230-1) in the second presentation mode (e.g., 1224a), the computer system (e.g., 901a) receives data representing audio (e.g., speech) received from the first user (e.g., 700; 901). In response to receiving the data representing audio received from the first user, the computer system modifies an appearance (e.g., a size, color, shape, brightness, and/or pulsing pattern of the representation of the first user in the second mode and/or the particles forming the representation of the first user in the second presentation mode) of the representation of the first user (e.g., 1230-3) in the second presentation mode in response to detected changes in one or more characteristics (e.g., audio characteristics such as tone, volume, pitch, etc.) of the audio received from the first user (e.g., as the first user speaks, the representation of the first user in the second presentation mode changes in appearance by changing size, color, shape, brightness, and/or pulsing with changes in the first user's speech). Modifying an appearance of the representation of the first user in the second presentation mode in response to detected changes in one or more characteristics of the audio received from the first user provides feedback to a user of the computer system that the first user is speaking, even when the representation of the first user is not an anthropomorphic construct. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the first user (e.g., 1220) in the first presentation mode (e.g., 1224b), the computer system (e.g., 901a) receives data representing audio (e.g., speech) received from the first user (e.g., 700; 901). In response to receiving the data representing audio received from the first user, the computer system forgoes modifying an appearance (e.g., a color, shape, brightness, and/or pulsing pattern of particles forming the representation of the first user in the first presentation mode) of the representation of the first user in the first presentation mode in response to detected changes in one or more characteristics (e.g., audio characteristics such as tone, volume, pitch, etc.) of the audio received from the first user (e.g., as the first user speaks, particles forming the representation of the first user in the first presentation mode do not change in appearance with changes in the first user's speech). In some embodiments, as the first user speaks, the representation of the first user in the first presentation mode optionally changes in appearance by moving a mouth feature or performing another action that mimics a speaking movement (e.g., see FIG. 12C), but particles (e.g., 1225) forming the representation of the first user do not otherwise change in appearance. In contrast, when the representation of the first user is in the second presentation mode (1230-3), particles (e.g., 1235) forming the representation of the first user do change in appearance by, for example, changing color, brightness, and/or pulsing behavior.

In some embodiments, the representation of the first user (e.g., 1230-1; 1230-2; 1230-3; 1230-4) in the second presentation mode (e.g., 1224*a*) changes at least a portion of its appearance (e.g., the particles (e.g., 1235) forming the representation of the first user in the second presentation mode move in a predetermined pattern) independent of audio outputted by the first user (e.g., 700) (e.g., outputted by the external computer system (e.g., 901); provided to the computer system (e.g., 901*a*)). In some embodiments, as a part of displaying the representation of the first user in the second presentation mode includes, after a predetermined period of time during which a predetermined level of audio was not detected for the first user (e.g., audio data was not received for the first user; the first user is not speaking), the computer system (e.g., 901*a*) modifies the appearance of the representation of the first user in the second presentation mode in a predetermined manner (e.g., the representation of the first user in the second mode gradually changes in appearance over time (e.g., the particles forming the representation of the first user in the second presentation mode move in a predetermined pattern) independent of whether or not the first user is speaking).

In some embodiments, the representation of the first user (e.g., 1230-1) in the second presentation mode (e.g., 1224*a*) includes an element (e.g., 1232) (e.g., a monogram; initials of the first user) having a two-dimensional or substantially two-dimensional appearance (e.g., an appearance that does not convey depth, a flat appearance; an appearance in the extended reality environment that is not modeled to have depth). In some embodiments, the representation of the first user in the second presentation mode (e.g., 1230-1) has a three-dimensional appearance (e.g., a spherical shape, a curved lens shape, a rectangular prism shape, a cube shape, etc.), and an element displayed on the representation of the first user in the second presentation mode has a two-dimensional appearance or a substantially two-dimensional appearance (e.g., two-dimensional text that has a thickness or visual effect that may give a somewhat three-dimensional appearance).

In some embodiments, the external computer system (e.g., 901) is in communication with a second external computer system that is associated with a second user (e.g., a third user). In some embodiments, as a part of displaying the representation of the first user (e.g., 1230-1) in the second presentation mode (e.g., 1224*a*), the computer system (e.g., 901*a*) displays, via the display generation component (e.g., 902*a*), the element (e.g., 1232) (e.g., initials of the first user) having a first position in the extended reality environment (e.g., 1215) facing a user of the computer system (e.g., orientated so as to face the point-of-view of the user) in the extended reality environment. In some embodiments, the second external computer system displays the representation of the first user in the second presentation mode (e.g., similar to 1230-1), including displaying the element (e.g., similar to 1232) having a second position in the extended reality environment (e.g., different from the first position) facing the second user in the extended reality environment (e.g., the representation of the first user in the second presentation mode is displayed such that the element appears, to the user of the computer system, to be facing the user of the computer system in the extended reality environment, and appears, to the second user, to be facing the second user in the extended reality environment). In some embodiments, the element is displayed differently for each user viewing the extended reality environment and receiving a transmission of the representation of the first user in the second presentation mode such that the element appears, for each user, to be facing that user. In some embodiments, the display generation component displays the element changing position to face an active user in the extended reality environment. For example, when a user in the extended reality environment begins speaking, the element moves (e.g., rotates) to face the user who is speaking.

In some embodiments, while displaying the representation of the first user (e.g., 1230-1) in the second presentation mode (e.g., 1224*a*) having a first displayed size, the computer system (e.g., 901*a*) receives fourth data (in some embodiments, the third data) from the external computer system (e.g., 901) (e.g., data indicating movement of the first user in the physical environment of the first user (e.g., from location 1200-1 to location 1200-2)). In response to receiving the fourth data, the computer system (e.g., 901*a*) displays the element (e.g., 1232) changing (e.g., growing or shrinking) from a second displayed size (e.g., a size of element 1232 depicted in 1230-1) to a third displayed size (e.g., a size of element 1232 depicted in 1230-2) different from the second displayed size (e.g., the size of the representation of the first user in the second presentation mode stays constant while the size of the element changes (e.g., based on the movement of the first user in the physical environment)). Displaying the element changing from a second displayed size to a third displayed size different from the second displayed size while the representation of the first user in the second presentation mode is displayed having a first size provides feedback to a user of the computer system that the first user is moving toward or away from the user of the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the size of the representation of the first user in the second presentation mode (e.g., 1230-1) also changes size. For example, the size of the representation of the first user in the second presentation mode can get larger or smaller to indicate a relative distance of the first user (e.g., 700) from a user of the computer system (e.g., 901*a*) in the extended reality environment (e.g., 1215).

In some embodiments, the representation of the first user (e.g., 1230-4) in the second presentation mode (e.g., 1224*a*) includes a visual indication (e.g., 1240) (e.g., a glyph) of a mute status (e.g., a status of whether audio detectable by the first external computer system (e.g., 901) is being output by (or provided to) the computer system (e.g., 901*a*)) of the first user (e.g., 700). Displaying a visual indication of a mute status of the first user provides feedback to a user of the computer system indicating whether the audio of the first user is muted. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the first user (e.g., 1230-1) in the second presentation mode (e.g., 1224*a*) includes a visual indication (e.g., 1232) of an identification (e.g., a name or initials; a textual indication) of the first user (e.g., 700). Displaying a visual indication of an identification of the first user provides feedback to a user of the computer system identifying the first user when the first user is not otherwise recognizable in the extended reality environment.

Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the first user (e.g., 1220) in the first presentation mode (e.g., 1224*b*) includes an avatar having an avatar head feature (e.g., part of portion 1220-3). In some embodiments, displaying the representation of the first user (e.g., 1230-1) in the second presentation mode (e.g., 1224*a*) includes ceasing display of the avatar (e.g., 1220) and displaying the representation of the first user (e.g., 1230-1) in the second presentation mode at a first location that overlaps a second location that was previously occupied by the avatar head feature (e.g., the representation of the first user in the second presentation mode is displayed at or near where the avatar's head was positioned when the first user transitioned from the first presentation mode to the second presentation mode). Displaying the representation of the first user in the second mode at a first location that overlaps a second location that was previously occupied by the avatar head feature provides feedback to a user of the computer system of the location of the first user's face and aligns the representation of the first user with the focus plane of the user of the computer system such that the user of the computer system appears, from the perspective of the first user, to be making eye contact with the representation of the first user in the extended reality environment. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the location of the avatar's head is determined based on a perceived or determined spatial location of an audio source in the extended reality environment.

Note that details of the processes described above with respect to method 1300 (e.g., FIGS. 13A-13B) are also applicable in an analogous manner to methods 800, 1000, 1100, and 1400 described herein. For example, methods 800, 1000, 1100, and/or 1400 optionally include one or more of the characteristics of the various methods described above with reference to method 1300. For brevity, these details are not repeated below.

FIG. 14 is a flowchart of an exemplary method 1400 for displaying a virtual avatar in an XR environment, in accordance with some embodiments. Method 1400 occurs at a computer system (e.g., 101; 901*a*) (e.g., a smartphone, tablet, head-mounted display generation component) that is in communication with a display generation component (e.g., 902*a*) (e.g., a visual output device, a 3D display, a display having at least a portion that is transparent or translucent on which images can be projected (e.g., a see-through display), a projector, a heads-up display, a display controller) and an external computer system (e.g., 901) that is associated with a first user (e.g., 700) (e.g., that is being operated by the first user (e.g., a user that is in a communication session (e.g., an extended reality and/or video conference) with the user of the computer system)).

At method 1400, in response to receiving (1402) a request to display a representation (e.g., 1220) (e.g., an avatar; a virtual avatar (e.g., the avatar is a virtual representation of at least a portion of the first user); in some embodiments, the virtual avatar is displayed, in an extended reality environment, in lieu of the first user) of the first user (e.g., 700) (e.g., a user of the external computer system) in an extended reality environment (e.g., 1215), the computer system (e.g., 901*a*) performs the following items.

In accordance with a determination (1404) that a set of glasses (e.g., eyeglasses; spectacles; framed, corrective lenses; framed, decorative lenses; framed, protective lenses) display criteria is met (e.g., a user setting (e.g., 1226*b*; 1226*c*; 1226*d*) is enabled to display glasses; glasses (e.g., 707) are detected on the first user (e.g., 700) during an enrollment process (e.g., discusses with respect to FIGS. 7A-7H); the display of the glasses is manually enabled by the first user; display of the glasses is automatically enabled by the computer system or another computer system (e.g., 701; 901; 901*a*); the first user is known to wear glasses), the computer system (e.g., 901*a*) displays (1406), via the display generation component (e.g., 902*a*), the representation of the first user (e.g., 1220) in the extended reality environment (e.g., 1215) (e.g., displaying the avatar in the extended reality environment). In some embodiments, the representation of the first user is displayed having a mode (e.g., 1224*b*) (e.g., virtual presence mode) in which the first user is represented in the extended reality environment by a rendering (e.g., a virtual avatar) that has humanistic or anthropomorphic features (e.g., a head, arms, legs, hands, etc.)) or as an animated character (e.g., a human; a cartoon character; an anthropomorphic construct of a non-human character such as a dog, a robot, etc.)). In some embodiments, the representation of the first user (e.g., 1220) is displayed having a same pose of the first user (e.g., 700). In some embodiments, the representation of the first user is displayed having a portion (e.g., 1220-2) that has a same pose as a corresponding portion (e.g., 700-2) of the first user. In some embodiments, the representation of the first user is an avatar (e.g., virtual avatar) that changes pose in response to a detected change in pose of at least a portion of the first user in the physical environment. For example, the avatar is displayed in the extended reality environment as an animated character that mimics the detected movements of the first user in the physical environment).

In accordance with a determination that the set of glasses display criteria is met, the computer system (e.g., 901*a*) displays (1408), via the display generation component (e.g., 902*a*), a representation of glasses (e.g., 1221) (e.g., avatar glasses) positioned on the representation of the first user (e.g., 1220) in the extended reality environment (e.g., 1215) (e.g., the avatar is displayed, in the extended reality environment, wearing glasses in front of its eyes (e.g., in lieu of displaying the avatar with a headset device over its eyes)).

In accordance with a determination (1410) that the set of glasses display criteria is not met (e.g., option 1226*a* is selected in FIG. 12A), the computer system (e.g., 901*a*) displays (1412), via the display generation component (e.g., 902*a*), the representation of the first user (e.g., 1220) in the extended reality environment (e.g., 1215) without displaying the representation of glasses positioned on the representation of the first user in the extended reality environment (e.g., see FIG. 12A) (e.g., forgoing displaying the representation of glasses positioned on the representation of the first user in the extended reality environment (e.g., the same avatar is displayed, in the extended reality environment, but without wearing glasses in front of its eyes)). Selectively displaying the representation of glasses positioned on the representation of the first user in the extended reality environment, depending on whether or not the set of glasses display criteria is met, provides feedback to a user of the computer system about the appearance of the first user (such as whether or not the first user wears glasses) and improves the human-system interaction by providing a more realistic appearance of the representation of the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of glasses display criteria includes a criterion that is met when a user setting (e.g., 1226b; 1226c; 1226d) (e.g., a selectable option (e.g., a toggle switch) in a user settings interface (e.g., 1204; 704)) is enabled (e.g., by the first user (e.g., 700)) for displaying the representation of glasses (e.g., 1221).

In some embodiments, the set of glasses display criteria includes a criterion that is met when a set of glasses (e.g., 707) (e.g., a set of glasses being worn by the user) were detected (e.g., automatically; by the external computer system (e.g., 901; 701)) during an enrollment process (e.g., the external computer system detected the first user wearing or holding a set of glasses during the enrollment process (e.g., an enrollment process as discussed with respect to FIGS. 7A-7H).

In some embodiments, as a part of displaying the representation of glasses (e.g., 1221) positioned on the representation of the first user (e.g., 1220) in the extended reality environment (e.g., 1215), the computer system (e.g., 901a) performs the following items. In accordance with a determination that an option (e.g., 1226b) for a first appearance (e.g., a first appearance of the representation of glasses (e.g., glasses 1221 in FIG. 12B)) has been selected by the first user (e.g., 700) (e.g., a previous manual selection by the first user) (e.g., the first appearance option is currently selected/enabled by the first user), the computer system displays the representation of glasses (e.g., 1221) having the first appearance (e.g., as depicted in FIG. 12B). In accordance with a determination that an option (e.g., 1226c) for a second appearance (e.g., a second appearance of the representation of glasses, different from the first appearance (e.g., glasses 1221 in FIG. 12C)) has been selected by the first user (e.g., the second appearance option is currently selected/enabled by the first user), the computer system displays the representation of glasses (e.g., 1221) having the second appearance (e.g., as depicted in FIG. 12C). Displaying the representation of glasses having the first or second appearance, depending on which option is selected by the first user, provides feedback to a user of the computer system about the appearance of the first user (such as the appearance of the glasses that the first user wears) and improves the human-system interaction by providing a more realistic appearance of the representation of the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first appearance is an appearance based on the display generation component (e.g., a headset component; e.g., an extended reality headset) of the computer system (e.g., option 1226d depicted in FIGS. 7H and 12A). In some embodiments, the representation of glasses (e.g., 1221) has an appearance of a headset device.

In some embodiments, as a part of displaying the representation of glasses (e.g., 1221) positioned on the representation of the first user (e.g., 1220) in the extended reality environment (e.g., 1215), the computer system (e.g., 901a) performs the following items. In accordance with a determination that third appearance criteria are met (e.g., data (e.g., input data; data from a camera (e.g., similar to 904) or sensor of the computer system; data from the external computer system (e.g., 901; 701)) is received indicating that a third appearance has been detected (e.g., automatically, by computer system and/or the external computer system (e.g., during an enrollment process)) for the representation of glasses), the computer system (e.g., 901a) displays the representation of glasses (e.g., 1221) having a third appearance (e.g., the appearance of glasses 1221 in FIG. 12B) selected based on glasses (e.g., 707) detected on a face of the user (e.g., 700) (e.g., prior to placing an extended reality headset on such as during an enrollment process for using the extended reality headset). In some embodiments, the third appearance is an appearance of glasses that is automatically detected by a computer system (e.g., 701) (e.g., the external computer system), for example, during an enrollment process. For example, during enrollment, the computer system detects that the user is wearing glasses having thick frames and, therefore, automatically selects an appearance for the representation of glasses that is similar to the appearance (e.g., having thick frames) of the detected glasses. Displaying the representation of glasses having the third appearance in accordance with a determination that third appearance criteria are met provides feedback to a user of the computer system about the appearance of the first user (such as the appearance of the glasses that the first user wears) and improves the human-system interaction by providing a more realistic appearance of the representation of the first user. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first user (e.g., 700) is associated with a set of glasses (e.g., 707) that have a first set of appearance characteristics (e.g., style, size, color, shape, tint). In some embodiments, the first user is associated with the set of glasses when the set of glasses are detected and/or selected during an enrollment process for the first user. In some embodiments, the representation of glasses (e.g., 1221) has a second set of appearance characteristics different from the first set of appearance characteristics by omitting one or more visual details of the set of glasses (e.g., the representation of glasses is an abstract representation of the set of glasses that is associated with the first user).

In some embodiments, the representation of glasses (e.g., 1221) have a translucent appearance (e.g., as depicted in FIG. 12C) (e.g., so that an appearance of a representation of the user (e.g., 1220), an appearance of one or more representations of virtual objects, and/or an appearance of one or more physical objects are visible through the representation of glasses, where the appearance includes one or more of a shape, color, number, or size of the objects).

In some embodiments, the representation of glasses (e.g., 1221) positioned on the representation of the first user (e.g., 1220) in the extended reality environment (e.g., 1215)

includes a representation of one or more rim portions (e.g., as depicted in FIGS. 12B and 12C) (e.g., lens frame(s), optionally with or without lenses) of the glasses and does not include a representation of a temple portion (e.g., one or more arms) of the glasses (e.g., the displayed representation of glasses does not include arms or temples of the glasses). Displaying the representation of glasses without a representation of a temple portion of the glasses reduces the computational resources expended by the computer system by eliminating the need to account for the positioning and display of the temple portions of the representation of glasses. Reducing computational workload enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1400 (e.g., FIG. 14) are also applicable in an analogous manner to methods 800, 1000, 1100, and 1300 described above. For example, methods 800, 1000, 1100, and/or 1300 optionally include one or more of the characteristics of the various methods described above with reference to method 1400.

In some embodiments, aspects and/or operations of methods 800, 1000, 1100, 1300, and 1400 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system, wherein the computer system is in communication with a display generation component and one or more cameras, the computer system comprising:
    one or more processors; and
    memory storing one or more programs configured to be executed by the one or more processors, the one or more programs including instructions for:
        during an enrollment process that includes capturing facial data of a user via the one or more cameras, displaying, via the display generation component, an enrollment interface for enrolling one or more features of the user, including:
            outputting a first facial expression prompt instructing the user to position one or more of the user's facial features in a first specific facial expression;
            after outputting the first facial expression prompt, capturing a first set of facial data of the user via the one or more cameras;
            in accordance with a determination that the first set of facial data of the user satisfies a first set of facial expression criteria, wherein the first set of facial expression criteria include a requirement that the first set of facial data corresponds to the first specific facial expression in order for the first set of facial expression criteria to be met, outputting confirmation that the first set of facial data of the user corresponds to the first specific facial expression;
            outputting a second facial expression prompt instructing the user to position one or more of the user's facial features in a second specific facial expression different from the first specific facial expression;
            after outputting the second facial expression prompt, capturing a second set of facial data of the user via the one or more cameras; and
            in accordance with a determination that the second set of facial data of the user satisfies a second set of facial expression criteria, wherein the second set of facial expression criteria include a requirement that the second set of facial data corresponds to the second specific facial expression that is different from the first facial expression in order for the second set of facial expression criteria to be met, outputting confirmation that the second set of facial data of the user corresponds to the second specific facial expression.

2. The computer system of claim 1, wherein:
    the first facial expression prompt is outputted in accordance with a determination that a first set of enrollment criteria is not met, and
    the second facial expression prompt is outputted in accordance with a determination that the first set of enrollment criteria is met and a second set of enrollment criteria is not met.

3. The computer system of claim 1, the one or more programs further including instructions for:
    after capturing the first set of facial data of the user via the one or more cameras, ceasing display of the first facial expression prompt; and
    after capturing the second set of facial data of the user via the one or more cameras, ceasing display of the second facial expression prompt.

4. The computer system of claim 1, wherein the first or second specific facial expression is selected from a group consisting of a smile, a frown, a squint, and a surprised expression.

5. The computer system of claim 1, wherein the second facial expression prompt includes a prompt for the user to speak a set of one or more words.

6. The computer system of claim 1, wherein displaying the enrollment interface for enrolling one or more features of the user further includes:
    outputting a third prompt to change a position of the user's head.

7. The computer system of claim 6, wherein the third prompt is outputted before at least one of the first facial expression prompt or the second facial expression prompt.

8. The computer system of claim 1, wherein displaying the enrollment interface for enrolling one or more features of the user further includes:
    outputting a fourth prompt to change a position of the one or more cameras relative to the user's head while keeping the user's head stationary.

9. The computer system of claim 1, wherein displaying the enrollment interface for enrolling one or more features of the user further includes:
    outputting a fifth prompt to indicate a height of the user.

10. The computer system of claim 1, wherein displaying the enrollment interface for enrolling one or more features of the user further includes:
    outputting a sixth prompt to remove a set of glasses from the user's face for at least a portion of the enrollment process.

11. The computer system of claim 1, wherein:
    an avatar is generated using at least a portion of the facial data captured during the enrollment process, and
    the avatar is displayed using an external computer system that is different from the computer system.

12. The computer system of claim 1, wherein displaying the enrollment interface for enrolling one or more features of the user further includes:
    outputting a seventh prompt to capture a pose of a non-facial feature of the user.

13. A non-transitory computer-readable storage medium storing one or more programs configured to be executed by one or more processors of a computer system that is in communication with a display generation component and one or more cameras, the one or more programs including instructions for:
    during an enrollment process that includes capturing facial data of a user via the one or more cameras, displaying, via the display generation component, an enrollment interface for enrolling one or more features of the user, including:
        outputting a first facial expression prompt instructing the user to position one or more of the user's facial features in a first specific facial expression;

after outputting the first facial expression prompt, capturing a first set of facial data of the user via the one or more cameras;

in accordance with a determination that the first set of facial data of the user satisfies a first set of facial expression criteria, wherein the first set of facial expression criteria include a requirement that the first set of facial data corresponds to the first specific facial expression in order for the first set of facial expression criteria to be met, outputting confirmation that the first set of facial data of the user corresponds to the first specific facial expression;

outputting a second facial expression prompt instructing the user to position one or more of the user's facial features in a second specific facial expression different from the first specific facial expression;

after outputting the second facial expression prompt, capturing a second set of facial data of the user via the one or more cameras; and in accordance with a determination that the second set of facial data of the user satisfies a second set of facial expression criteria, wherein the second set of facial expression criteria include a requirement that the second set of facial data corresponds to the second specific facial expression that is different from the first facial expression in order for the second set of facial expression criteria to be met, outputting confirmation that the second set of facial data of the user corresponds to the second specific facial expression.

14. The non-transitory computer-readable storage medium of claim 13, wherein:
the first facial expression prompt is outputted in accordance with a determination that a first set of enrollment criteria is not met, and
the second facial expression prompt is outputted in accordance with a determination that the first set of enrollment criteria is met and a second set of enrollment criteria is not met.

15. The non-transitory computer-readable storage medium of claim 13, the one or more programs further including instructions for:
after capturing the first set of facial data of the user via the one or more cameras, ceasing display of the first facial expression prompt; and
after capturing the second set of facial data of the user via the one or more cameras, ceasing display of the second facial expression prompt.

16. The non-transitory computer-readable storage medium of claim 13, wherein the first or second specific facial expression is selected from a group consisting of a smile, a frown, a squint, and a surprised expression.

17. The non-transitory computer-readable storage medium of claim 13, wherein the second facial expression prompt includes a prompt for the user to speak a set of one or more words.

18. The non-transitory computer-readable storage medium of claim 13, wherein displaying the enrollment interface for enrolling one or more features of the user further includes:
outputting a third prompt to change a position of the user's head.

19. The non-transitory computer-readable storage medium of claim 18, wherein the third prompt is outputted before at least one of the first facial expression prompt or the second facial expression prompt.

20. The non-transitory computer-readable storage medium of claim 13, wherein displaying the enrollment interface for enrolling one or more features of the user further includes:
outputting a fourth prompt to change a position of the one or more cameras relative to the user's head while keeping the user's head stationary.

21. The non-transitory computer-readable storage medium of claim 13, wherein displaying the enrollment interface for enrolling one or more features of the user further includes:
outputting a fifth prompt to indicate a height of the user.

22. The non-transitory computer-readable storage medium of claim 13, wherein displaying the enrollment interface for enrolling one or more features of the user further includes:
outputting a sixth prompt to remove a set of glasses from the user's face for at least a portion of the enrollment process.

23. The non-transitory computer-readable storage medium of claim 13, wherein:
an avatar is generated using at least a portion of the facial data captured during the enrollment process, and
the avatar is displayed using an external computer system that is different from the computer system.

24. The non-transitory computer-readable storage medium of claim 13, wherein displaying the enrollment interface for enrolling one or more features of the user further includes:
outputting a seventh prompt to capture a pose of a non-facial feature of the user.

25. A method comprising:
at a computer system that is in communication with a display generation component and one or more cameras:
during an enrollment process that includes capturing facial data of a user via the one or more cameras, displaying, via the display generation component, an enrollment interface for enrolling one or more features of the user, including:
outputting a first facial expression prompt instructing the user to position one or more of the user's facial features in a first specific facial expression;
after outputting the first facial expression prompt, capturing a first set of facial data of the user via the one or more cameras;
in accordance with a determination that the first set of facial data of the user satisfies a first set of facial expression criteria, wherein the first set of facial expression criteria include a requirement that the first set of facial data corresponds to the first specific facial expression in order for the first set of facial expression criteria to be met, outputting confirmation that the first set of facial data of the user corresponds to the first specific facial expression;
outputting a second facial expression prompt instructing the user to position one or more of the user's facial features in a second specific facial expression different from the first specific facial expression;
after outputting the second facial expression prompt, capturing a second set of facial data of the user via the one or more cameras; and
in accordance with a determination that the second set of facial data of the user satisfies a second set of facial expression criteria, wherein the second set of facial expression criteria include a requirement that the second set of facial data corresponds to the second specific facial expression that is different from the first facial expression in order for the second set of facial expression criteria to be met, outputting confirmation that the second set of facial data of the user corresponds to the second specific facial expression.

26. The method of claim 25, wherein:

the first facial expression prompt is outputted in accordance with a determination that a first set of enrollment criteria is not met, and the second facial expression prompt is outputted in accordance with a determination that the first set of enrollment criteria is met and a second set of enrollment criteria is not met.

27. The method of claim 25, further comprising:

after capturing the first set of facial data of the user via the one or more cameras, ceasing display of the first facial expression prompt; and after capturing the second set of facial data of the user via the one or more cameras, ceasing display of the second facial expression prompt.

28. The method of claim 25, wherein the first or second specific facial expression is selected from a group consisting of a smile, a frown, a squint, and a surprised expression.

29. The method of claim 25, wherein the second facial expression prompt includes a prompt for the user to speak a set of one or more words.

30. The method of claim 25, wherein displaying the enrollment interface for enrolling one or more features of the user further includes:

outputting a third prompt to change a position of the user's head.

31. The method of claim 30, wherein the third prompt is outputted before at least one of the first facial expression prompt or the second facial expression prompt.

32. The method of claim 25, wherein displaying the enrollment interface for enrolling one or more features of the user further includes:

outputting a fourth prompt to change a position of the one or more cameras relative to the user's head while keeping the user's head stationary.

33. The method of claim 25, wherein displaying the enrollment interface for enrolling one or more features of the user further includes:

outputting a fifth prompt to indicate a height of the user.

34. The method of claim 25, wherein displaying the enrollment interface for enrolling one or more features of the user further includes:

outputting a sixth prompt to remove a set of glasses from the user's face for at least a portion of the enrollment process.

35. The method of claim 25, wherein:

an avatar is generated using at least a portion of the facial data captured during the enrollment process, and the avatar is displayed using an external computer system that is different from the computer system.

36. The method of claim 25, wherein displaying the enrollment interface for enrolling one or more features of the user further includes:

outputting a seventh prompt to capture a pose of a non-facial feature of the user.

* * * * *